(12) United States Patent
Mueller et al.

(10) Patent No.: US 10,417,690 B2
(45) Date of Patent: Sep. 17, 2019

(54) METHOD AND SYSTEM FOR ORDER ROUTING AND MANAGEMENT

(71) Applicant: NewStore, Boston, MA (US)

(72) Inventors: Ulrike Vanessa Mueller, Boston, MA (US); Stephan Schambach, Boston, MA (US); Johannes Steger, Boston, MA (US)

(73) Assignee: NewStore, Inc., Boston, MA (US)

( * ) Notice: Subject to any disclaimer, the term of this patent is extended or adjusted under 35 U.S.C. 154(b) by 491 days.

(21) Appl. No.: 15/202,977

(22) Filed: Jul. 6, 2016

(65) Prior Publication Data

US 2017/0011449 A1 Jan. 12, 2017

Related U.S. Application Data

(60) Provisional application No. 62/188,908, filed on Jul. 6, 2015.

(51) Int. Cl.
 *G06Q 30/00* (2012.01)
 *G06Q 30/06* (2012.01)

(52) U.S. Cl.
 CPC ....... *G06Q 30/0635* (2013.01); *G06Q 30/016* (2013.01)

(58) Field of Classification Search
 CPC ... G06Q 30/06; G06Q 30/016; G06Q 30/0635
 See application file for complete search history.

(56) References Cited

U.S. PATENT DOCUMENTS

| 6,587,827 | B1 * | 7/2003 | Hennig | G06Q 10/087 |
| | | | | 705/26.1 |
| 7,174,308 | B2 * | 2/2007 | Bergman | G06Q 20/04 |
| | | | | 705/27.1 |
| 7,848,953 | B2 | 12/2010 | Kahlon et al. | |
| 8,290,513 | B2 * | 10/2012 | Forstall | H04M 1/72544 |
| | | | | 455/456.3 |
| 8,352,382 | B1 | 1/2013 | Katta et al. | |

(Continued)

OTHER PUBLICATIONS

Joshua Stern, Ph.D "Web Basics Workshop" Copyright 1996-2005. Retrieved from www.wlac.edu/online/documents/webbasics.pdf (Year: 2005).*

(Continued)

*Primary Examiner* — Naeem U Haq
(74) *Attorney, Agent, or Firm* — Intrinsic Law Corp.

(57) ABSTRACT

A method and a system for facilitating online shopping and customers' interaction with retail associates, in a cloud-computing infrastructure is provided. A Routing and Fulfillment Server (RFS) is coupled to multiple customers' and retail associates' electronic communication devices over a cloud-based network. The customers and retail associates exchange request and response message data with the server, during the process of communication. A customer initiates a transaction request message, intending to buy a product, specifying the product's attributes and a preferred delivery option for the product. In an aspect, the RFS utilizes the transaction request message, a set of routing rules, and stored data, to select a specific retail store or distribution center to source the product from; and further selects an available retail associate located therein to serve the transaction.

14 Claims, 30 Drawing Sheets

(56) References Cited

U.S. PATENT DOCUMENTS

| | | | |
|---|---|---|---|
| 8,533,053 B2 | 9/2013 | Brown et al. | |
| 8,577,734 B2* | 11/2013 | Treyz | G06Q 20/12 |
| | | | 705/26.1 |
| 8,626,333 B2 | 1/2014 | Waddington et al. | |
| 9,047,630 B2* | 6/2015 | Sanjeev | G06Q 20/204 |
| 9,390,448 B2* | 7/2016 | Chien | G06Q 30/0207 |
| 9,760,924 B2* | 9/2017 | Cumberland | G06Q 30/0605 |
| 9,824,384 B2* | 11/2017 | Li | G06Q 30/0623 |
| 10,068,281 B2* | 9/2018 | Vasantham | G06Q 50/01 |
| 2003/0171962 A1 | 9/2003 | Hirth et al. | |
| 2004/0064345 A1* | 4/2004 | Ajamian | G06Q 10/10 |
| | | | 705/4 |
| 2005/0216505 A1 | 9/2005 | Chorley et al. | |
| 2008/0162249 A1* | 7/2008 | Leventhal | G06Q 10/06 |
| | | | 705/304 |
| 2013/0013358 A1* | 1/2013 | Sears | G06Q 30/06 |
| | | | 705/7.12 |
| 2016/0127234 A1* | 5/2016 | Vanska | H04L 45/74 |
| | | | 709/238 |
| 2018/0130119 A1* | 5/2018 | Korac | G06Q 30/0635 |

OTHER PUBLICATIONS

Abhaya Asthana et al. "An Indoor Wireless System for Personalized Shopping Assistance", Mobile Computing System and Applications, 1994, pp. 69-74. (Year: 1994).*

* cited by examiner

| Order Table Columns | Notes |
|---|---|
| Order Id | XYZ |
| Customer Info | Customer Nr, Customer Name, Phone, Email |
| Billing Address | Name, Street, City, Country, Phone, Email |
| Shipping Address | Name, Street, City, Country, Phone |
| Shipping Geo Location | alternative: Geo Location for shipping, e.g. shipping to a street corner or shipping to a Starbucks |
| Shipping Method | 90 min, Later Today, Next Day, ... |
| Allow Order Split | Flag, whether an order with multiple items can be split into multiple shipments from different location |
| Delivery Window | An optional delivery window, most important for "Later Today". E.g. a 1 hr. delivery window for delivery in the evening |
| Payment Information | Reference to a payment transaction |
| Discount information | Information regarding the discounts applied to this order |
| Requires Add-On Service | Flags indicating, if any any item requires gift wrap, personalization, 3D printing, custom assembly, video gift message or other add-on services |

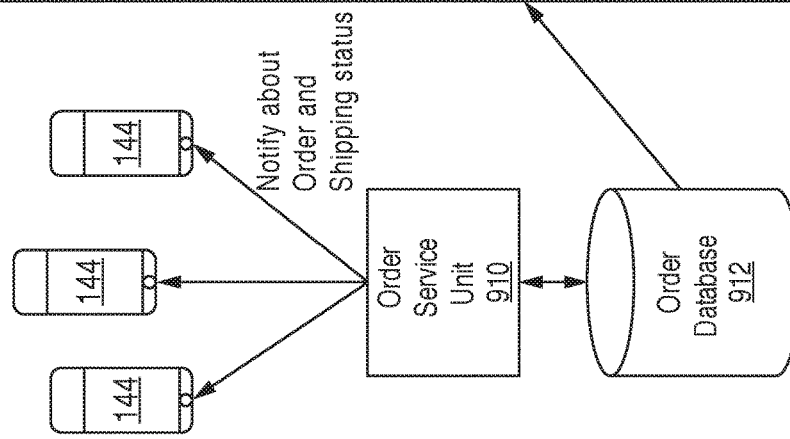

METHOD AND SYSTEM FOR ORDER ROUTING AND MANAGEMENT

CROSS REFERENCE TO RELATED APPLICATIONS

This application is related to and claims priority to U.S. Provisional Patent Application Ser. No. 62/188,908, filed on Jul. 6, 2015, titled "Automated Integrated Routing and Fulfillment System and Method", which is hereby incorporated by reference.

TECHNICAL FIELD

Embodiments of the present disclosure are generally directed to electronic commerce, and, more specifically, to methods and systems for facilitating automated online search, purchase, order routing and delivery of products/goods and services through communication between customers and retail associates, within a cloud-based environment.

BACKGROUND

Electronic commerce, abbreviated as e-commerce, has been predominating in the market for decades. Several small and medium sized retailer firms/enterprises operating in the current retail market provide infrastructural support for locally installable application for mobile phones, to facilitate online, mobile shopping for customers. Further, with online shopping platforms accessible through web browsers, provided by e-commerce giants, including, Amazon, e-bay, Alibaba, Flipkart, etc., for example, online shopping is gaining an ever increasing grip in the retail market. Customers may prefer to shop online, and order products from anywhere, anytime, instead of walking physically to the retail stores, thus, saving time. Consumers are, therefore, able to browse a variety of products online, shop according to their preference, and order products by selecting different delivery options.

Some or all activities involved in an online shopping transaction, including customers' navigation through the available products for sale, selection of one or more products and their attributes such as color and size, addition of multiple products to the shopping cart, choosing a specific delivery option for the product, and selecting a preferred payment option for the product, can now be performed online. Typically, these actions are performed through a customer electronic device (e.g., a client computer, tablet, mobile device, smartphone) by accessing the retailer's online platform over the internet, either through a web browser, or through a locally installable mobile application provided by the retail service provider.

In the context of online transactions and e-commerce, cloud computing may obviate the upfront infrastructural costs for retailers. Retailers store information and data pertinent to the customers, such as their navigation history, frequency of logging on to the online service platform, goods/services of their particular interest, their geographical location, and their preferred modes of payment, to customize users' online shopping experience. Such information can now be stored in multiple databases of cloud-based servers, and is accessible through a shared pool of configurable computing resources within a cloud-computing environment. Further, with multiple client computing devices, including laptops, mobile phones, tablet computers, etc., connected to a cloud-based server through a communication network, communication and exchange of request and response message data between customers and retailers can now be facilitated in the current state of the art. Effectively, an industry of software products, platforms, and cloud-based services has emerged and evolved to a substantially advanced level, to serve and support the e-commerce industry. Inventory management systems, electronic, automated payment tools, logistics servers, Software as a Service (SaaS) and mobile device applications, collaborate to enhance users' experience, and maximize retailers' profitability.

Customers' ease of interaction with retail associates in a network connected e-commerce infrastructure, is, however, still a factor that drives the long-term retention of customers on online shopping portals. Several online retailer platforms and mobile applications strive to customize users' experience during online shopping, based on certain parameters. The optimum fulfillment and routing of customer inquiries and purchase orders in the context of modern e-commerce and physical retail infrastructure remains a challenge for retailers and customers alike. Consequently, customers often encounter problems such as, delay in product delivery, prolonged waiting time before the order is processed, inappropriate routing of the customer's requests, and so forth. For retailers this can mean lower customer satisfaction, negative user experiences and lost sales.

Some attempts have been currently made in the art to enhance users' online shopping experience, but these attempts have generally fallen short of addressing and mitigating the problems specifically mentioned above.

Further, many aspects of e-commerce enumerated above, such as inventory management, logistic issues, SaaS infrastructure, electronic payment tools, etc., are handled by specialty vendors. Most of the current retail transaction systems tackle and serve only a few of these aspects, such as a Customer Application designed to facilitate customers' access to available products for sale, a recommendation engine for tracking consumers' history of navigation and providing appropriate recommendations for products based on certain algorithms, an inventory management server for tracking the available inventory, or a logistics server for tracking shipment of products, and so forth. However, none of the current online retail transaction systems effectively integrates and addresses all of the aspects of e-commerce, commencing from the customers' navigation and ordering of products, to the last mile delivery phase. As a result, conventional systems and services often under-deliver, with respect to accuracy, time or general quality of service. Present e-commerce systems and architectures, especially mobile applications for online shopping, still suffer from awkward design, integration errors, and other fallacies, leading to unsatisfactory customer experience.

Considering the aforementioned problems, a need exists in the art to overcome the current challenges related to order placement, routing and fulfillment within the e-commerce domain, particularly to improve customers' overall experience during the process of online shopping through mobile applications.

SUMMARY

As the e-commerce industry is thriving, many retail service providers at times prefer to route customers' requests to retail stores instead of distribution centers (i.e., warehouses), where multiple retail associates are available for quick fulfillment of those requests. One challenge relates to routing a customer's online request to an appropriate retail store, and related logistical and routing aspects of a given request or order. Often, issues such as the availability of the retail associates/agents, the inventory level/availability of the ordered product at different retail stores, and selection of an appropriate retail store for delivery of the ordered product, based on factors such as the requested mode of delivery of the product and preferred delivery time chosen by the customer, are not taken into account simultaneously by online shopping and customer assistance portals, during the process of delivering services. Consequently, customers often encounter problems such as, delay in product delivery, prolonged waiting time before the order is processed, inappropriate routing of the customer's requests to a retail store where the product is not currently available, and so forth. For example, many of the traditional e-commerce platform dictate order routing to distribution centers, generally, for fulfillment. Only a few of the retail service providers' online platforms support routing of the customers' request directly to retail stores. Second, even in those few cases, at times, customers' orders are often left unattended due to being routed to busy retail associates, or being directed to inappropriate retail stores, wherefrom the delivery of the products may take relatively longer time.

Aspects of the present disclosure are directed to an efficient method and a system for facilitating customers' interaction with retail associates, in a cloud-based, online shopping environment and infrastructure.

According to an aspect, the disclosure provides a method for enhancing customers' online shopping experience and interaction with retail associates, during the process of their interaction with the retail associates through a mobile application locally installed on their mobile devices. The method is implemented in a cloud-computing infrastructure. A Routing and Fulfillment Server (sometimes referred to herein as "RFS") is coupled at a first end with multiple customers' mobile communication devices. The coupling is facilitated through a cloud communication network, over a first wireless communication pathway. At a second end, the Routing and Fulfillment Server is coupled to mobile communication devices of multiple retail associates. That coupling is enabled through a retailer wireless communication access point, over a second wireless communication pathway that is also connected to the cloud communication network.

In some embodiments, a logistics server may be coupled to the Routing and Fulfillment Server (RFS), over the cloud communication network. The method facilitates communication between the customers and retail associates' mobile communication devices, which includes exchange of information and data between the devices. During the process of communication, a customer connects to the Routing and Fulfillment Server, by executing a Customer Application locally installed on his/her mobile communication device. The Customer Application renders multiple user-selectable options on the user interface of the customer's mobile device. The selectable options are selectable from several attributes of different products available for sale. The Customer Application also provides a customer with multiple selectable delivery and shipment options for the products. A transaction request message is received from the customer, by the Routing and Fulfillment Server, which indicates the customer's intention to buy a specific product. The request contains attributes of the product and the delivery option pre-selected by the customer. The Routing and Fulfillment Server routes the transaction request message to one of the multiple retail associates. The method retrieves the current state of availability, the spatial location of one or more of the retail associates, and the current state of availability of the specific product within one or more retail stores. Based on the retrieved data, the method selects a particular retail store, and one of the multiple retail associates currently located within the retail store. A notification is provided to the selected associate, indicating the associate about the customer's transaction request message.

According to another aspect, the disclosure provides a system for facilitating communication and exchange of data between multiple customers and retail associates, in a cloud computing environment. The system includes multiple customers' mobile communication devices coupled to a Routing and Fulfillment Server through a cloud communication network, over a first wireless communication pathway. Each of the customers' mobile communication device includes a processor that is configured to run a locally installed customer application thereon, to connect with the Routing and Fulfillment Server. Further, over a retailer wireless communication access point, multiple retail associates' mobile communication devices are connected to the Routing and Fulfillment Server, through the cloud communication network. Each retail associate's mobile communication device has a processor that executes a Retailer Application locally installed on his mobile device. Also coupled to the Routing and Fulfillment Server, is a retail server, which stores information such as, the different attributes of the retail associates interacting with the Routing and Fulfillment Server through the Retailer Application, and attributes of different products available for sale in multiple retail stores. When a customer executes the customer application, the Routing and Fulfillment Server renders a set of multiple user selectable options on the user interface of the mobile device. The user selectable options include attributes of products available for sale, and selectable delivery options for the products. Once the customer has selected a specific product, the Routing and Fulfillment Server routes a notification indicating the customer's transaction request message to a particular retail store, and eventually, to one of the retail associates/agents located within the retail store. A message comprising a transaction request message including data indicating at least one attribute of a selected product for sale and a delivery destination identifier (e.g. a delivery address or destination forum for the goods) is encoded into said transaction request message. The transaction request message is sent from a customer's mobile communication device, using his or her customer wireless service infrastructure, over the third communication data link, the cloud network infrastructure, as well as said first communication data link, to the RFS. The RFS retrieves information about the current state of availability and the spatial location of different retail associates, and selects a retail associate based on the delivery option for the product pre-selected by the customer and the retrieved information. The RFS is cognizant of the status and location or availability of the selected product for sale in some embodiments. For example, the RFS may receive or retrieve data encoding a physical location of the selected product with respect to the retail store it is in, which may be provided as Product Location Data to the RFS. An instant notification is then provided to the selected associate, notifying the associate about the customer's transaction request message. The notification from the RFS to the selected store associate is provided by way of a RFS Instruction message According to yet another embodiment, the current disclosure provides a non-transitory computer readable medium, having computer readable instructions stored within it. A method is performed when the instructions are executed in a cloud computing environment. The method couples a Routing and Fulfillment Server to multiple customers' mobile communication devices, through a Customer Application running on the customers' mobile device. Further, the method couples a number of retail associates' mobile communication devices to the Routing and Fulfillment Server, through a Retailer Application running on the associates' mobile devices. Data is exchanged between the retail associates and the customers, and the Routing and Fulfillment Server, over a cloud communication network. Specifically, data exchanged between the customers and the Routing and Fulfillment Server includes, attributes of products available for sale, and delivery options available for the products. Data exchanged between the retail associates and the Routing and Fulfillment Server includes the spatial location of different retail stores, and of the retail associates located within the retail stores, the current state of availability of the retail associates, and the inventory status/state of availability of the different products within the retail stores. The method facilitates instant communication and exchange of data between the retail associates and the customers, based on the exchanged data. Specifically, intending to buy a product, a customer initiates a transaction request message over the Customer Application, by selecting one or more attributes of the product and a preferred delivery option for the product. On receiving the transaction request message, the RFS retrieves the current state of availability of the retail associates, and selects an associate based on the pre-selected attributes of the product, the preferred delivery option, and the availability status of the retail associates. In an embodiment, the RFS queries the state of affairs at one or more retail stores, for example for inventory confirmation at a retail store or for scheduling information regarding a selected retail store associate (a duty state of the associate). In another embodiment, the RFS relies on stored information in the RFS or in a database coupled thereto to ascertain such answers regarding the selected product or the selected retail associate's status. In an example, the transaction request message from the customer mobile communication device is parsed by the RFS and a corresponding RFS Instruction Message is routed to the selected associate containing instructions, requests or information for the retail associate regarding the transaction.

Additional aspects, features, implementations and advantages of the claimed invention will be made apparent from the following detail description of illustrative embodiments that proceed with reference to the accompanying drawings.

BRIEF DESCRIPTION OF THE DRAWINGS

The summary above, as well as the following detailed description of preferred embodiments, is better understood, and is comprehensible, when read in conjunction with the appended drawings. For the purpose of illustration of the claimed invention, exemplary constructions of the invention are shown in the drawings. The invention is not limited to the specific methods and instrumentalities disclosed, however. Those in the art would understand that the embodiments illustrated in the drawings are merely exemplary, and additional components or steps, wherever applicable, can be appended, without departing from the true scope and spirit of the claimed invention. Further, wherever possible, like elements are denoted by identical numbers throughout, in the appended drawings.

DETAILED DESCRIPTION

The present disclosure provides an efficient system and a method for facilitating communication and exchange of data between multiple customers and retail associates working at physical retail stores of a retailer such as a department store, clothing store, toy store or other so-called brick and mortar retail establishment. The disclosure also sets forth using the system and method for the purpose of fulfilling customer' online shopping requests, which involve services and/or products for sale at such retail stores, in a cloud computing environment.

According to aspects of the present disclosure, several pre-determined parameters are used to process customers' requests to buy different products, which are routed to the most feasible distribution center/retail store carrying the products. The transactions may be routed to a given retail associate on duty in a selected retail store or distribution center, based on said parameters and programmed rules. The result of this process is improved product fulfillment and order accuracy. This also improves product delivery time and enhancement of the overall customer experience during the process of their interaction with retail associates, starting from the generation of the transaction request message to buy the product, to the last mile phase. Several aspects of the e-commerce supply chain, specifically, the inventory level of the products at retail stores/distribution locations, the state of availability of retail associates located within the retail stores, the spatial location of different items within the stores, and so forth, are incorporated, utilized and effectively addressed by the method and system of the currently claimed invention.

Figure 1:
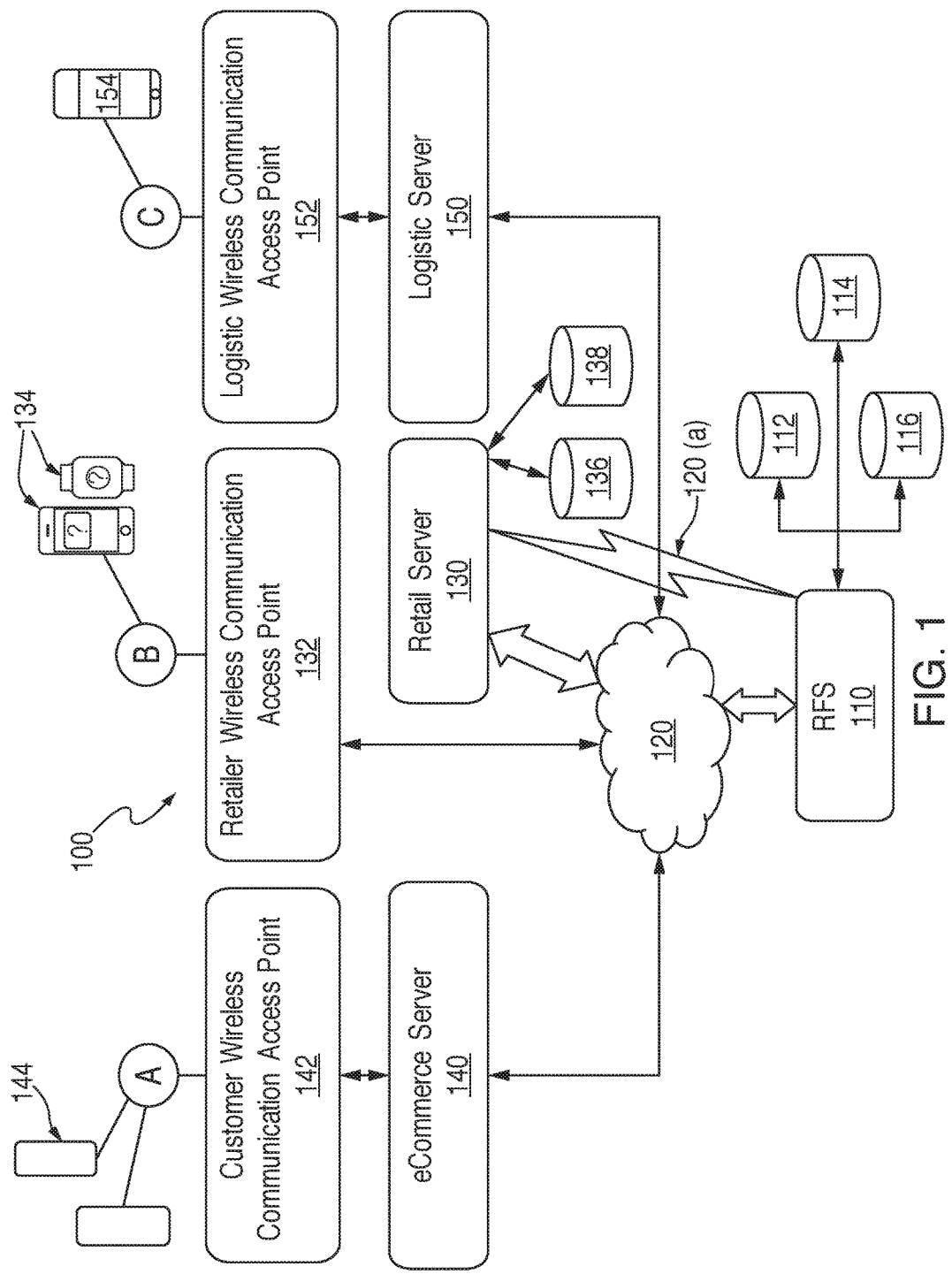
FIG. 1 illustrates an exemplary system and architecture for facilitating interaction between multiple customers and retail associates, for the purpose of fulfilling customers' orders, in a cloud-computing environment.

FIG. 1 illustrates an exemplary system 100, having different components/elements integrated and coupled to one another, for carrying out the different steps involved during online shopping, beginning from a customer's navigation/search for different products made available for sale by a retail service provider, to the final delivery of the products to the customer, according to the present disclosure. As described herein, several variations to the currently illustrated system can be contemplated by those skilled in the art, after review of the present disclosure. For example, the illustrated components/modules and steps, could be either split further into multiple sub-components or sub-steps, or omitted or replaced with other suitable components or steps. Further, several steps/components could be collated into one, as best suited for the implementation of the disclosure.

As shown, the system 100 includes a Routing and Fulfillment Server 110 (sometimes referred to herein as a RFS), coupled to several other components of the system through a cloud communication network 120. The Routing and Fulfillment Server 110 is a cloud-based server, configured to facilitate access to a shared pool of resources, by the components of the system 100. Those skilled in the art will appreciate the nature, various configurations and operation of the Routing and Fulfillment Server 110, which can vary based on parameters such as the volume of data required to be stored and processed, the retailer's scalability requirements, and the anticipated load or traffic over the cloud network.

The RFS may comprise a server computing system, or equivalent or adaptation thereof, including a processing circuit, processor, or hardware configured to transform data based on executed instructions running in said processor or hardware circuitry. For example, machine-readable instructions comprising program code instructions, stored digitally in the form of encoded signals on a suitable medium contain a plurality of instructions forming a computer program or routine. These instructions act on the processor hardware and/or are acted on by said processor or hardware to transform some input stored data, information or signals into an output that differs from said input. Improvements comprising such instructions, data, programs and hardware are contemplated hereby so that if, in an embodiment, an off-the-shelf server machine is used for the present RFS, this server machine is then adapted and configured according to the present disclosure, to achieve the present objects and improvements in the machine and in the system that the machine is connected to. The present RFS is uniquely configured and arranged to accept signals from the other components of the present system, recognize the same, and act on the same as disclosed. The configuration of the hardware and software associated with the present RFS lends it this capability as described in further detail herein. No prior machine, system, or method is recognized that functions as described herein, or that achieves the present transformations of stored input data and output data, signals and other implements. No prior machine, system, or method is recognized to use a machine such as the recited RFS to process data and signals or to cause the effects and improvements recited herein by the present RFS. Likewise, other prior equipment, hardware, software, firmware and systems are not recognized to exist in the present connected and connectable form, to carry out the present steps, or achieve the present objectives.

The cloud communication network 120, can be, for example, World Wide Web or the Internet, Wi-Fi, a Metropolitan Area Network (MAN), Wireless Local Area Network (WLAN), etc. Referred to generally as "cloud" due to its architecture, the network 120 acts as a bridge/platform for communication and exchange of request and response message data between several computing devices interconnected within the system 100.

At the back end, the Routing and Fulfillment Server 110 includes or can be coupled to multiple databases 112, 114 and 116, as shown. Each of these databases may have its own, unique storage capacity, based on the several factors such as, the average load/traffic on the cloud network 120, and the type of information required to be stored in each database. Further, each database may be configured and adapted to store information in the form of tables, queries, instructions, schemas, multimedia representation of the products, customers' data, attributes of retail associates, product prices, etc. Further, the number of databases shown being coupled to RFS is merely for the purpose of illustration and elucidation, and that number may vary. The detailed software anatomy and hardware components of the RFS would be explained in detail hereinafter, in conjunction with FIG. 12 and FIG. 23, respectively.

In an embodiment, database 112 comprises a customer database that stores or encodes information pertinent to customers' profiles and personal data. Examples of such customer information include customer billing details, preferred modes of payment, customer navigation history, the products bought in the recent past, preferred modes of product delivery, etc. Further, customer database 112 may store information pertinent to the customers in addition to those mentioned above. Any appropriate combination of one or more logical and physical database models known in the art may define the logical structure and the manner in which customer data can be organized and manipulated within the database 112. Such a model may be, though not being limited to, a hierarchical model, a flat file model, a relational model, and so forth.

In an embodiment, database 114 comprises a retailer database that stores information or data utilized by the retail service provider (retailer). Retailer information includes but is not limited to, attributes of different retail associates/agents currently working in different retail stores. In an illustrative example, this includes a list of retail associates (e.g., employees of the retailer who work at a physical retail store location) such as their personal data (their names, age, associate ID, residential address, field of specialization, title, etc.), the shift, working hours of the retail associates, their current state of availability, their spatial location within retail stores, daily load status, etc. Further, retailer database 114 may store information such as the geographical location and address of different retail stores and distribution centers such as warehouses, the inventory level of different products available within the distribution locations, product attributes descriptions, such as their brand names and manufacturer details, product categories, product bar codes, and the exact spatial location of the different products relative to or with respect to the retail stores, or with respect to the Point of Sales (POS) terminal. The specific physical locations above may be presented in the form of a visual map or planogram, current inventory allocation status of each product (such as "Hard Allocated", "Soft Allocated", or "Available for Sale"), quantity available within each store, and so forth.

The product inventory data stored within the retail database 114 is regularly updated, for example whenever the products within the retail stores are relocated, or during the inflow of new stock within the retail stores, or, each time when a transaction is processed at the point of sales terminal of one or more retail stores, and during product audits within stores. In some embodiments, the retailer database 114 may be configured to store several other types of information/data relevant to the products available for sale and the different attributes of retail stores and the retail associates located therein, additional to those mentioned above.

In an embodiment, the Routing and Fulfillment Server 110 is coupled over the cloud-network 120 to a retail server 130, which may be a dedicated cloud server of the retail service provider. Though, in alternative embodiments, the retail server 130 may also be directly connected to the RFS 110 through an appropriate network 120 (*a*), such as a LAN, WLAN or Wi-Fi, a Metropolitan Area Network (MAN), etc.

Through the retailer's proprietary inventory and information management systems and software, that retail server 130 may be configured to store and save several types of information and data within its own internal databases, such as databases 136 and 138. Such information may include, though not limited to, data relevant to the variety of products available for sale within the retail stores, the history of the volume and variety of products sold, product bar codes, their locations within the retail store as retrieved through the retailer's own planogram or mapping software, location and capacity of different retail stores provided by the retailer, inventory level status at the different retail stores, the attributes of different retail associates working in each retail stores, etc. The Routing and Fulfillment Server 110, being connected to the retail server 130, would then retrieve and duplicate such information from these internal databases of the retail server 130, and intermittently update its internal retail database 114 in those embodiments. Database management systems deployed by the retail server and the RFS may also be independent and differentiated from each other. In an embodiment, the RFS 110 polls the retail server 130 at substantially regular time intervals for updated data. In another embodiment, the RFS 110 pulls updated data from the retail server 130 on demand when needed. In yet another embodiment, retail server 130 pushes updated data to RFS 110 at regular time intervals, or whenever there are changes in the data to be updated, or based on some other criterion.

Further, the retail server 130 may be coupled to the other programs, Applications, or hardware servers, such as the payment processing server of one or more financial institutions for payment verification/authentication at the Point of Sales (POS)/cash registers/checkout counters of the retail stores, a search and/or recommendation engine to facilitate searching of the available products online, and for providing appropriate recommendations to the customers based on several parameters such as, customers' history of navigation and buying pattern, newly launched brands, etc.

Though only one retail server 130 is illustrated in the figure, it is comprehended that a plurality of retail servers of the type 130 may be coupled to each other, and eventually, exchange data among each other and with the Routing and Fulfillment Server 110. Each of those multiple retail servers may be located, for example, remote to the others, and store information about the different retail stores within a specific territory, the retail associates working therein, etc. This may facilitate ease of load balancing and distribution of traffic over the cloud network 120. In an embodiment, a plurality of retail servers 130 belonging to a retailer entity are individually coupled to RFS 110 through respective network connections connecting each retail server 130 to cloud network architecture 120. In another embodiment, a plurality of retail servers 130 belonging to a retailer entity are collectively coupled to a central retailer server that handles the needs of the various retail servers 130 and that in turn connects over cloud network architecture 120 to RFS 110.

Database 116 is a logistics database, configured to store logistics information, rules and data, such as, driver logs, state of availability of different drivers for local deliveries, time window availabilities, state of delivery of different products, rules on delivery and distribution of merchandize in different jurisdictions, average delivery time and delivery cost from different delivery centers to destination locations, location/address of different delivery centers, and firms providing courier/traditional shipment services and contracted with the retail service provider, etc.

Each of the aforementioned databases 112, 114 and 116 may have its own, unique form factor and data storage capacity, based on several factors, including the form and the volume of content required to be stored. Those form factor requirements and hardware configurations will not be discussed here in detail.

In some instances, an e-commerce server 140 may be coupled at a front end to several customers' mobile communication devices. However, the present architecture and method may be operated with or without such a dedicated e-commerce server 140. The e-commerce server 140 may be configured to provide infrastructural support for a Customer Application running on the customers' mobile communication devices. In such case, the Customer Application facilitates customers' interaction with the RFS 110, and eventually, with the retail associates located at the retail stores. The Application further supports several other activities initiated at the customer's end, such as navigation through the different products available for sale, selection one or more products, addition of multiple products to a shopping bag, selecting a preferable delivery option for the ordered product, and providing payment details for the selected product. Exemplary details of the Customer Application are further provided hereinafter, in conjunction with figures to follow.

When a customer executes the Customer Application on his/her customer mobile communication device 144, the e-commerce server 140 renders output data on the customer mobile communication device. In one embodiment, when the Customer is connected to the e-commerce server, the Customer Application continuously retrieves data from the server, which is then rendered on a user interface of the customer's mobile communication device 144. Mechanisms proprietary to the operating system of the customer's mobile communication device organize the rendered data on the user interface of customer's device. The details of these processes would depend on the particular operating device as understood by those skilled in the art.

In some embodiments, a customer may also connect to the server over the internet, using a web browser on his mobile communication device, and in such cases, the e-commerce server 140 sends a JavaScript program to the web browser running on the customer client device. As the browser executes the JavaScript program, that program commands the client to retrieve data from the server, which is eventually rendered on the user interface of the customer's mobile communication device. In an example, the user interface is rendered as HTML5 or another HTML page format.

In an embodiment, the e-commerce server 140 may have its own internal databases for storing data supporting the Customer Application. As mentioned earlier, such information may include, customers' personal data and profiles, their navigation history, most frequently bought products, their preferred modes of payment, default payment details pre-stored by one or more customers, customers' billing addresses, etc. Such information, in one implementation, may be in the form of multiple data files, which may be either text or binary files. In those embodiments, the Routing and Fulfillment Server 110 regularly retrieves such data from the e-commerce server 140, and mirrors/duplicates it within its own internal customer database 112. Therefore, e-commerce server 140 is integrated to the Routing and Fulfillment Server 140 in those embodiments. Other embodiments may also be contemplated wherein the front-end e-commerce server may be eliminated, and the Customer devices may directly interact with the RFS 110 over the cloud network infrastructure 120.

Generally, as shown, the Routing and Fulfillment Server 110 is coupled to each of the other servers in system 100, specifically, to the e-commerce server 140, the Retail Server 130 and the logistics server 150 where and when such servers are used in a given implementation. RFS 110 can thus exchange communication messages, instructions, files and data with the other servers 130, 140 and 150, using one or more of several communication protocols known in the art, such as, HTTP, TCP/IP, UDP, HTTPS or other electronic signaling protocols.

In some embodiments, several customers can simultaneously communicate with the e-commerce server 140, through their mobile communication devices 144, as shown. Each of the customers' mobile devices 144 is coupled to the cloud communication network 120 through an appropriate wireless communications access point 142, facilitating communication and exchange of data between the devices 144 and other components/modules of the system 100. A customer wireless communication infrastructure 143 (e.g., cellular data communication system, illustrated further below) may be used in addition to or in place of said customer wireless communications access point 143.

Also equivalently referred to as a 'consumer' or a 'user', each customer is generally an individual entity, intending to buy products available for sale online, by interacting with the RFS 110 through the Customer Application on his or her mobile communication device 144.

Customer mobile communication device 144 is an appropriate electronic communication device known in the art, having hardware capabilities and components required to access Internet through suitable wired/wireless communication ports. Examples of the customer mobile communication device 144 may include, though not being limited to, a smart phone, portable computing device such as a tablet/iPad, a mini-PC, a personal digital assistant (PDA), laptop computer, a wearable computing device, etc.

The hardware components of the customer mobile communication device 144 typically include a processor, also referred to as a central processing unit (CPU), which sometimes has multiple cores configured to execute instructions and perform functions desired by the user or as required by the device's operating system. Further, the customer mobile communication device 144 may include a graphic processing unit (GPU), a radio transceiver, a global positioning system (GPS) transceiver, a memory unit (RAM), a DC electrical power source (battery), and several other hardware components known in the state of the art mobile computing devices. Further, the device 144 may also have a user interface in the form of a display or a touch screen, equipped with hardware buttons and switches, or a pop-up touch-based keypad, or any other similar input/output means to facilitate user interaction with the device.

Equipped with an appropriate wireless communication unit, the customer mobile communication device 144 is capable of establishing wireless communication with other components of the system 100 through a customer wireless access point or wireless service provider (infrastructure) including a provider cellular communication tower, server, etc. In an embodiment, for example, the device 144 includes one or more communication circuits or modules and may include a cellular communication unit (3G, 4G, LTE, etc.) or any appropriate unit based on IEEE 802.11 standards or specifications, or an equivalent communication unit having specifications based on, for example, Wi-Fi®, Bluetooth®, or Zigbee® standards.

Additional hardware and software capabilities of the device 144, configured to establish wired/wireless communication, include a standard protocol stack for transmitting data. The protocol stack may include one or more standard protocol layers, including, an Application protocol layer (configured to define protocols specific to World Wide Web, email, File Transfer Protocol (FTP), etc.), a Transmission Control Protocol layer configured to assign port number to the respective data packets, an Internet Protocol (IP) layer, and a standard Hardware Layer for converting text into radio/network signals.

Wireless communication with the customer devices 144 is facilitated over the first (wireless) communication network or pathway depicted in FIG. 1 by the numeral 'A', through a wireless communication access point 142. The customer wireless communication access point 142 may be a cellular communication tower or radio link, in a case where the pathway 'A' is a cellular communication pathway, or any other local, private or shared IEEE 802.11 standard wireless access point, hotspot, repeater, or any other appropriate wireless communication transponder unit.

In certain embodiments, the first wireless communication pathway 'A' may also be a radio link between the device 144 and a telecommunication service provider's cellular/radio tower. As another example, pathway 'A' may be a local Wi-Fi link at a customer's home or workplace. Further, in other embodiments, the communication pathway 'A' can be a Wireless Local Area Network (WLAN) link, a Metropolitan Area Network (MAN) link, an Ethernet link such as low range Bluetooth Personal Local Area Network (BPAN) (accessible through a suitable Network Access Point (NAP) embedded within the device 144), and so forth. Further, in other embodiments, the customer wireless communication devices 144 may also interact with the other modules of system 100 through the World Wide Web, and in those cases, the interaction is Web-based from the customers' perspective.

On the other side of the system 100, one or more retail associates' mobile communication devices 134, as shown, communicate directly with the RFS 110 over the cloud-network 120, through respective one or more retailer's wireless communication access point(s) 132. As depicted, a second wireless communication pathway 'B' establishes connection between retail associate mobile communication devices 134 and the respective retail access point 132. A retail wireless access point 132 may service one or more retail associates (and retail associate mobile communication devices) at a given retail location.

Each of the retail associates, equipped with a retail associate mobile communication device of the type 134, is located in one of a number of retail stores distributed globally, with some being located remotely with respect to each other, some being located within the same region or territory, and some located within the same retail store.

To facilitate communication between the retail devices 134, and the RFS 110, each retailer mobile communication device 134 is provided with a Retailer Application locally installed thereon. The Retailer Application facilitates retail associates' direct interaction with the Routing and Fulfillment Server 110. Specifically, retailers can obtain and process customers' orders, deny customers' request either in a case where the ordered product is out of stock/not available within the retail store, or when they are currently busy in conversation with other customers. The Retailer Application further enables the retail associate to perform several other functions during the process of handling customers' transaction request message, which would be explained in detail in a subsequent section of the disclosure. Details and outlook of the Retailer Application would also be discussed in conjunction with subsequent figures of the disclosure.

In a preferred embodiment, the retail associates' devices 134 are mobile communication devices, equipped with hardware and software capabilities to access Internet. Such a device 134 may be similar to a customer's mobile communication device in physical form, though not limited to, a smart phone, a Tablet computer, an iPad, a Portable Digital Assistant (PDA), a Laptop computer, etc. The retail associate mobile communication device 134 imparts a retail associate with the liberty to move across different spatial positions within the respective retail store he/she is located in, for the purpose of carrying out retail transactions while being on duty.

In certain embodiments, the retail associate mobile communication device 134 may be a fixed, immobile, wired electronic device, such as a desktop computer. In those embodiment, the retailer wireless communication access point may be alternatively substituted with a suitable fixed communication/access point known in the art.

In some other embodiments, the retailer device 134 may also be in the form of a wearable electronic device, such as an electronic wrist watch having a user interface in the form of touch-sensitive screen display, configured to obtain the retail associate's input or response to a RFS instruction message or in response to a customer's transaction request message to buy one or more products within the retail stores.

Irrespective of the type and form factor of the retailer device 134, the components of the device that would provide infrastructural support to the Retailer Application. For example, the retail associate mobile communication device 134 may comprise a processor configured to execute instructions and equipped with multiple Application Protocol layers running thereon, a Graphics Processing Unit (GPU), a RAM, a GPS transceiver, a radio transceiver, a wireless serial port for facilitating network connection, and a user interface in the form of an LCD, LED, OLED (or other technology) display screen. Several user selectable options/hardware buttons, or soft buttons, which may be in the form of a pop-up screen or any other similar input/output means, may facilitate the retail associate's interaction with the device 134.

In certain embodiments, a retail associate may also carry multiple mobile communication devices 134 simultaneously, depending on factors such as the average load status of the associate, the transactions at hand and the level of responsibility bore by the associate. For example, an associate may wear a wrist watch device for the sake of portability and to have the flexibility to be mobile within the retail store, and may also carry a similar hand-held, a belt worn device or a fixed terminal device of the type 134, for other purposes such as processing the transactions and fulfilling the orders quickly. One or more of the devices devices 134 may also be directly coupled to a point of sale (POS) terminal of the retail store, for receiving order details, processing, checking credentials provided by the customers for payment, with their banks/financial institutions, etc.

The second wireless communication pathway 'B' may be an internal/private network infrastructure of a retail store, or may also be a public network. Examples of the communication pathway 'B' may include, though not being limited to, a Wireless LAN or Wi-Fi, MAN, WPAN, Internet, etc.

The second wireless communication access point 132, may be, for example, a radio link or a nearby cellular tower of a local telecommunication service/cellular service provider within a territorial range of the retail store. Further, within the scope of the present disclosure, the wireless access point 132 may also be any other suitable wired or wireless communication link in compliance with IEEE 802.11 standards and specifications, and the technical details thereof would be easily comprehensible to those in the art.

In some embodiments, the RFS 110 may also be coupled to a logistics server 150 over the cloud network 120, as shown. The logistics server 150 communicates and exchanges data/information with a logistics device 154 through a third (logistic) wireless communication access point 152, over a communication pathway 'C'. Similar to the pathways and communication links described earlier, access point 152 can be any appropriate wired or a wireless communication link in compliance with IEEE 802.11 standards. Further, pathway 'C' can be an appropriate wired or wireless communication channel configured to carry radio signals/carrier waves.

The logistics mobile communication device 154 may be held by, for example, a person (driver/courier personnel) assigned to deliver the ordered products to the customer. The device 154, may be a mobile communication unit within a delivery van, car, truck, flying drone, robot, or any other transportation vehicle that can ship or deliver products. Further, the logistic means may include, for example, manned vehicles for delivering goods, such as ships/cargo planes, delivery personnel delivering items on foot, local courier delivery through any transportation means, etc.

Further, in a preferred embodiment, the logistics device 154 is a portable hand-held device such as a smart phone, having a GPS transceiver or transponder. Further, the device is equipped with an appropriate GPS tracking unit known in the art. The GPS tracking unit continuously transmits its current geographical location (i.e., latitude, longitude, city, state, pin code, etc.) encoded in radio signals, to the logistics server 150. Specifically, the GPS tracking unit may have a cellular, radio or satellite modem embedded in it or coupled therewith, which may both store the device's location in its internal memory, and transmit the location in the form of data packets, to the logistics server 150. Further, to achieve the purpose of the present disclosure, the GPS tracking unit may either be a data pusher, e.g., a 'Beacon', or may also be a data logger in certain embodiments. The location of the device 154 is continuously shared with the Routing and Fulfillment Server 110, over the cloud network 120. Therefore, data relevant to the current status of delivery of an ordered product, and the expected time of delivery, is stored and regularly updated in the logistic database 116 of the Routing and Fulfillment Server 110, and is eventually shared with the customer at intermittent intervals before the product is delivered.

As seen, the three communication pathways 'A', 'B', and 'C', couple the customer, the retail associate, and the logistic personnel, respectively, to the Routing and Fulfillment Server 110, over the cloud communication network, and therefore, facilitate instant online communication and exchange of data between these three entities, in a consolidated/integrated environment. Being at the core of the system 100, the Routing and Fulfillment Server 110, provides infrastructural support for the different phases of e-commerce transactions, through a unified cloud-based environment.

Figure 2:
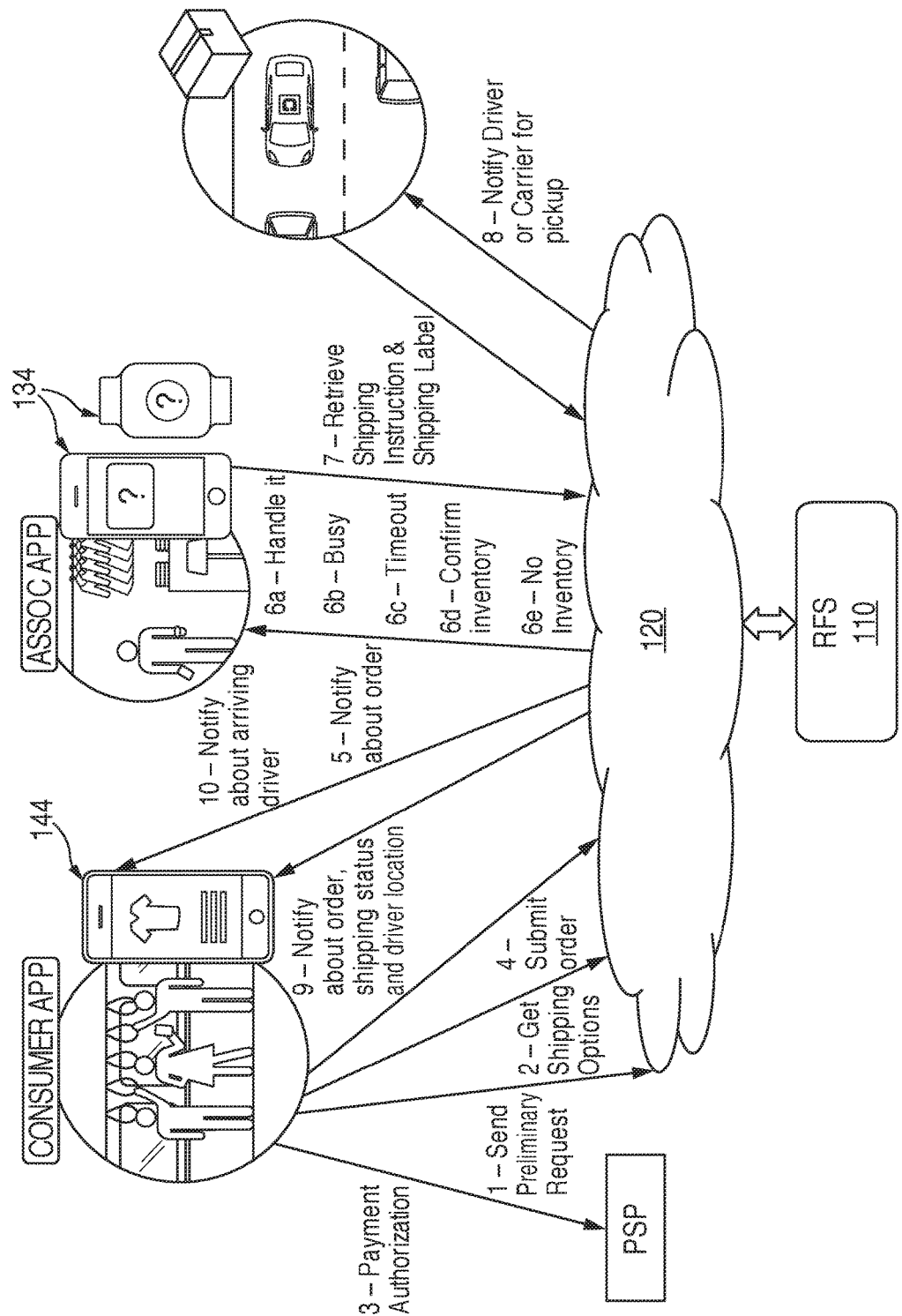
FIG. 2 illustrates a sequential process of communication between the Routing and Fulfillment Server, the logistics server, the retail associates, and the customers, according to an aspect of the disclosure.

FIG. 2 illustrates sequential, enumerated break-down of the different steps involved during an exemplary process of customers' interaction with retail associates within cloud-based e-commerce architecture, in accordance with an embodiment of the present disclosure. The cloud depicted herein, represents the cloud communication network 120 of FIG. 1, and is used in the process of communication and data exchange between the customers and the retail associates.

Technically, within a cloud-based client-server architecture, such communication and exchange of messages/data between the different entities is often referred to as 'request-response' or request-reply' method, wherein a requestor (in current case, the customer) sends a request message (i.e., transaction request message indicating an order to buy a product) to the responder (analogously, the retail associate), and the responder receives and processes the request and eventually, returns a message in response to the requestor. Further, the Message Exchange Pattern (MEP) during the process of communication complies with any standard communication protocol, such, for instance, the Hypertext Text Transfer Protocol (HTTP). I Reference is now made to FIG. 2 which illustrates exemplary steps of a transaction according to the present disclosure. A customer can navigate through different products available for sale online, by interacting with the Customer Application locally installed on a customer mobile communication device 144. The process begins at the step marked (1), where the customer sends a transaction request message to buy a specific product, to the RFS 110 over cloud network infrastructure 120. The transaction request message may contain, for example, data such as the image and the attributes of the product intended to be bought, such as a specific color and size of the product pre-selected by the customer, product's brand name, etc.

At step (2), on receiving the transaction request message, the Customer Application running on the customer's mobile communication device 144 retrieves data from the RFS 110 and renders one or more user selectable options on the customer mobile communication device 144, relevant to different methods available for shipping/delivering the product. For simplicity and uniformity of the disclosure, these may be referred to as 'delivery options' for the product. Such delivery options may include, though not being limited to, a 'Pick-up from Store' option, a 'Deliver to Current Location' option, a 'Ship to Address/Standard Shipping' option, and a 'Local Delivery option'. Other possible delivery options may also be contemplated, such as 'Express Delivery' which may mean a promising delivery within 60-120 minutes of the order receipt, for example. Further, based on the current state of availability of the specific product within the retail stores, the rendered delivery options may vary in different embodiments. For example, in a case where the ordered product is not available within any of the retail stores located within a specific radial range of the shipment address, the express delivery option may automatically not be rendered as a selectable option.

"Shipment Address", wherever being referred to, indicates the address provided by the customer for the delivery of ordered product(s). Such an address may be customer's residential address, current location, office address, or any other address located en-route a journey that the customer is expected to follow nearly after the product is ordered. The delivery destination, address or venue may be referred to herein as a "delivery destination identifier".

Unless specifically indicated otherwise, and as construed within the scope of the current disclosure, the 'Local Delivery Option' indicates the case where the product would be packed and delivered within the same day from a retail store in near vicinity of the shipping address, i.e., within the same city as the customer's shipping address/current location. 'Ship to Address/Standard Shipping' option may include delivery from any convenient distribution location owned by the retail server provider, wherein the product is currently available. Such a distribution location may either be a retail store where retail associates are available to process orders in real-time, or may also be a warehouse or other distribution center from where the product may be directly packed and shipped to the shipping address. 'Express Delivery option' would correspond to the case where the order must be routed to a retail store in nearest proximity to the shipping address provided by the customer, as the product is expected to be delivered within the shortest time (generally, within 60-120 minutes after order receipt). In cases where the customer selects the 'Deliver to My Current Location', the order would be generally routed by the RFS 110 to a retail store spatially closest to the customer's current location, to minimize the delivery time. The customer's current location is determined with the GPS unit in the customer's mobile device or with other location tracking methods.

Referring to FIG. 2, at step (3) the customer confirms the payment details for processing the transaction for the ordered product. To affect that, several selectable payment options may be rendered on the user interface, to facilitate different modes of payment, such as, through a credit card, a debit card, PayPal®, electronic wire transfer, Apple Pay® (in a case where the customer device is an iPhone having compatible hardware capabilities), and so forth. Once the customer has selected a preferable payment method, a third party service, which is a payment service provider (PSP), i.e., the relevant bank or financial institution, confirms the credentials provided by the customer for online payment. Over the internet, the customer would communicate with an internal server of the PSP, which retrieves the customer's bank details and authenticates the details for transaction. Other electronic payment methods are comprehended hereby and would be appreciated by those of skill in the art and could be equivalently used with the present system and method without loss of generality.

Following the payment authorization process at step (3), the customer submits the order to the Routing and Fulfillment Server 110 at step (4). The RFS 110 stores the customer's details in its customer database 112 (shown earlier in FIG. 1). Such details may include, customer's personal data such as the name and the billing address, payment authorization information, the ordered product's attributes, including the product bar code and product's brand name, color and size, product price, quantity ordered, shipping address provided by the customer, and so forth. Such data may be utilized by a recommendation engine of the RFS 110 at a later stage, for providing feasible recommendations to the same customer in cases where he/she connects to the RFS 110 next time.

Generally, each time a specific transaction request message is received by the Routing and Fulfillment Server 110, the attributes of the order placed and the corresponding customer's profile, are regularly stored and updated within the RFS's customer database. Further, a pre-defined format may be chosen for organizing information and data within the customer database of the RFS 110, which may be, for example, in the form of reports, schemas, tables, queries, reports, etc.

At step (5), the Routing and Fulfillment Server 110 routes the customer's order/transaction request message to one of a number of retail stores (or a distribution center), and a retail associate currently located within the store, based on several criteria. Comprehensively, these criteria include a combination of one or more attributes, such as, the state of availability of the retail associates, their current work load status, the current spatial location of the retail associates within the retail stores (especially with respect to the ordered product's location within the store), the spatial location of the retail stores with respect to the shipping address provided by the customer, and the inventory level of the ordered product(s) within the retail stores, which will be explained now in detail.

It should be appreciated that the described and illustrated preferred embodiments and examples are not limiting of the present invention. Those skilled in the art will understand that other variations of the present system components and method steps can be added or subtracted from the present examples or substituted with equivalent ones which are all intended to fall within the scope of the disclosure and its claims.

We use the term "Currently Available" retail associate herein to refer to a retail associate capable of handling and fulfilling a customer's transaction request message/order substantially at the time in which the associate's assistance is required. To affect that, the retail associate should preferably be located within the premises of the retail store, be on duty (working), and should not be busy fulfilling other requests or in a dedicated conversation with other customers at the time he/she is notified of the transaction request message.

"Spatial location of a product" refers to where the product is located, and generally indicates the spatial coordinates of the product with respect to a reference point within the store, or with respect to relative coordinates locating the product with respect to the retail store space. Such a reference point may be the Point of Sales Terminal (POS) of the retail store, the center of the store, a corner of the store, an entry/exit port, or any other alternative reference point chosen for convenience. Such "spatial location" may also be interpreted through a rack and shelf identifier or isle identifier within the store. "Proximity" of the retail store/distribution location, is generally referred with respect to either the shipping address, or the current location of a customer at the time of receipt of transaction request message at the RFS, as applicable. For example, in "Delivery to Current Location" cases, the proximity of retail stores/distribution location is measured with respect to the customer's current location, and for "Ship to Address/Standard Shipping" cases, the proximity is identified with respect to the shipping address.

In a first case, if the customer's pre-selected delivery option is 'Ship to Address/Standard Shipping', then the request may be routed to any store or distribution center (i.e., a warehouse) near the shipping address, wherein at least a first level confirmation on the inventory for the ordered product is available to the retail server 130. That first level confirmation is obtainable through an internal inventory database of the retail server 130, or any other inventory management system/software leveraged by the retail service provider. The Routing and Fulfillment Server further checks the status of the associates within that store, and routes the request to a currently available associate. If the associate does not respond within a pre-determined time interval, then the request may be re-routed on a trial and error basis to another available retail associate within the same store. Further, if none of the retail associates can currently handle the request, it is eventually re-routed to a next store nearby the shipping address, for fulfillment. If the product is not available in any retail store nearby, the request may eventually be routed to a nearby warehouse.

In a second case, if the pre-selected delivery option is an 'Express Delivery', or a 'Local Delivery' option (i.e., product requested to be delivered on the same day), the Routing and Fulfillment Server 110 retrieves a retail store nearest to the shipping address, from its retailer database. Data relevant to the geographical location of different retail store may be organized and segregated in the form their latitudes, longitudes, postal code, city, state, etc., in databases of the retail server 130. That data is continuously synchronized in real-time with the retail server 130, and therefore, is readily available to the RFS 110.

The Routing and Fulfillment Server may further have pre-defined instructions/algorithm stored within its memory and executable by one or more of its processors, to identify and locate a retail store nearest to the customer's shipping address. In an embodiment, at a first level, such an algorithm would segregate the retail store data based on the postal code present within the shipping address. The segregated retail stores relevant to/matching that postal code are further analyzed by the algorithm for a second level analysis, to retrieve the list of retail stores in order of their proximity to the shipping address. In some embodiments, the retail store data may also be directly compared in sequential order with the shipping address, using standard matching algorithms and techniques known in the art. Further, any other alternative techniques conventionally known and utilized by the retail service providers' in-built software may be utilized to retrieve the nearest store, and the technical details thereof would not be discussed in detail herein.

Once the nearest retail store is identified, the RFS routes the transaction request message to one of the retail associates currently available within that retail store. Each associate connected to the RFS 110 may manually set his/her status to 'Available', 'Busy', or 'Away', for example, based on his/her current load/status. Using that status update, the RFS 110 selects an available associate. In preferred embodiments, the RFS 110 specifically selects one among the available associates, though in some less preferred embodiments, a hit and trail approach may also be adopted, and the request may also be routed to any of the retail associates currently located within the selected retail store, irrespective to their currently marked status known to the RFS. In any case, if the selected associate does not respond within a pre-determined time interval, the RFS 110 receives a timeout signal and routes the request to an alternative associate within the selected retail store. In a case where none of the retail associates handles the request, the RFS routes the request to a retail store in next nearest vicinity to the shipping address. In cases where no retail store is found in vicinity to the shipping address, the request may be routed to a distribution center (i.e., warehouse), where the product inventory is available, and from where the ordered product can be shipped within the promised time (i.e., 60-120 minutes for "Express Delivery" and within the same day for "Local Delivery", as the case may be). Those embodiments may, however, require RFS's interaction with the logistics server 150, to obtain average delivery time information from the distribution center. In other cases, where no distribution location is found within a certain radial range of the shipping address, from where the product could be delivered within committed time, the customer may be notified and the order may be cancelled. Further, a traditional shipment option may instead be offered to the customer, where the product would be packed and shipped through a postal carrier service from an alternative distribution center (i.e., warehouse) where the product is available, within 2-3 days of order receipt. Customer's consent would, however, be required, before processing the request as a traditional shipment. If the customer denies, the order may be cancelled and a notification indicating order cancellation may be provided to the customer.

In one implementation, the state of availability of the retail associates available to the RFS 110, is further updated continuously, based on detection of any customer device in near-field proximity to one or more of the retail associates' devices. Any customer device in close proximity to the retail associates' device may be an indication of the fact that the retail associate is serving that customer, which then means that the retail associate is 'Busy'. The retailer devices in those embodiments may be equipped with a conventional Bluetooth Low Energy (BLE) modules, such as an iBeacon® (developed by Apple, Inc.), or any other equivalent Low Energy Device known in the art and capable of receiving and decoding Bluetooth/Radio signals. For being detected, the customer device would also be equipped with a similar Bluetooth Beacon, and would continuously transmit radio signals in the form of data packets, containing pieces of information such as a Universal Unique identifier (UUID), a major, a minor and the Tx Power. Decoding of this information by the retailer's device, along with the identification of the received signal strength, would determine that the customer device is in near field proximity to the associate's device. The retailer device would then communicate with the retail server 130 (shown in FIG. 1) over the retailer's wireless access point, and the retail server would automatically update that retail associate's status as being 'Busy'. That information is then synced with the Routing and Fulfillment Server over the cloud network. Customers' transaction request message would then not be routed to such associates.

In another embodiment, the Routing and Fulfillment Server routes the customer's request to a retail associate, which is currently available and located in nearest proximity to the ordered product within the store. The manner of identifying such an associate is now explained in detail.

The exact spatial location of the retail associates in terms of their (x, y, z) coordinates with respect to a pre-determined reference point within the retail store, which may be the Point of Sale (POS) terminal), are stored within an internal database of the retail server 130. Further, that data is continuously updated in response to the movement of the associates from one location to another within the store.

As the retail associates move within the store, their spatial location is continuously calculated and updated through the use of Bluetooth Low Energy (BLE) devices. In an example, a number of Bluetooth Beacons, such as iBeacons®, are installed at appropriate locations within the retail store, such as the roof corners, designated pillars, etc. The number of such beacons required for the indoor positional accuracy depends on the floor area, size and number of floors available within the retail store. In an embodiment, about six beacons may be sufficient to track the retail associates anywhere within the retail store of about 1600 sq. meters area with a single floor, assuming that each beacon would have an average, minimum unattenuated radial range of about 10 meters, though that number may vary. Each beacon continuously transmits data packets in the form of radio signals at a specific advertising interval (i.e., the frequency) and broadcasting power. Further, the data packet would contain attributes of the signal unique to the beacons, such as their Universal Unique Identifier (UUID), a major, a minor and a transmit (Tx) Power. Each beacon dedicated to the retail service provider shares the common UUID, which is generally a 16-byte string. The major (a 2-byte string) would differentiate the beacons within the same retail store from those in other retail stores. The minor (a 2-byte string) would differentiate the beacons within the retail store from one another. A beacon located at the frontal portion of the store would have a minor string different from that located at the back. Further, the Tx power, indicating the average Received Signal Strength (RSSI) at about 1 meter from the retail associate's device, let's identify the approximate distance of the retail associate's device from a specific beacon. The location and number of beacons installed within the store is such that it enables each retail associate's device to receive radio signals from at least three beacons within the retail store, simultaneously.

A suitable triangulation/trilateration technique may used by the retail server 130 to calculate the exact spatial coordinates of the retail associate (i.e., retail associate mobile communication device) within the retail store, with respect to a reference point. Again, any reasonable may be the Point of Sales (POS) terminal of the store. These spatial coordinates are updated in real-time on the retail server 130, and are continuously synced with the Routing and Fulfillment Server 110 over the cloud network.

The explained use of Bluetooth Beacons is only exemplary, and any other indoor positioning system known in the art may be deployed as a substitute, to affect associates' position determination within the stores. Also, any quantitative examples are merely provided for the sake of illustration, and those skilled in the art will appreciate other equivalent implementations and examples that fairly fall within the scope of this disclosure.

Precise product location, i.e., its spatial coordinates with respect to a reference point, is obtainable using planogram software used by retailers to facilitate access to such information. Another method to determine product location, i.e., its spatial coordinates, is the use of RFID tags and RFID readers throughout the retail store.

With the product location data and the spatial coordinates for different retail associates available to the RFS 110, a distance formula may be used by a processor of the RFS 110, to identify an available associate nearest to the ordered product. Specifically, the processor of the RFS may execute computer-readable instructions stored within the RFS's internal memory, to calculate the distance of each associate from the ordered product, and compare those distances to extract the minimum distance value. The transaction request message is then routed to the identified retail associate.

Mathematically, if there are 'n' retail associates working within a retail store, and the spatial coordinates of each associate are denoted by $(x_i, y_i, z_i)$ [$1 \le i \le n$] with respect to a reference point within the store, and the spatial coordinates of the ordered product within the store are denoted by $(x_o, y_o, z_o)$, then the instructions stored within the processor calculates the following:

$$\text{Min. } [\{i=1 \text{ to } n\}\sqrt{(x_i-x_0)^2+(y_i-y_0)^2+(z_i-z_0)^2}] \qquad \text{Eq. (i)}$$

Referring to step (5), if the selected delivery option is 'Pick up from Store', then the RFS 110 retrieves a set of retail stores convenient for the customer to pick up the product from, and provides the recommendation set to the customer, for obtaining his selection of a particular store from the set. Retrieving such a set of stores may be based on customer's history of purchase at different stores, his/her current location and residential address, the route that the customer is supposed to follow after placing the request, etc. For example, in a case where the customer has a frequent history of purchase/pick-up from a particular store, there is a probability that the store either lies in his/her daily route, or is convenient for the customer to pick the product from, in some context. Such a store may be listed in the top within the set of recommended stores. As another example, if the customer places the order while being at his office, and would like to pick the product on his way back home from the office, then the recommendation set would contain stores en-route, with stores near-by his home address at a higher priority than those closer to his office address. In any case, seeking customer's approval/confirmation is essential at this step, before routing the order to a particular retail store. This leaves the option to the customer's personal convenience, while selecting a specific store for pick-up.

Once the customer has selected a specific store from the recommended set/list, the RFS 110 routes the request to an available associate within that store for fulfillment. Criteria for selecting an appropriate, available associate are same as those discussed above. If the associate confirms manually that the product inventory is not available at that store, an alternative store is provided as a recommendation to the customer, which may be the next store within the recommended set, or any other alternative store particularly determined being convenient to the customer for pick-up. Customer's approval is sought once again, before routing the request to the alternative store. This may be in the form a confirmation message sent to the customer, indicating the address of the identified alternative store. If the customer confirms, the transaction request message is routed to the next store for fulfillment.

In embodiments where the customer finds it inconvenient to pick the product from any of the recommended stores, the order may be cancelled and a notification message indicating request cancellation may be provided to the customer. However, in certain embodiments, before cancelling the order, a 'delivery from store' or a 'traditional postal shipment' may be offered to the customer, as an alternative. If the customer accepts, then the product may be packed and delivered through one of the traditional shipment modes to the shipment address. Else, if the customer denies, the order may be finally cancelled.

Shown at steps 6 (*a*)-(*c*), is detailed interaction of a selected associate with the RFS. Specifically, the RFS 110 renders one or more selectable options on a user interface of the retail associate's mobile device. Such options include, at least an 'Accept' option and a 'Decline' option, through which the associate can manually indicate whether he/she can spare time to handle the request, based on his current load status. RFS instruction messages to the retail mobile communication device may encode information or details taken by the RFS from the transaction request message sent earlier from the customer mobile communication device to the RFS. These options would be more clear in exemplary snap-shots of the Retailer Application appended to the current specification, and explained below. The retail associate's selection of the 'Accept' option confirms to the RFS 110 that the retail associate would handle the request, through a corresponding response message data that is transmitted over the cloud network to the RFS. Similarly, selection of the 'Decline' option would indicate to the RFS 110 that the selected associate is currently busy in conversation with other customers, or is unable to handle the request due to other plausible reasons. On receiving a denial, the RFS 110 automatically seeks and routes the RFS instruction message to another (or next best suited) retail associate within the selected retail store. In an aspect, the retail associate mobile communication device can package and send such communications to the RFS through the retail wireless access network and the cloud network infrastructure or equivalent infrastructure, encoded in an "associate response message" from the associate to the RFS. The associate response message is generally responsive to the RFS instruction message sent from the RFS to the associate mobile communication device.

A timer indicating the time lapsed may be rendered alongside the 'Accept' and 'Decline' option, on the user interface of the retail associate's device. The timer indicates the time lapsed since the transaction request message was routed to the selected retail associate. On expiry of a pre-determined amount of time, a 'time out' message may be rendered on the user interface, and the corresponding signal would be transmitted to the RFS 110, over the cloud network. The pre-determined time interval may be within the range of 1 to 1.5 minutes in an embodiment, but variations thereof may be contemplated and are within the scope of the current disclosure.

At step 6 (*d*), if the selected retail associate confirms to handle the request, the RFS 110 renders selectable options on the associate's mobile device, to confirm inventory for the ordered product(s). Such options may be, a 'Confirm inventory' option and a 'No Inventory' option. The retail associate's input would indicate availability or non-availability of the ordered product(s) within the selected retail store, to the RFS 110. If the product is not available, the RFS once again seeks an alternative store nearby the customer's shipping address.

In a preferred embodiment, at step 6 (*d*), the retail associate manually checks the inventory/availability of the ordered products one by one, and provides the confirmation to the RFS 110 accordingly. This may take into account the cases of inaccurate data available within the inventory database and management system of the retail server 130 (shown in FIG. 1). Inaccuracies may be due to unreported thefts of merchandise within the retail stores or other mistakes. Manual confirmation of the inventory from the retail associate may be obviated in some examples, and the RFS 110 may automatically retrieve and solely rely on the inventory level data of the ordered product available to the retail server 130.

At steps (7) and (8), the RFS 110 communicates and exchanges data with the logistics server 150 (shown earlier in FIG. 1) over the cloud network. Specifically, the retail associate obtains the shipping information, including the mode of transport selected by the logistics service provider, the personal details of the corresponding driver, the expected time for picking up the ordered product from the store, and the delivery time estimated by the logistics server 150. Based on that, at step (7), the associate prepares a shipping label/tag for the ordered product, and sticks it to the bag containing the product.

In an embodiment, the delivery personnel (i.e., the driver) is equipped with his/her own logistics device 154 (shown in FIG. 1), having the necessary software running thereon, for communicating with the RFS 110. More importantly, the logistics device 154 has any conventional GPS tracking unit, which would constantly indicate and share the driver's current location with the Routing and Fulfillment Server 110, over the cloud communication network, during the time when the driver is en-route delivering the product. This is used to track the current state of delivery of the product, and eventually, for sharing the delivery status intermittently with the customer.

Further, the RFS 110 also shares the shipping address of the customer (or delivery destination identifier) and the quantity of products ordered (number of units, for example), over the logistics server 150, with the logistics personnel, well before the personnel arrive for picking up the product from the store. This allows the logistics personnel to decide the transportation vehicle to be used, and to plan the appropriate itinerary for delivering the product within the prescribed time frame, based on his/her own requirements and procedures.

In an aspect, the RFS 110 communicates with the customer device over the front end Ecommerce server 140 (depicted in FIG. 1), sharing the current status/progress of the product/item to be delivered. Such information may be rendered in the form of a locational map indicating the current location of the driver with respect to the shipping address, along with secondary information such as the time further required before the product is expected to be successfully delivered. Further, shortly before the expected delivery, which may be, for example, fifteen minutes prior to the driver's arrival at the destination, the logistics server 150 may send a notification to the RFS 110, which is then eventually shared by the RFS with the customer, over the Customer Application.

Figure 3:
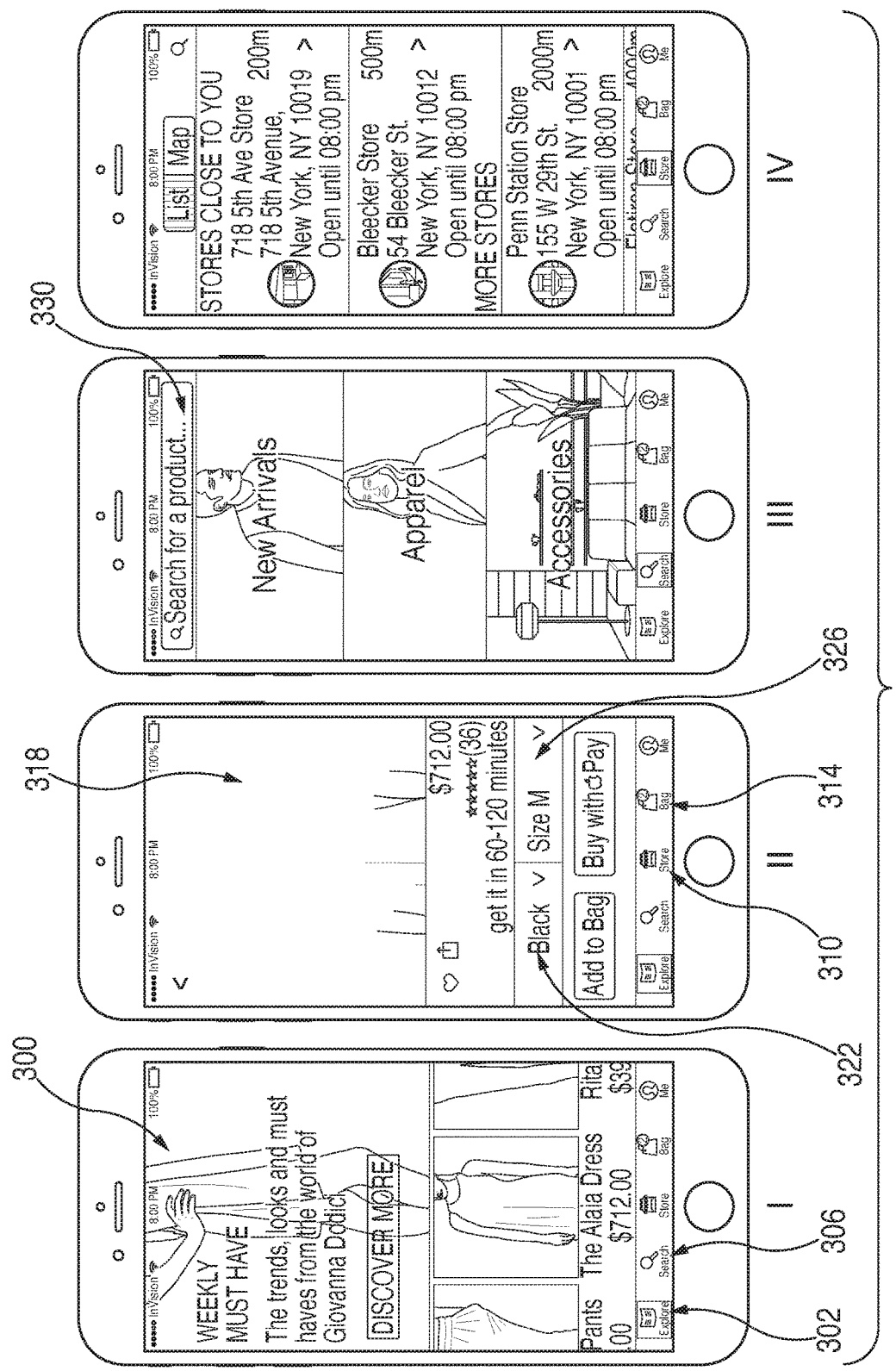
FIGS. 3 and 4 depict exemplary screenshots of the Customer Application executing on the customers' electronic communication devices, for facilitating customers' interaction with the Routing and Fulfillment Server.
Figure 4:
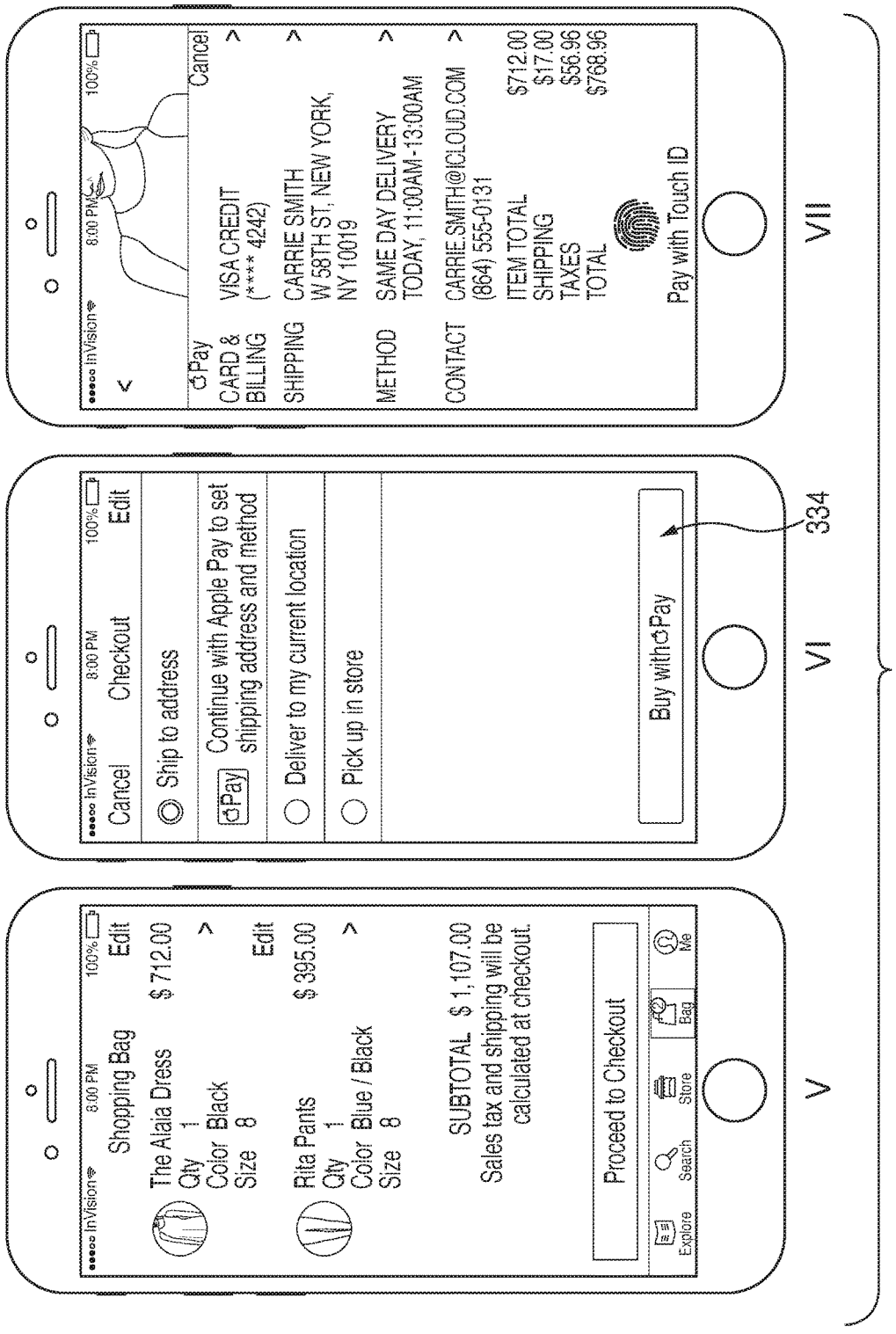

FIGS. 3 and 4 illustrate exemplary snapshots of the Customer Application executing on the customer's mobile device, to facilitate the customers' interaction with the RFS. Shown in FIG. 3, specifically, are four different phases of the user interface of customer device. User selectable options, such as an 'Explore option' 302 for navigating through different products available for sale, a 'Search' option 306 for facilitating users' quick search through keywords, a 'Store' option 310 for locating stores nearby, and a 'Bag' option 314, for users to view the items currently added to the shopping list, are all rendered at a bottom panel of the user interface, in a horizontally scrollable fashion, as shown.

Snapshot I corresponds to the case where a customer has enabled the 'Explore' button 302. As shown, images of the different products available for sale may be displayed in a scrollable manner over a horizontal panel. Selection of a particular product renders an enlarged view of the product over the top half portion of the display screen.

Snapshot II corresponds to a case where a user has pre-selected a specific product. As shown, the rendered information relevant to the product includes the product price, and the minimum time window available for delivery ("Get in 60-120 minutes"). Further, in a horizontal pane right under the bottom of the product image, two selectable options 322 and 326 enable the customer to choose a preferred color and size for the product. When enabled, these options show the variety of colors and sizes available for the selected product, in the form of a scrollable dropdown list.

Snapshot III shows an exemplary view of the user interface once the customer has selected the 'Search' button 306. A search field 330 is rendered over the top of the interface, to obtain users' queries in form of simple search strings/keywords. Further, customers may also search within different product categories such as, 'New Arrivals', 'Apparels', 'Accessories', as shown.

Snapshot IV shows an exemplary view of the user interface when the customer leverages the 'Store' button 310. The list of stores nearby customer's current location are displayed in a vertical stack, along with their approximate distance from the customer and their complete address. On selecting one of these stores, the user may navigate through and shop products currently available within that store. The information may further be sorted and viewed either as a 'List' or a 'Map', based on customer's preference. This option allows a user to choose a pick-up location so as to pick-up the ordered product him/herself, from a store nearby, as the customer may select a store of his/her convenience and shop products available at that store.

Snapshots V-VII illustrated in proceeding FIG. 4 illustrate the check-out process, once the customer has selected different products for buying, and has finally added them to the shopping bag. As shown in snapshot V, a "Proceed to Check out" tab 334 appears on the bottom panel, which directs the customer to the payment process. Further, the customer can finally view and confirm the products added to the bag, where each product's quantity and selected color and size, are displayed for confirmation. A sub-total value indicates the amount that the customer would be charged for, before proceeding to check-out.

Snapshot VI depicts the multiple delivery options for the selected product(s) rendered to the customer, for obtaining his delivery preference. The customer may select a 'Deliver to my location', 'Pick-up from Store', or a 'Ship to Address' (i.e., Traditional Shipping) based on his personal preference, as shown.

Snapshot VII illustrates an exemplary case when the customer selects to pay for the product using an electronic payment service, e.g., 'Apple Pay', which may be offered to the customer if he/she is an iPhone/Apple device user. Had the customer been using a different type of mobile communication device (e.g., a Samsung Galaxy brand product) he/she could be presented instead with a Samsung Pay option, or other options as appropriate. Therefore, the system may auto-detect the customer's mobile device type and/or operating system, for example offering one or more available electronic payment methods as appropriate. Yet another aspect further provides a quick check-out mode, where the customer may pay using a single click, by authenticating through his finger prints, and the payment would be charged to a default credit card/debit card pre-selected by the user. Payment through other modes, such as an electronic bank transfer, debit card, PayPal, etc., may also be facilitated.

Over the Customer Application, navigation from one page to another, cancelling payments, viewing 'Buying history'/'Purchase History', are all well supported by the data stored within the RFS, and these would therefore, not be specifically discussed in detail. Further, the illustrated views of the Customer Application are customizable in different embodiments, and any alterations are well within the scope and domain of the current disclosure. Several features and tabs may therefore be further incorporated, and such developments may be contemplated by those skilled in the art.

Reference will now be made to FIG. 5 to FIG. 10, which illustrate the different steps involved in detail, in an exemplary method for facilitating customer's interaction with retail associates during the process of online shopping, in a cloud-computing environment, in accordance with the present disclosure. Reference can be made to system 100 of FIG. 1 in the context of the present methods and steps.

As mentioned, an aspect of the present system and method is to reduce or minimize or improve the product delivery time and logistical service to the customer as can be appreciated from the following exemplary embodiments.

Figure 5:
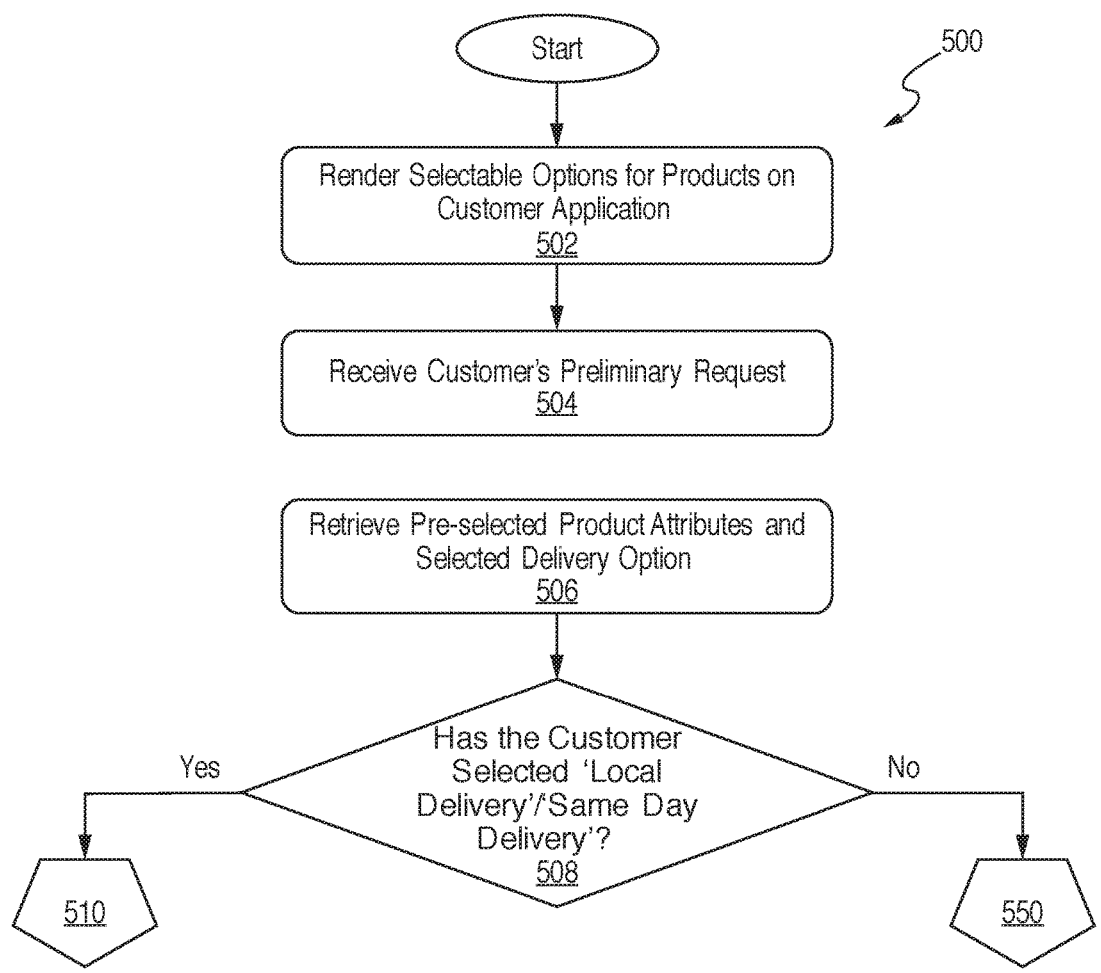
FIGS. 5, 6, 7, 8, 9, and 10 illustrate the different steps involved in an exemplary method for facilitating customer's interaction with retail associates/agents, through the Routing and Fulfillment Server acting as the communication channel, according to an embodiment of the present disclosure.

Referring to FIG. 5, the method 500 starts at step 502, multiple selectable options are rendered for different products available for sale, through the Customer Application executing on the customer's mobile device. Specifically, the Customer Application program retrieves the relevant data from the RFS 110, and renders on the user interface of customer's device. Customers may navigate through these products in different modes, to customize their navigation experience. These options enable the customers to quickly find their favorite items, search for products within dedicated categories, or locate products available at a store of their personal convenience. Alongside the displayed products, other information such as the Product price, and time-frame for delivery such as "Available For Delivery Within 3 Days", "Available for Delivery Within Same Day", etc., "Express Delivery Available", "Available at Your Nearest Store", and so forth, may be rendered on the customer's user interface, based on the product inventory information available to the RFS.

At step 504, a customer selects a specific product, and generates a transaction request message to buy the product. At this step, the customer has already pre-selected a desirable size and color for the product, and the quantity, using the rendered selectable options. He/she may be further required to select one among the available delivery options for the product, before sending the request to the RFS. The request may be sent using the 'Add to Bag' or 'Quick-checkout' option shown earlier on the Customer Application. At this point, the Customer's interaction with the RFS from the perspective of generating the purchase request is substantially over, and the RFS independently interacts with the other entities of the system 100 to fulfill the request in best possible manner.

At step 506, the RFS 110 retrieves the pre-selected attributes of the product, and the selected delivery option. Eventually, at step 508, the RFS analyzes what delivery option has the customer chosen for the selected product and acts accordingly. If the delivery option is 'Local Delivery'/'Same Day Delivery' or an 'Express Delivery', then the method 500 proceeds further from placeholder box 510 which would now be explained further in conjunction with FIG. 6. Otherwise, the method directs to placeholder 550, which directs to FIG. 8 explained below.

Figure 6:
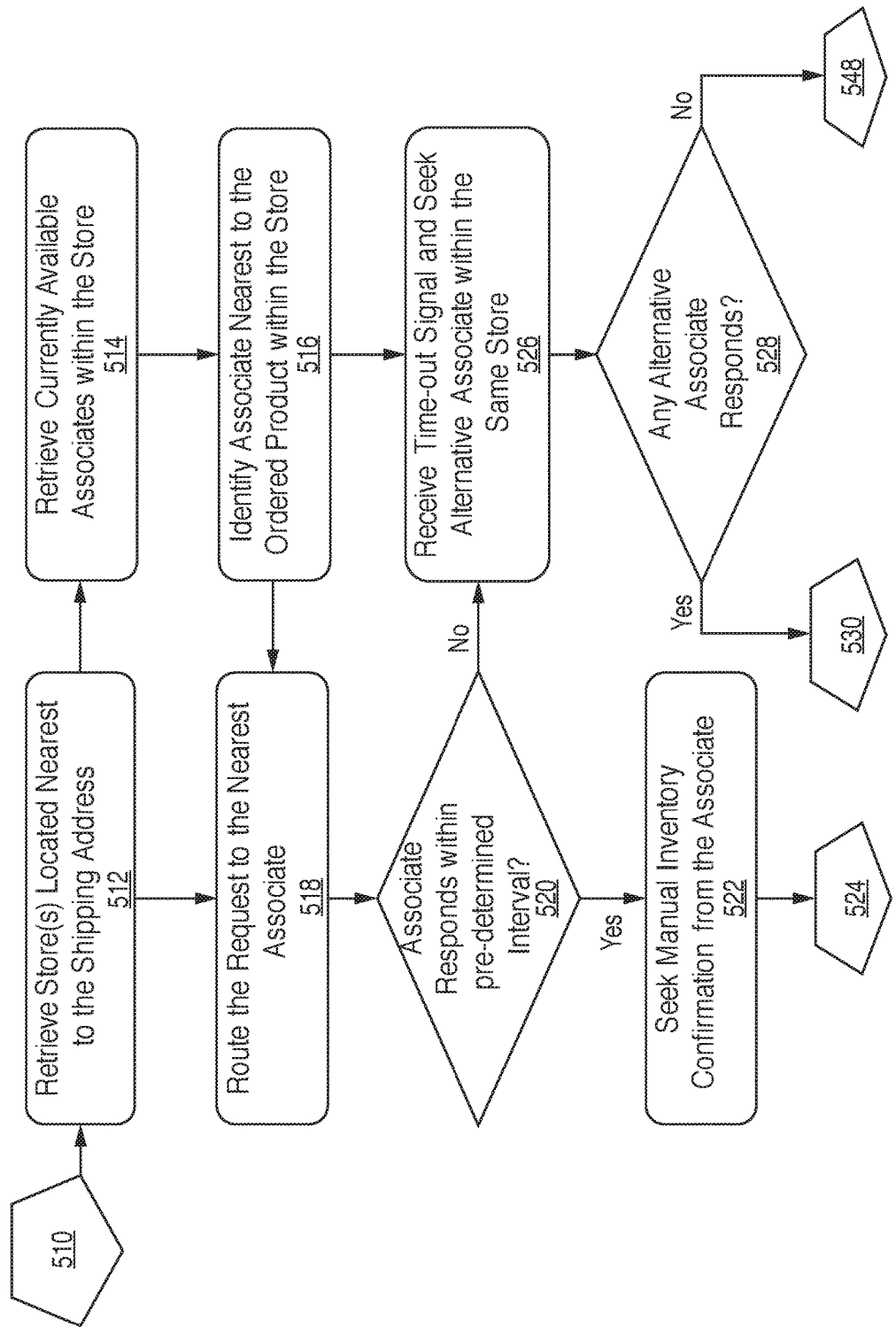
Figure 7:
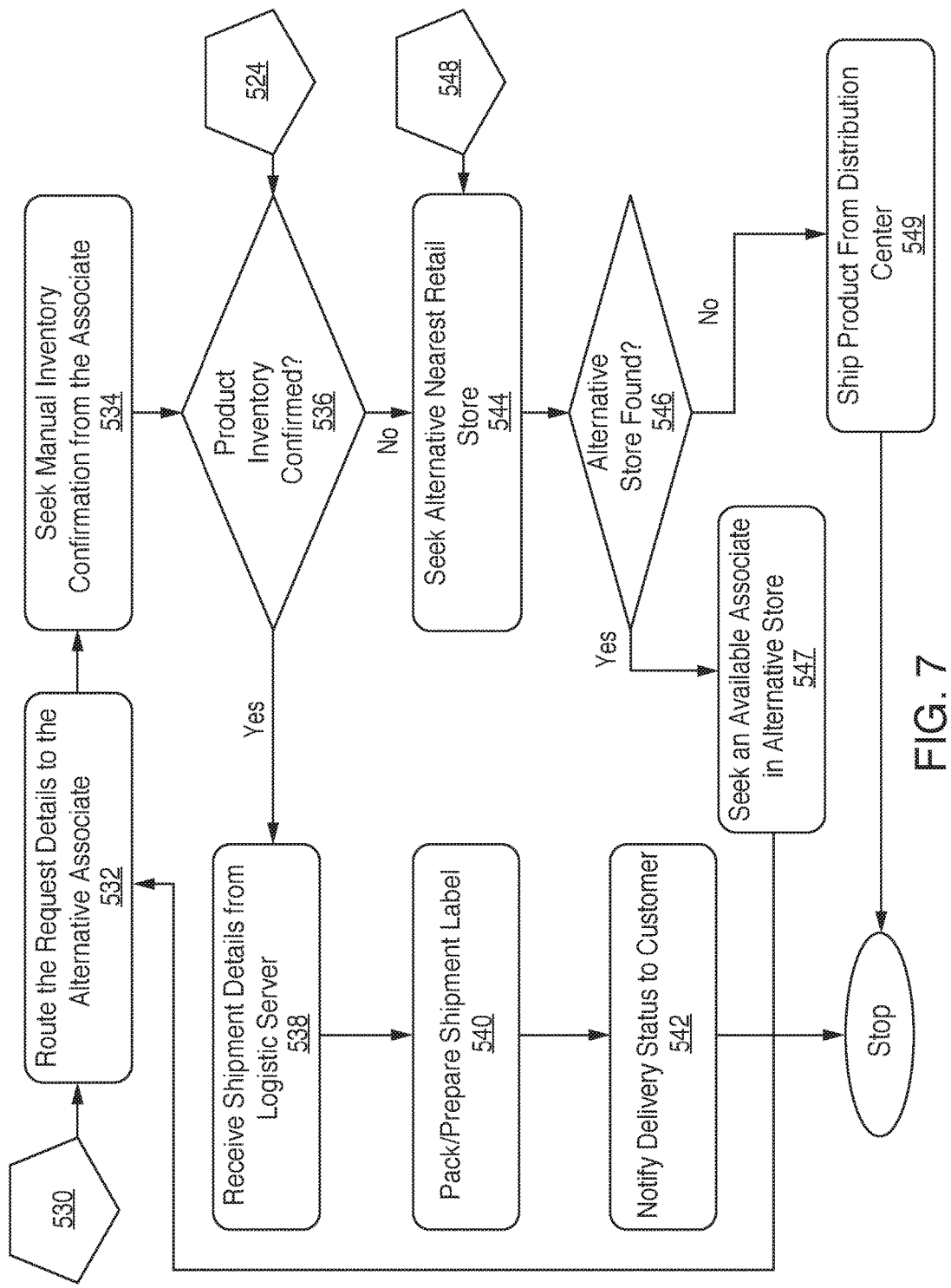

In FIG. 6 now, the method proceeds to step 512, where the RFS 110 identifies a retail store nearest to the shipping address specified by the customer. To affect that, the RFS may, for example, extract the zip/postal code contained within the shipping address, and segregate all retail stores located within a certain radial range (such as within 10-15 km.) of the postal code. Data pertinent to the location of different distribution locations is stored, and is retrievable from a store database of the RFS 110, which would be explained in detail hereinafter. Such stores may then be sorted in the order of their vicinity to the shipping address, to identify the nearest store.

Once the nearest store is identified, at step 514, the method retrieves and segregates the currently available associates within that store. The retail associates may either select their status to 'Busy' or 'Available' based on their current load. Alternatively, the RFS 110 may automatically set each retail associate's status to 'Busy' or 'Available', based on his/her frequency and current state of interaction with the RFS through the Retailer Application. For instance, if an associate has not handled any request within the last one hour, his/her status may automatically be updated as 'Available'. To the contrary, any associate who might, for example, have handled more than four requests in past one hour (high work load case), or a customer's mobile device is found in near-field proximity to the associate's device for a certain time interval, his/her status may automatically be updated as 'Busy' by the RFS. These numbers are merely for illustration, and may vary in different embodiments.

At step 516, from among the currently available associates within the nearest store, the method identifies a retail associate located nearest to the ordered product. The method employed to identify the nearest associate within the store has been explained in conjunction with FIG. 2 earlier.

At step 518, the RFS routes the transaction request message to the identified, nearest retail associate and provides a notification to his/her retail associate mobile communication device. Such a notification may be in the form of a RFS instruction message, from the RFS to the retail associate mobile communication device, in accordance with a suitable communication protocol.

At step 520, the method waits until the retail associate responds. In one implementation, the timer displayed on associate's electronic device sets a pre-determined time period within a range (e.g., 60-90 seconds), though a relatively longer/shorter time interval may also be pre-set, based on the retail service provider's preference. If the associate confirms to handle the request, a manual inventory confirmation for the product within the retail store is sought from the associate at step 522. Otherwise, at step 526, the RFS 110 receives a time-out signal and seeks an alternative available associate within the same store.

At step 522, specifically, the selected associate manually checks the availability of the product within the retail store, in a preferred embodiment. This is to avoid utilization of any erred inventory data for the ordered product available to the inventory database of the RFS, owed due to, for example, thefts at retail stores, or missed out logging of entries for sold products at retail stores. However, in certain embodiments, the manual inventory confirmation step may be avoided, and the RFS 110 may solely rely on the inventory availability data present within its internal inventory database. For example, in cases where enough inventory for the ordered product is present within the store, the probability is substantially low that the product would have been completely sold out at the retail store, and in such a case, the manual inventory confirmation by the associate may not be called for.

At step 528, the RFS waits for the pre-determined interval, until an alternate retail associate responds. The subsequent steps thenceforth would now be explained in conjunction with FIG. 7.

At step 532, the RFS 110 routes the request to the alternative associate, if he/she responds to handle the request. At step 534, manual inventory confirmation is sought once again, from the alternate associate.

If the product inventory is confirmed, then at step 538, the associate communicates with the logistics server over the cloud network, and obtains the shipment information (such as the driver's details and expected time of arrival at the store for pick-up). As mentioned earlier, at this step, the logistics server may communicate independently with the logistic personnel and provide information to the retail associate, over the cloud network. However, in some embodiments, the RFS may also be fully integrated to the logistics server, and may provide the shipment information to the associate directly.

Proceeding further to the steps 540 and 542, the associate prepares shipment label for the packed product, and notifies the customer about the delivery status of the product, respectively, at these steps. Such a notification may be delivered in the form of messages sent to the customer intermittently, to inform the customer about the current delivery status of the product. For example, once the driver has picked the product from the store, the associate may notify the RFS, which may eventually send a text message, such as 'product dispatched from the store' to the customer. During the process of being en-route, the RFS may further display a locational map on the customer's mobile device, indicating the current location of the driver, and the expected time of product's arrival. To affect that, the RFS obtains the driver's location continuously from the logistics server 150 (FIG. 1) over the cloud network, through the GPS tracking unit embedded in the driver's device.

Referring to step 536, if the product is not available in the selected retail store (inventory out of stock), then the method proceeds to step 544, where the RFS 110 seeks an alternative retail store next nearest to the customer's shipping address. This case also stems from placeholder 548, as shown, which corresponds to the case where none of the retail associates located within the first, nearest store, responds to the request (shown in FIG. 5). Proceeding from there onwards, once the alternative, nearest store is found, at step 547, the RFS seeks an available associate within the alternative store. If found, the method traces back to step 532, and follows all the way forward in a similar manner as described above.

In cases where no alternate retail store is found, where a first level positive confirmation of the product inventory is available to RFS 110, the method proceeds to step 549 where the request is routed to a distribution center (i.e., a warehouse). For the purpose of minimizing the product delivery time, such a distribution center is generally, and preferably the one nearest to the shipping address, in cases where several of those are located within a certain radial range of the shipping address. The product may, eventually, be packed and shipped from that distribution center directly. On being dispatched, the customer is notified.

Figure 8:
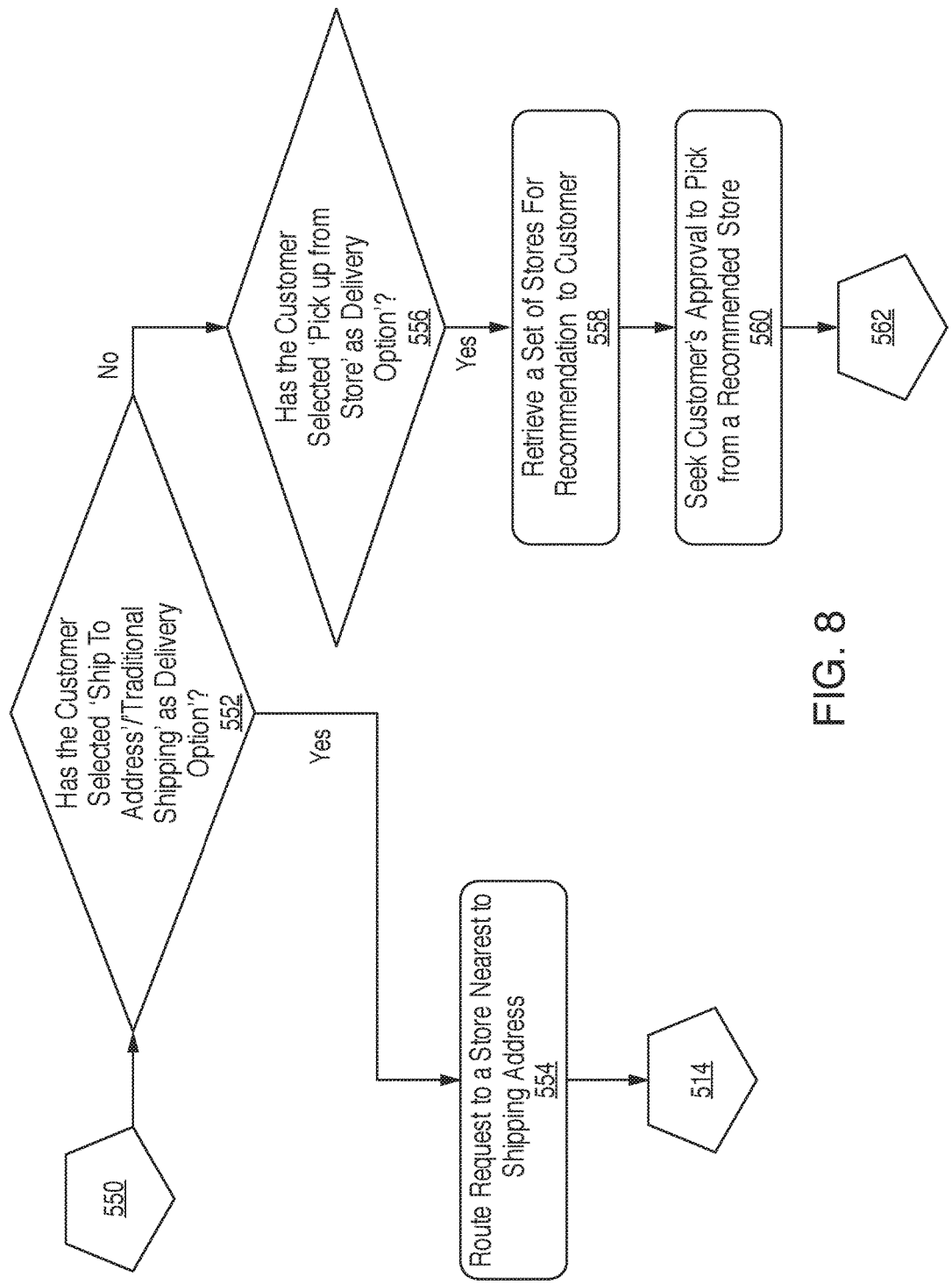

FIG. 8 illustrates a process stemming from continuation box 550 where the customer has selected 'Ship to Address' (i.e., "Traditional Shipping") as the delivery option for the product. In those cases, the request may be routed to any distribution location (either a retail store or a warehouse), possibly near the customer's shipment address, where the product is available. From there, the method proceeds back to step 514 for order fulfillment, as explained earlier in conjunction with FIG. 6.

If the customer has selected 'Pick-up from Store' as the delivery option, as shown at step 556, then the method retrieves a set of retail stores for recommending to the customer at step 558. Such a recommendation set includes stores that are most convenient or feasible for the customer to pick the product from. For example, in one case, if the customer places the order from his office and would like to pick the product on his way back home, then the RFS retrieves all stores located en-route, with the stores located in vicinity to his/her home address being sorted and listed at a higher priority within the recommendation set, in comparison to those nearby his office address. As another example, if a customer has a frequent purchase or product pick-up history linked to a specific store, such a store may be kept at a relatively higher priority within the recommendation set, as there is a high probability that the store may be convenient to the customer in some context. Further, the customer may be already acquainted to one or more retail associates/associates within such a store, and therefore, might like to prefer picking his product from the store owed to that reason. In any case, customer's approval is sought at step 560, to pick the product from one of the stores presented within the recommendation set.

Figure 9:
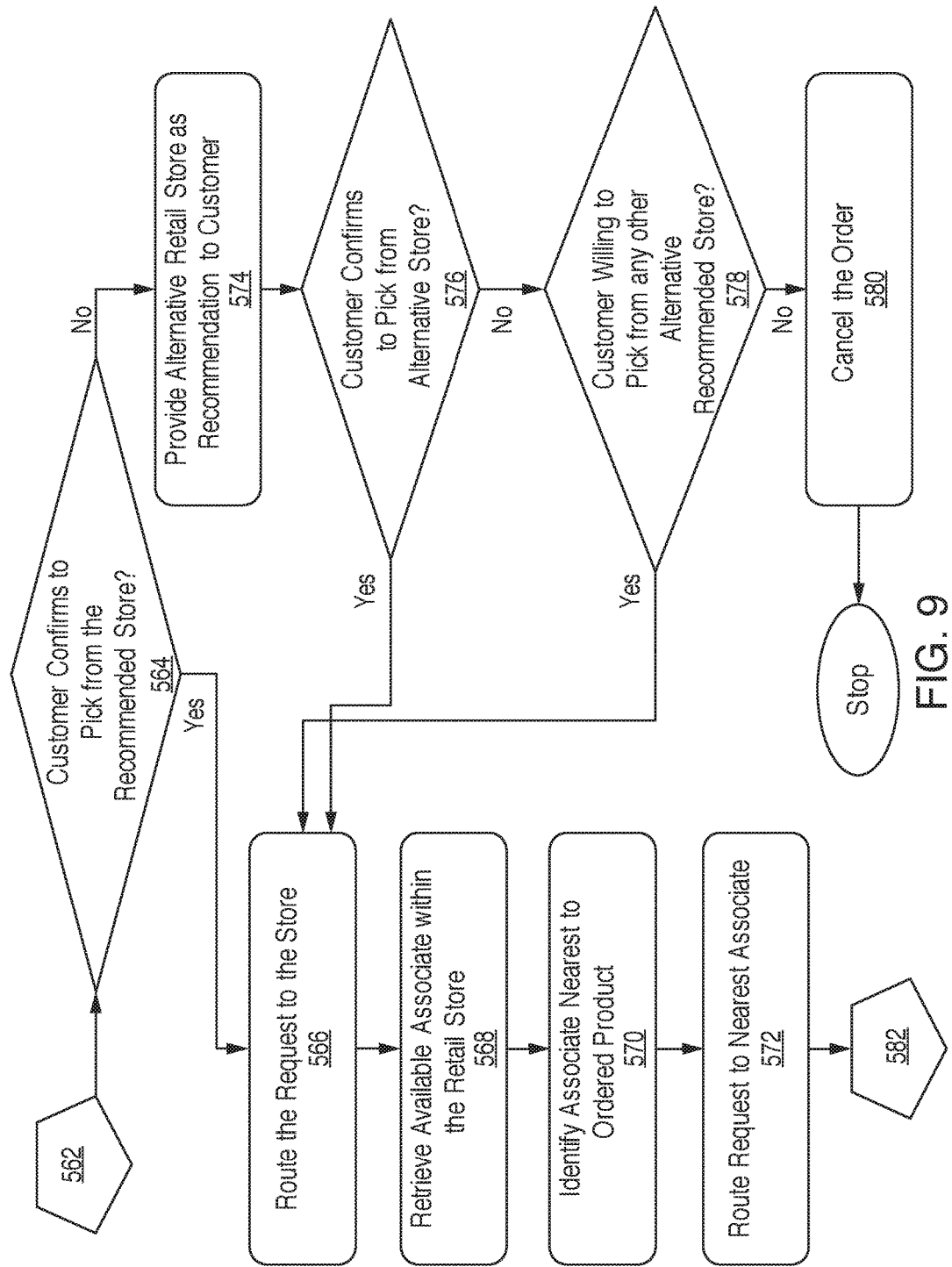

Proceeding now to FIG. 9, at step 564, the method checks whether the customer confirms picking the product up from one of the recommended stores. If that is so, then the transaction request message is routed to that store at step 566. At the following steps 568-572, the RFS retrieves an available associate located nearest to the ordered product and routes the request to that associate for fulfillment.

Alternatively, if the customer denies to pick from the recommended store, then a next alternative store convenient to him/her is provided as a recommendation at step 574. Such a store may be, in an embodiment, the store next nearest to the earlier recommended store, or may also be any alternative store, randomly picked by the RFS from the generated recommendation set. If a confirmation is received, then the steps 566-572 are similarly followed. Else, at step 578, in cases where the customer denies to pick the product from any of the recommended stores, then the order may be cancelled at step 580 and a notification indicating cancellation is provided to the customer.

At step 574, specifically, the recommendation process may be followed iteratively, on receiving customer's denial, until a notification is received that the customer would like to withdraw his/her order. Request messages such as "Seek Alternative Store?" and "Cancel Order", may be rendered by the Customer Application over the user interface of customer's mobile device, to facilitate customer's input at each level of iteration. Obtaining the customer's approval may be through a request message, delivered in compliance with any of the well known standards communication protocols. Further, the request message may indicate the exact location and address of the recommended store to the customer, and may include, for example, selectable 'Confirm to Pick' and 'Deny', option rendered on the user interface of the customer's electronic device. The confirmation steps 564 and 576 are used for the "Pick-up from Store" cases.

Figure 10:
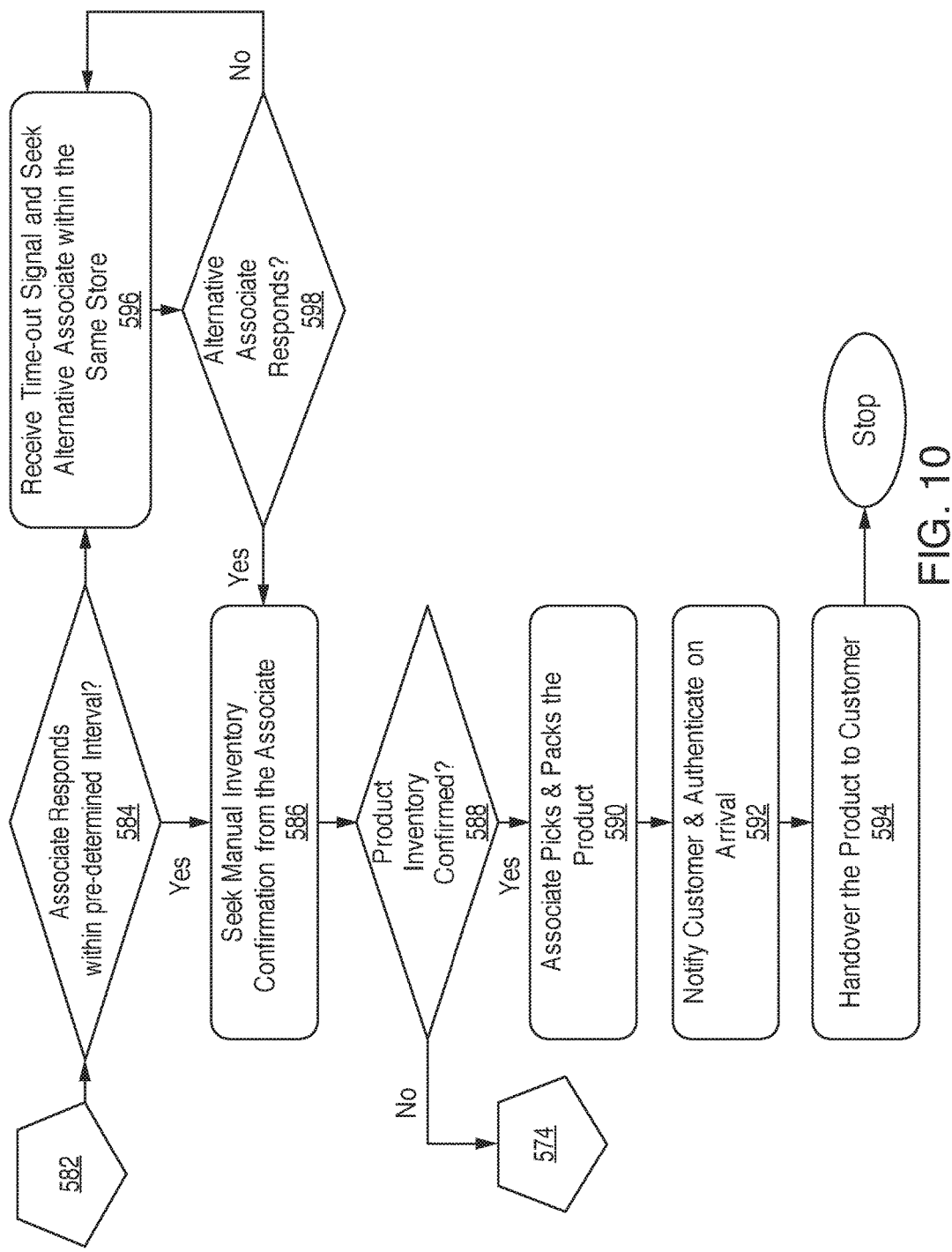

Referring to following FIG. 10, the process of order fulfillment from the store chosen by the customer is illustrated. If the retail associate present within the recommended store responds within a pre-determined time interval, then a manual inventory confirmation is sought from that associate at step 586. If confirmed, the associate proceeds with picking up and packing the product within the store at step 590, and the RFS provides a notification message, such as, "Your Product is now Ready to Pick up from Store XYZ . . . " to the customer, at step 592. Finally, at step 594, the product is handed over to the customer on arrival. Preferably, the customer is prompted to authenticate his identity, before picking the product. To affect that, the RFS may provide an authentication code to the customer after he/she places the purchase request, which may eventually be required to be entered by the customer on associate's mobile device, on arrival. Once the authentication is successful, the product can be handed over to the customer.

Steps 596 and 598 belong similarly to cases where the first associate does not respond within the pre-determined time interval. As in the other cases, the request may be re-routed to alternate retail associates within the retail store, until one of the associates responds to fulfill the request in the RFS instruction message.

Figure 11:
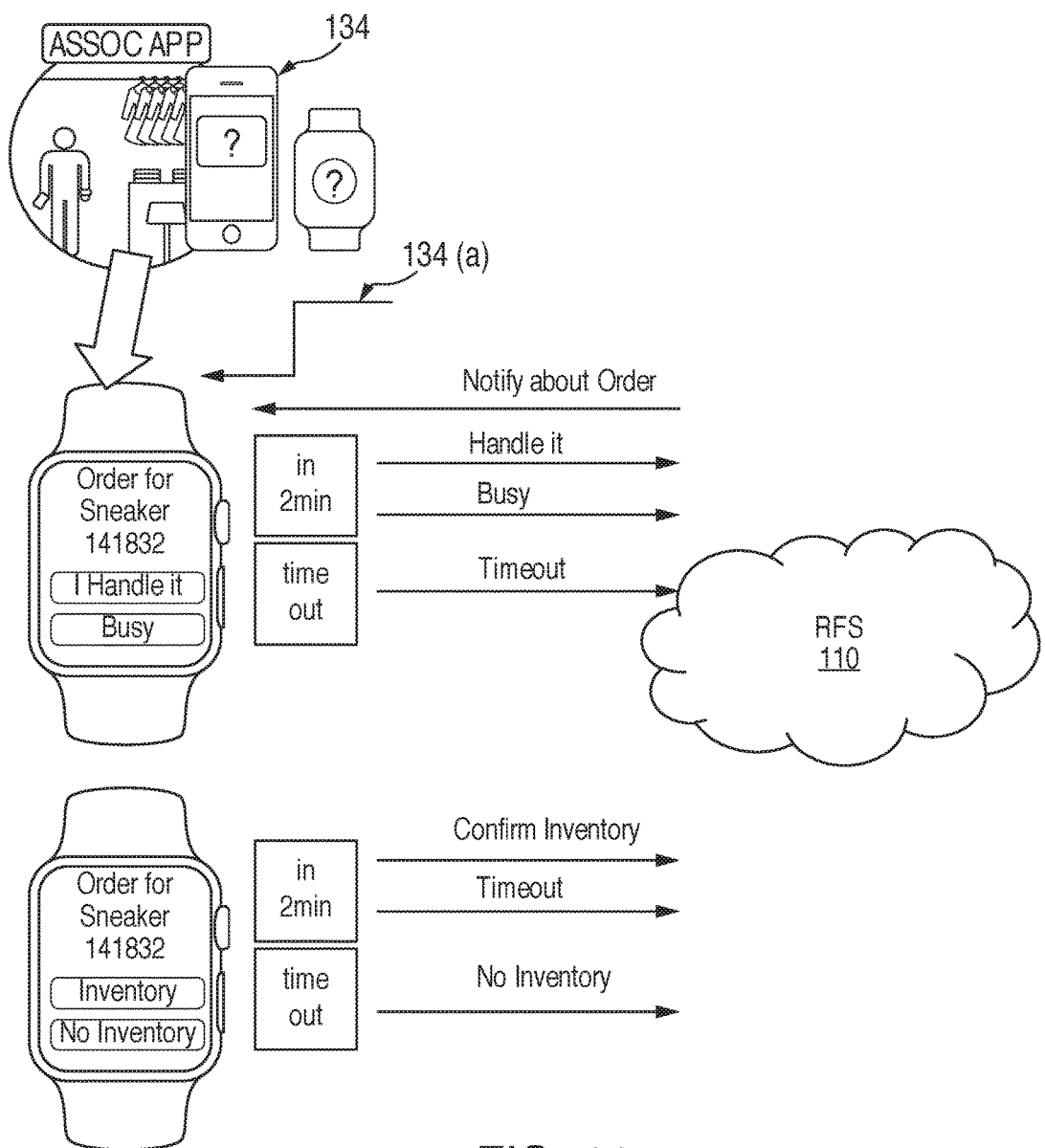
FIG. 11 illustrates an alternative, exemplary form factor for the retail associates' electronic devices, connected to and interacting with the RFS.

FIG. 11 illustrates an exemplary, alternative form factor for the retail associate's electronic communication device, interacting with and coupled to the Routing and Fulfillment Server 110 during the process of order fulfillment. As shown, the associate's device may also be in the form of a wearable wrist watch 134 (*a*), which may be coupled to the mobile device 134 which the retail associate may carry along, in parallel. The wearable device 134 (*a*) may be coupled to the device 134 through an appropriate near-field communication network, such as Bluetooth. Further, the wearable device may have a wireless access port for communication with the retail server and the RFS 110 over the cloud network. Additionally, the wearable device 134 (*a*) may have a user interface in the form of a visual display, which may be any form of display known in the art, such as an LCD, an LED, an OLED (Organic light-emitting diode), a Plasma Display Panel (PDP), an Interferometric Modulator Display (IMOD), etc., or any appropriate touch-sensitive display for receiving user inputs, and thereby, for facilitating user's interaction. Further, the Retailer Application may be co-configured to run both on the wearable device 134 (*a*) and the mobile device 134.

An order indicating customer's transaction request message may be displayed on the user interface of both the devices 134 and 134 (*a*), simultaneously. However, for providing inputs such as a first level confirmation to handle a routed request, and to confirm the inventory of the ordered product within the store, the wearable device 134 (*a*) may be more convenient, though the associate may eventually fulfill the order through the mobile device 134.

As depicted, as soon as an order is routed to a particular associate, he/she may either Handle or Deny it, by pressing the rendered selectable options (Green and Yellow Buttons). If the associate confirms to Handle the request, then the RFS 110 seeks manual confirmation for the product inventory within the store, by delivering a notification having shown selectable options (i.e., "Inventory" and "No Inventory"). Based on user's confirmation or denial of the inventory, the RFS 110 may either fulfill the request or re-route the order to an alternate store, respectively.

Figure 12:
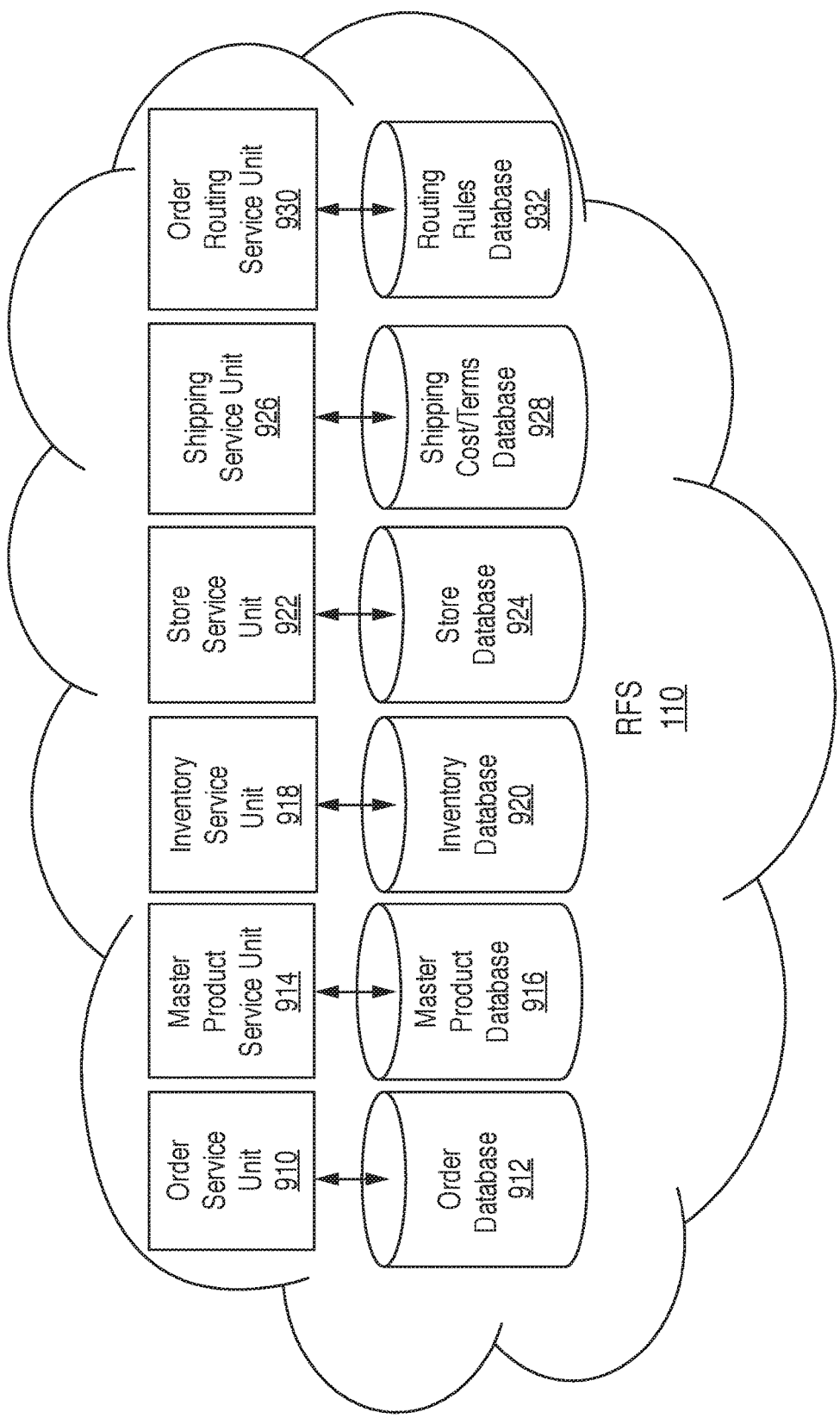
FIG. 12 depicts the detailed software infrastructure and anatomy of the Routing and Fulfillment Server shown in FIG. 1.

FIG. 12 illustrates the detailed interior software components of the Routing and Fulfillment Server 110 according to an embodiment. The RFS 110 may have a microservice architecture, including several independent microservices coupled to their individual databases, and collaborating with each other through appropriate Application Program Interface (API) Gateways. These services are developed and deployed relatively independent to each other. Consistency may be maintained between the different databases, using appropriate database replication mechanisms known in the art. One or more of these services communicate at the front end with the clients (Customers' mobile devices), and some communicate with the retail associates' devices for order routing and fulfillment purposes. The communication may be facilitated by leveraging standard synchronous protocols known in the art, such as HTTP or an asynchronous protocol such as Advanced Message Queuing Protocol (AMQP). Further, these microservices support both the native mobile applications, i.e., the Customer Application and the Retailer Application, running on the customers' and the retailers' mobile communication devices, respectively.

Those skilled in the art will appreciate that the present representation can be modified, so that one or more of these databases may be clubbed together, or one exemplary data store can be further split into further sub-databases. The databases are typically digital memory storage units having addressable memory space. It is possible to keep a given database of stored information in contiguous memory blocks or in distributed address spaces as appropriate.

As depicted, an order service unit 910 communicates at the front end with the customers, receives their transaction request message and processes attributes contained within the request. Corresponding to each order, the order details are eventually stored within the order database 912.

A master product service unit 914 is coupled to the master product database 916, and collaborates with other service units during the process of order fulfillment. For instance, to obtain the shipping cost for a product, the weight and dimensions of the product may be required. The shipping service unit 926 may collaborate with master product service unit 914 through the API gateways, to obtain that information. The master product database contains data about the different products available in retail stores and distribution centers, such as Product ID (which may be an internal product identifier set by the retailer), the GTIN (Global Trade Item Number) for each product, product specific attributes such as the color, size, dimensions and weight of each product, and so forth. The information contained in the master product database is more of generic nature for each product, rather than being pertinent to a specific order.

Inventory service unit 918 facilitates capturing the stock level for different products in retail stores and distribution centers (i.e., the inventory), and reserves inventory for individual items once an order is received, in the inventory database 920. Such a reservation may initially be a "soft allocation" once an order (transaction request message) is received, and the status may be converted at a later stage to a "hard allocation", once the payment confirmation is received from the customer. Further, information about the various distribution centers, including the warehouses and retail store, may be grouped in the form of different distribution channels within database 920, for ease of identification and retrieval of retail stores within a particular area. One such distribution channel may be, for demonstration, the list of all stores and warehouses located in Florida, USA. Segregation of the distribution locations into distribution channels makes the implementation of order routing rules easier. For example, on receiving a particular order, the order service unit may retrieve the postal code contained within the shipping address provided by the customer and pass it on to the inventory service unit, which may then retrieve stores within that area by identifying the corresponding distribution channel, using the postal code.

Store service unit 922 interfaces and operates on the retailer side, and supports data required for facilitating communication between the RFS 110 and the different retail associates. Within the store database 924, information such as the personal data of different retail associates, such as their names, credentials, type of devices they are equipped with, shift timings, daily work schedule, and geolocation within the retail stores, current logging status on RFS, etc. is stored. Further, data pertinent to the different retail stores/distribution centers, their geographical location, store type, store ID, opening hours, etc. is also incorporated within the database 924.

Enumerated by the numeral 926 is a shipping service unit, coupled to a shipping database 928. The unit 926 decides appropriate shipping method for ordered products, based on data stored within database 928. Such data includes detailed information about each shipping method, such as the total shipping cost, the base cost, the geographical range within which the shipping method is available, weight limit for the shipping method, etc. Routing algorithms executed by the processor(s) of the RFS 110 use the shipping service unit 926, for obtaining the most feasible, and cheapest delivery option for the ordered product.

Order routing service unit 930 is integral and core to the claimed invention. The unit includes computer readable instructions, which identify the most feasible store location, and select an appropriate associate within the store, based on available inventory information for the product at the different stores, the state of availability of the associates, their spatial locations within the store premises, and several other factors. The routing rules database 932 acts as the backbone for the order routing unit 930, and has several routing rules stored within it, in the form of computer readable instructions. Though certain rules are standard and implemented throughout the order routing process, some of these rules may be restructured and customized in accordance with the retail service provider's preferences and requirements.

The different databases of the Routing and Fulfillment Server 110, would now be illustrated in the figures to follow.

Figure 13:
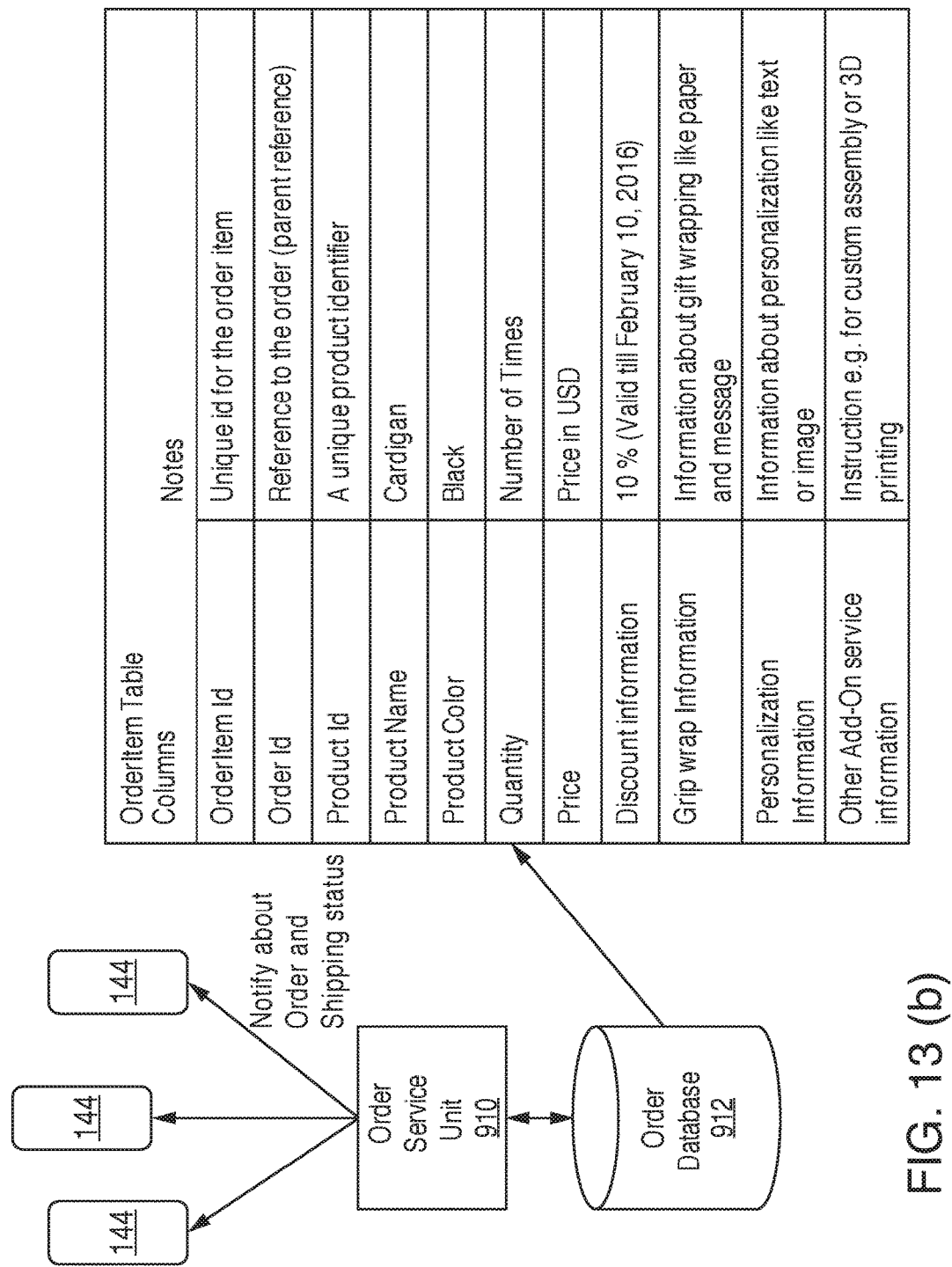
FIGS. 13(a), 13(b), 14, 15(a), 15(b), 15(c), 16(a), 16(b), 17, 18(a), and 18(b) show the interior structure of the different databases configured to store different types of data for supporting the functionality of the Routing and Fulfillment Server.

FIGS. 13 (*a*) and 13 (*b*) illustrate an exemplary order database 912, coupled to the order service unit 910. As mentioned earlier, the order service unit 910 communicates with the customer devices 144, receives customers' orders and processes them.

As shown, the information within the order database 912 may be stored in a tabular format, in an embodiment, though other formats such as tables, queries and schemas may also be used as a substitute, as desired. Further, any suitable database management system known in the art, such as, MySQL, Microsoft SQL server, SyBase, etc., may be used for querying and updating the database. As shown in detail now, the database 912 stores information about the placed orders, such as Order ID, Customer's personal information, billing and shipping address, the Delivery window for the product, ordered product's attributes such as quantity, color, size and weight, etc. The illustrated table serves merely as an example, and should not be construed comprehensive. Therefore, other data fields may also be construed for incorporation in the database.

Figure 14:
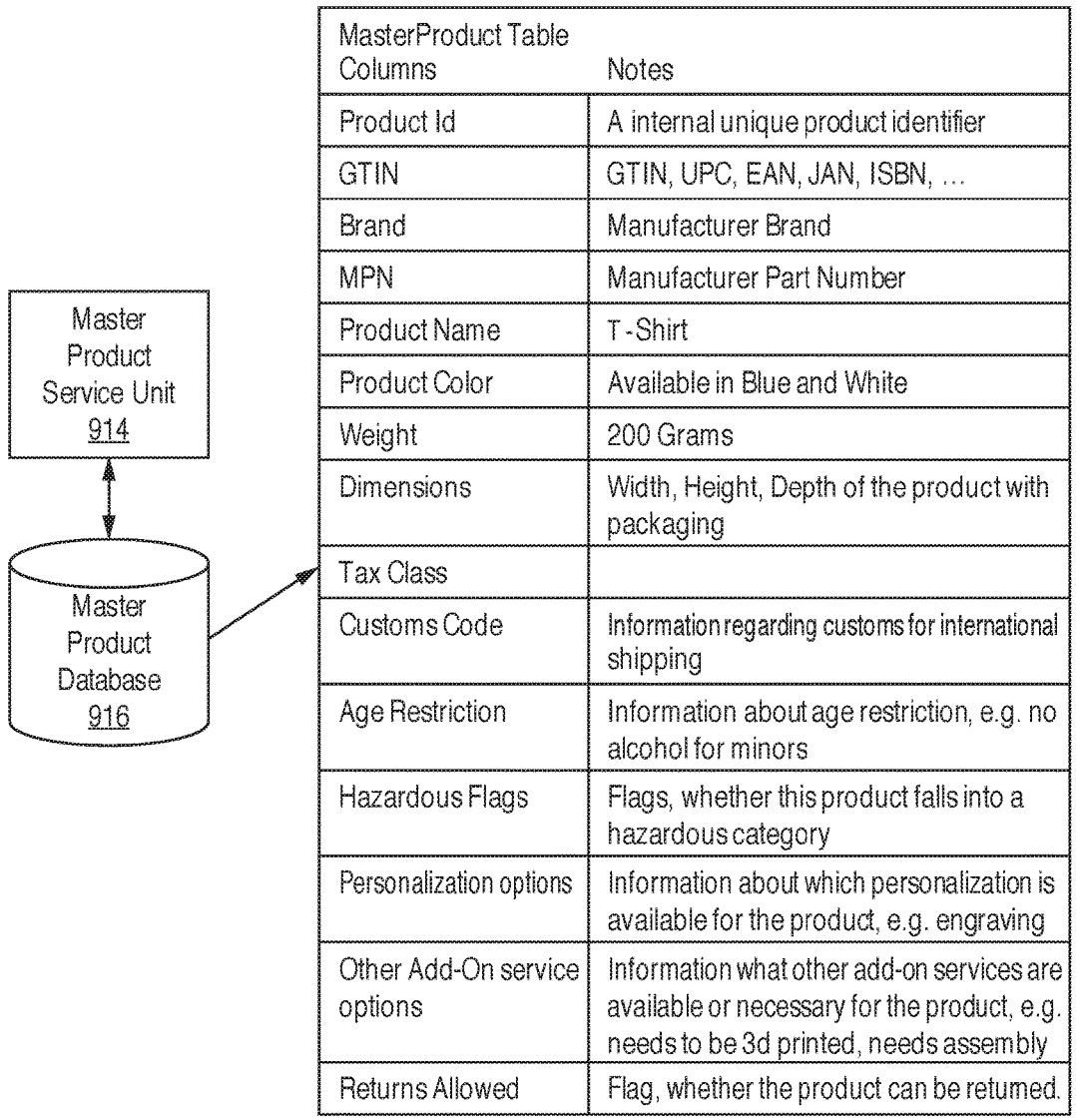

FIG. 14 illustrates the anatomy of the Master Product Database 916. The data is in one embodiment, is stored again in a tabular format, containing detailed information about each product available for sale in different retail stores. As shown, the data cells include, for each product, a Product Identifier, a machine readable bar code for the product (required for processing transaction at the POS), which may be in the form of a such as GTIN (Global Trade Item Number), a Universal Product Code (UPC), or a European Article Number for the product, an RFID Code, product specific attributes such as weight, colors available, Customer code, etc. Several bits of information available in the master product database is often used by the other microservices of the RFS, during the process of order routing and fulfillment.

Figure 15:
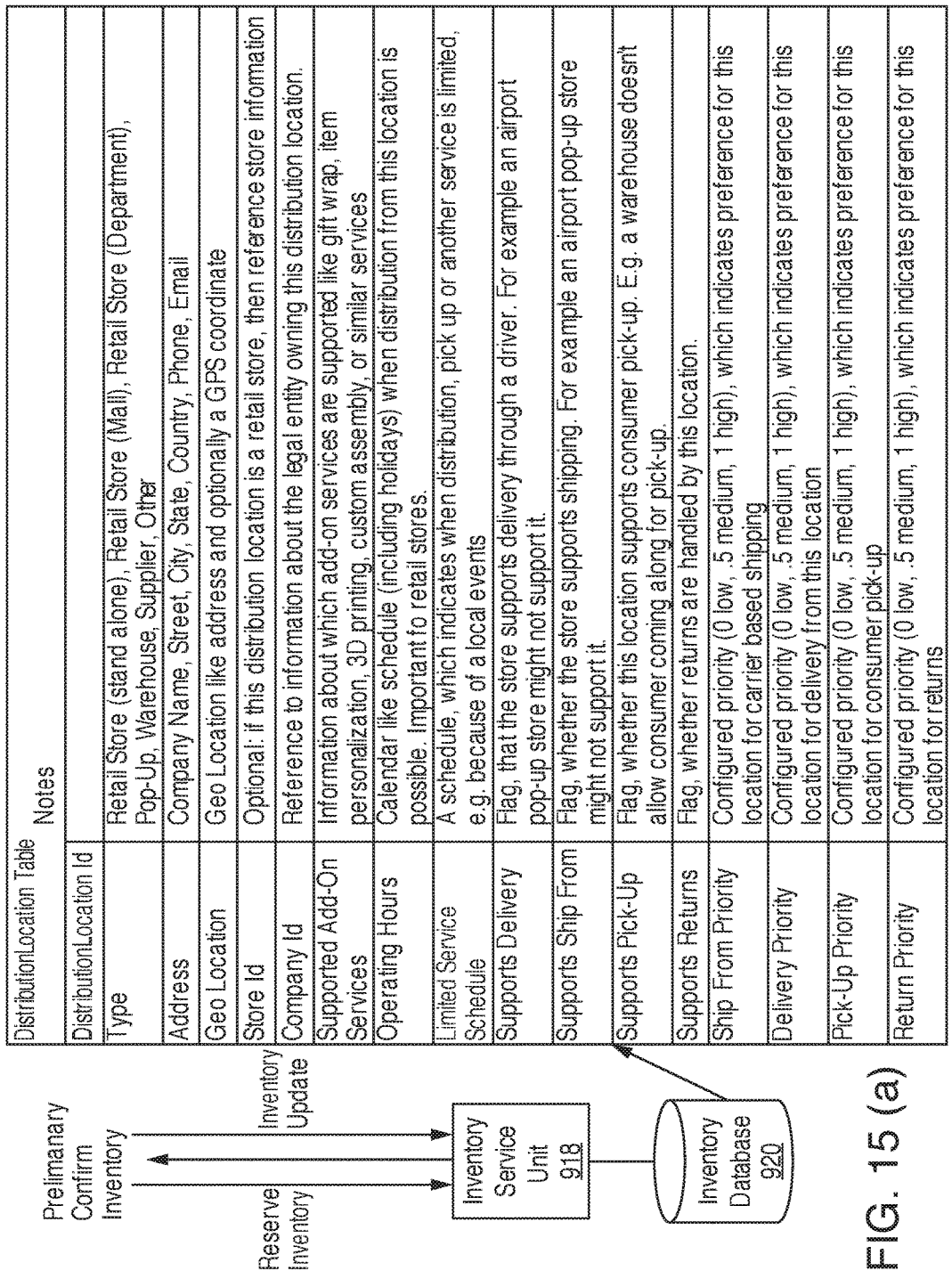
Figure 15:
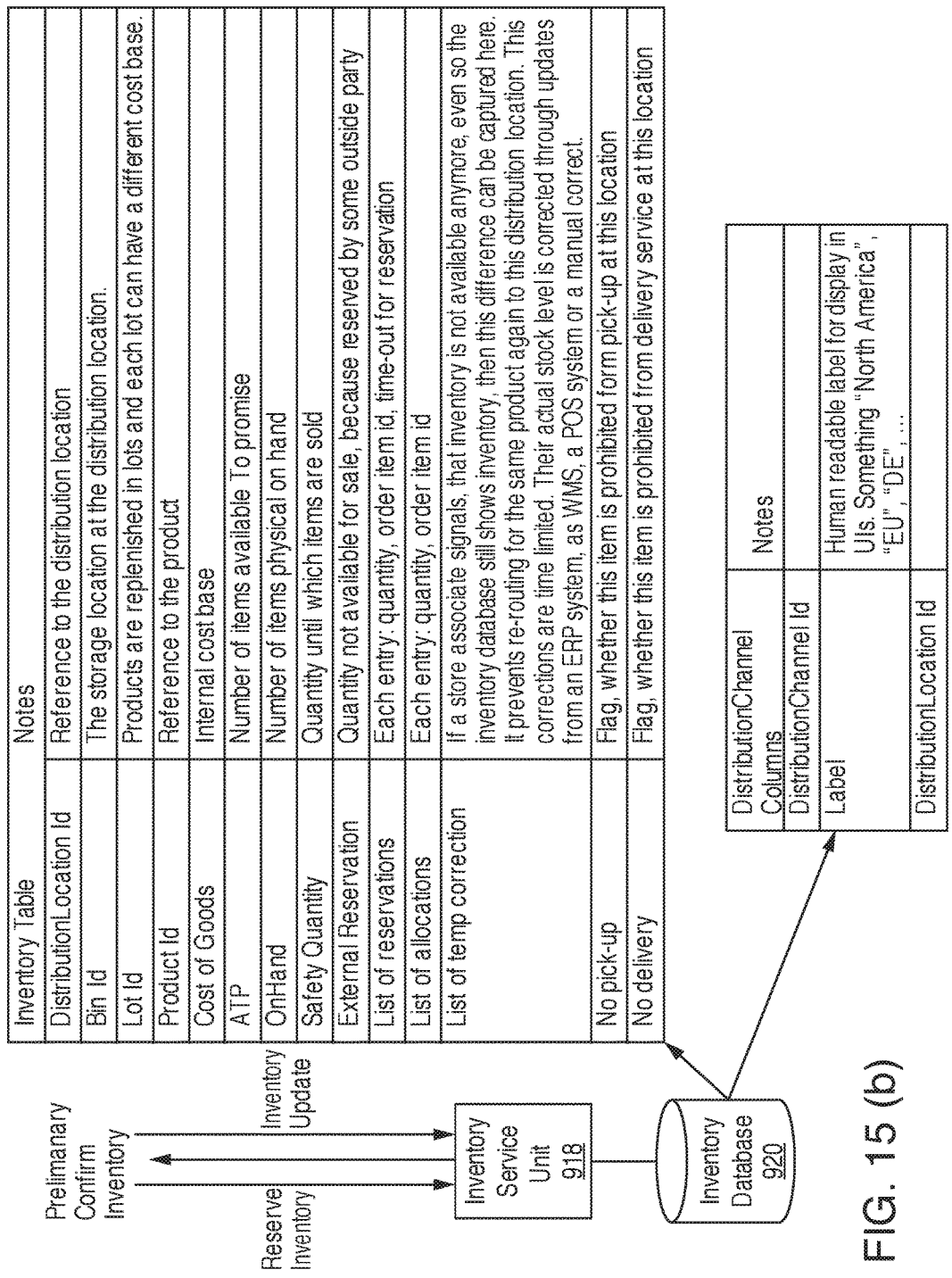
Figure 15:
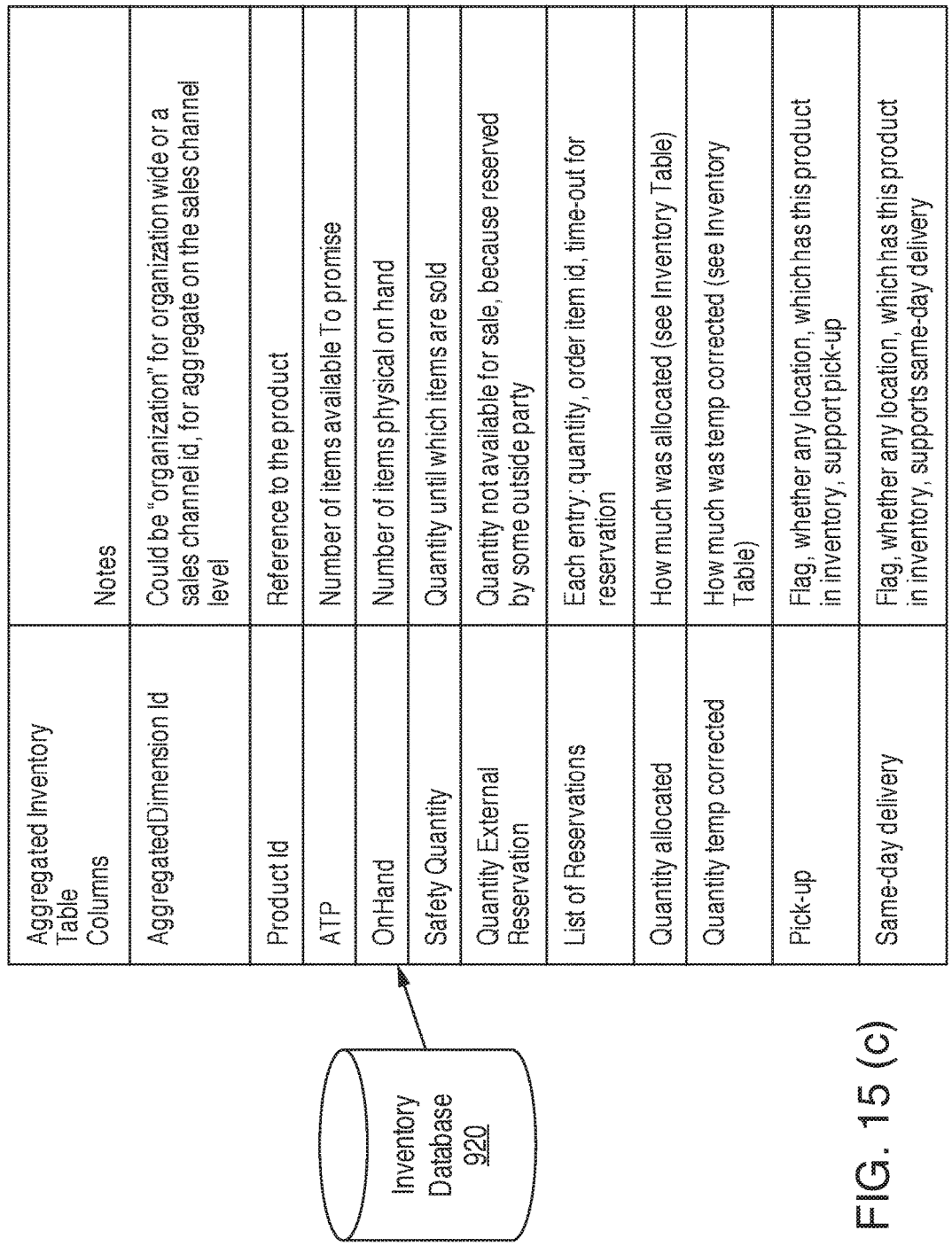

FIGS. 15 (*a*)-(*c*) depict the structure of an exemplary inventory database 920.

FIG. 15 (*a*), specifically, includes a Distribution Location Table, indicating the Location ID for each distribution location, including the retail stores and distribution centers, their address, geographical location (in the form of GPS coordinates), the operating hours, which may be in the form of a calendar schedule indicating the days in the year when the distribution location is closed, the delivery priority of the location, capacity, etc.

Shown further in FIG. 15 (*b*), is an inventory table, where each product is marked with a Distribution Location ID, indicating the area/territory of the store where the product is available, an optional Bin ID that indicates the storage location of the product within the store, such as the Shelf/Rack number/identifier, the exact spatial coordinates of the product within the store with respect to a reference point such as the Point of Sales terminal, state of reservation of the product inventory (for example, currently "Hard allocated" or "Soft allocated" or "available"). Another important attribute in the table is the "TempCorrection", which indicates erred inventory status for some products, arising due to difference between the information available to the internal inventory management system/software of the retail service provider, and the actual re-confirmation of the inventory by a retail associate. These errors are regularly fixed by the Inventory service unit 918, to avoid any falsified indication of the inventory level for the ordered product(s) in future.

Another section of the database 920 is the Distribution Channel information, as specified earlier, and shown for demonstration in the bottom table of FIG. 15 (*b*). Within this table, different distribution centers, including the warehouses and actual retail stores are segregated on the basis of the area/territory they belong to, along with other relevant information, as shown. Store locations within a common Distribution Channel may share a common Location Identifier and may be associated or grouped together with the database.

Further information is stored in the form of an Aggregate Inventory Table shown in FIG. 15 (*c*). This table extracts inventory data from local inventory table for each product, and concatenates that data to form aggregate inventory for each distribution channel. Further, the table has flags indicating which stores within the distribution center support same day delivery/express delivery for different products. That data is essential for cases where customer selects a 'Local Delivery'/'Express Delivery' option specified earlier.

Figure 16:
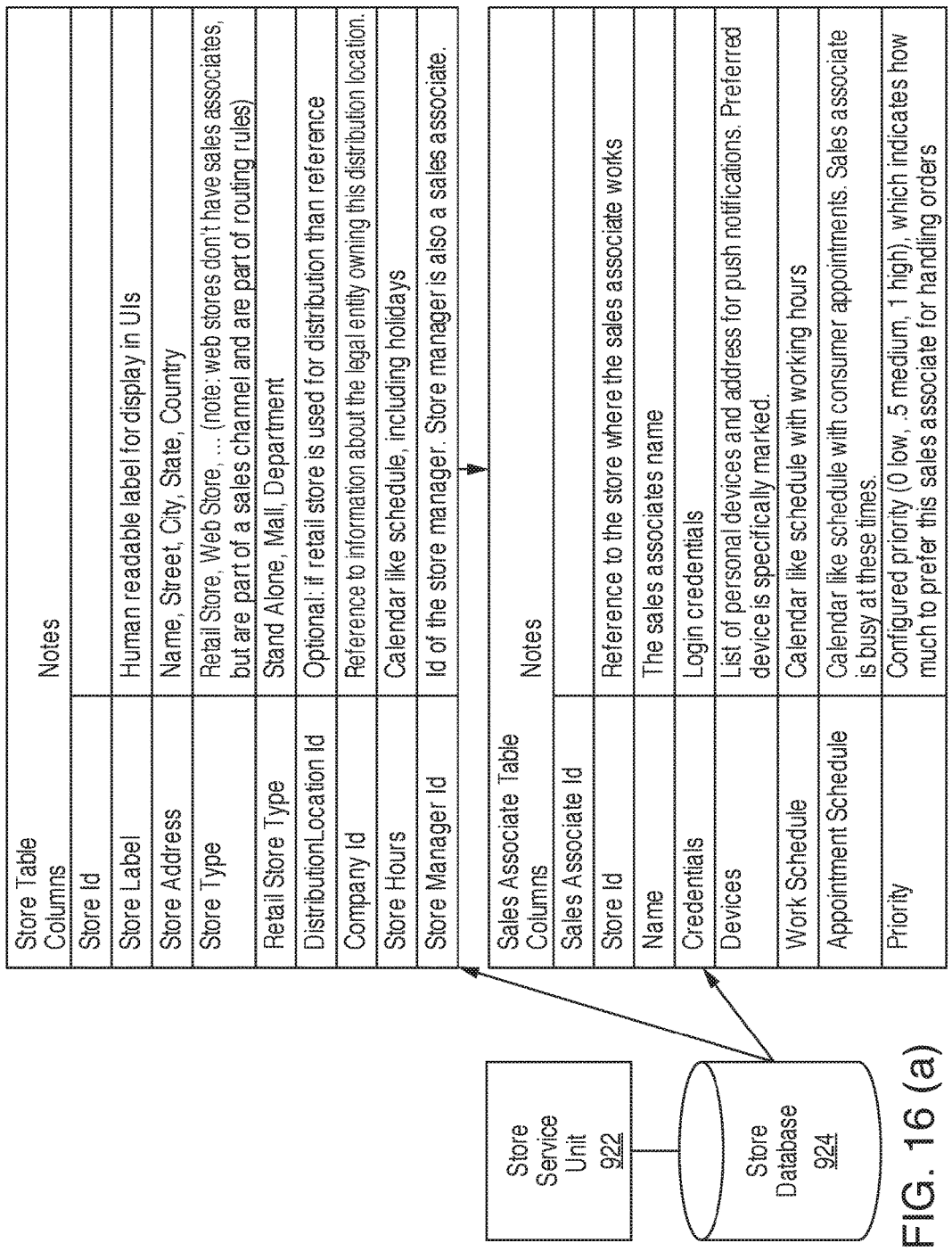
Figure 16:
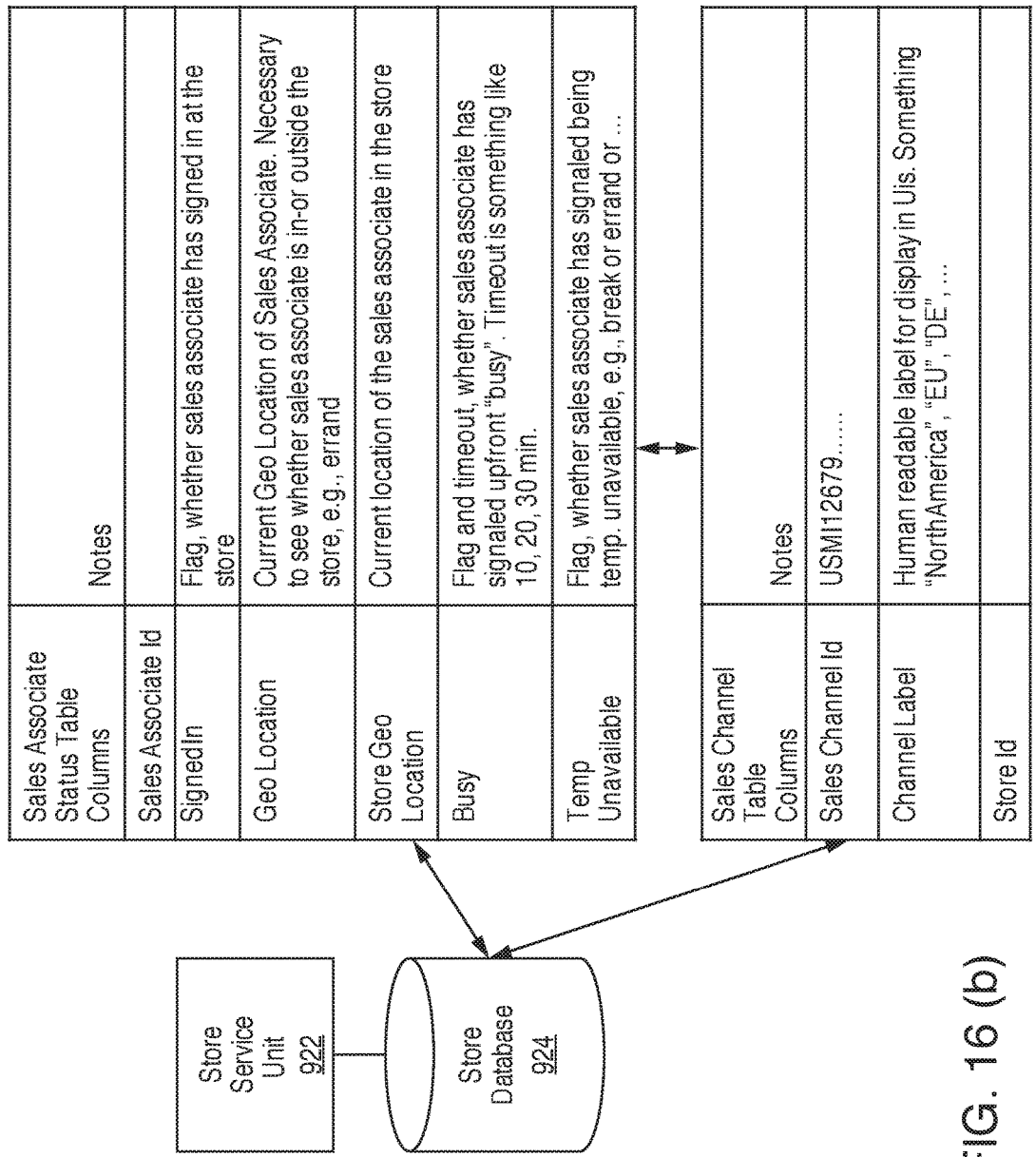

FIGS. 16 (*a*)-(*b*) depict the detailed organizational structure of the store database 924 coupled to the store service unit 922. The database 924 includes a Store Table having specific information about each store, including the Store Manager ID, Store Opening Hours, Store Label and Address, Store Type and Capacity, and so on. Further, a Retail/Store Associate Table incorporates detailed information about all the retail associates within a store, including their shift hours, work schedule, upcoming appointments, their spatial location coordinates within the retail stores, etc. A Status table shown in FIG. 16 (*b*) stores data relevant to the current availability status of the associates within the retail stores.

Figure 17:
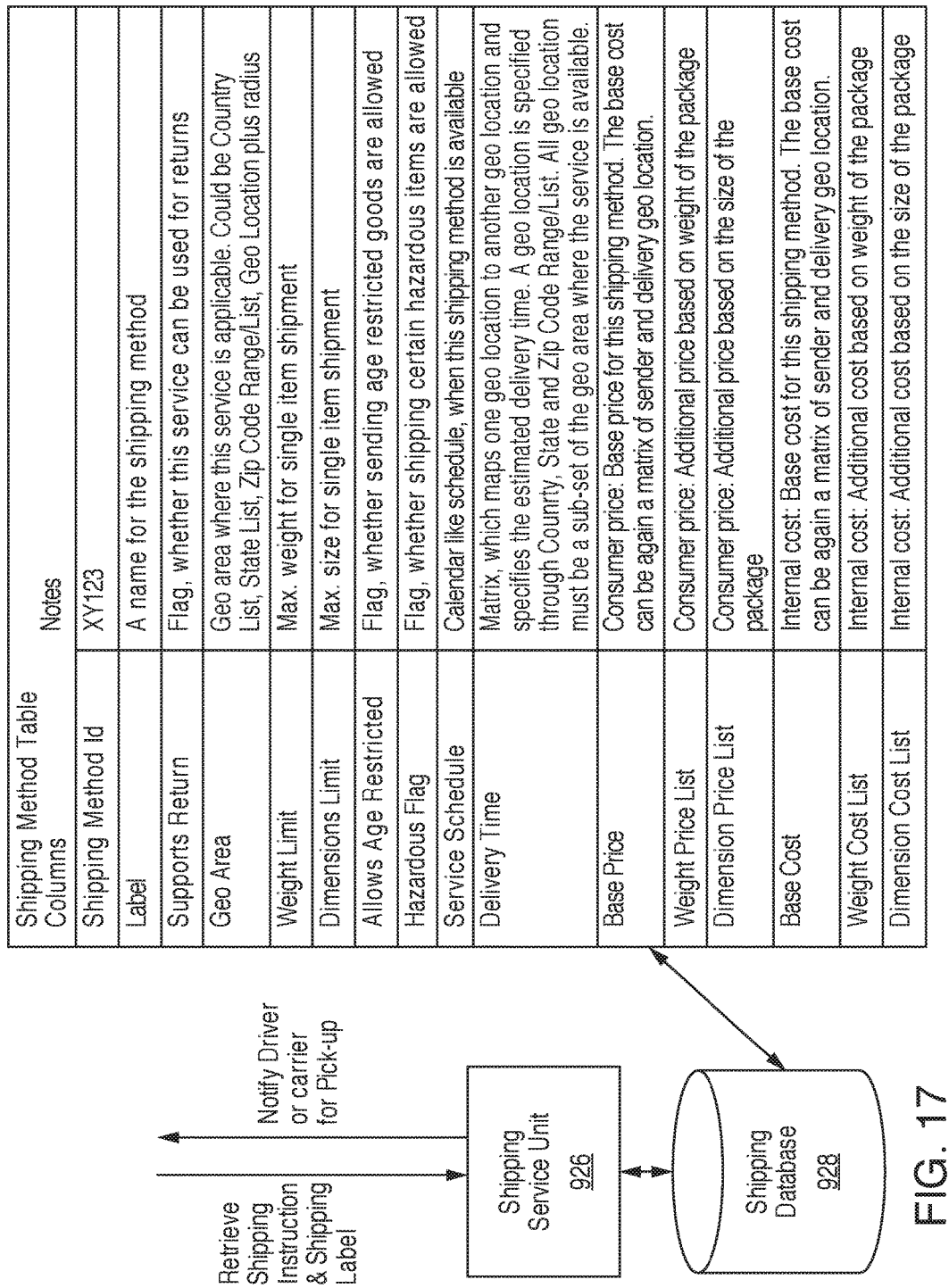

Detailed view of an exemplary shipping database 928 is depicted in FIG. 17. That database includes attributes of each shipping method, such as a Method Identifier, which may be unique to each shipping method, thus, differentiating it from other shipping methods, the Geo Area within which the shipping service is available, delivery time, which may be in the form of matrix mapping one geo location (location 'i', for example) to another (location 'j', for example) and containing the estimated, average delivery time between each pair of locations ($t_{ij}$, denoting the average delivery time between $i^{th}$ and $j^{th}$ location), etc. Data within the delivery time matrix may be utilized by the order routing unit to identify the store from where it takes minimum time to deliver the product to the customer's shipping address or current location, or whatever the case may be. Geo Area for a particular shipping method may be available in the form of a specific radial range of a reference point, or in any other suitable form [for example, "Services available for delivery within 25 km range of NW $2^{nd}$ Avenue, Miami, Fla.".

Figure 18:
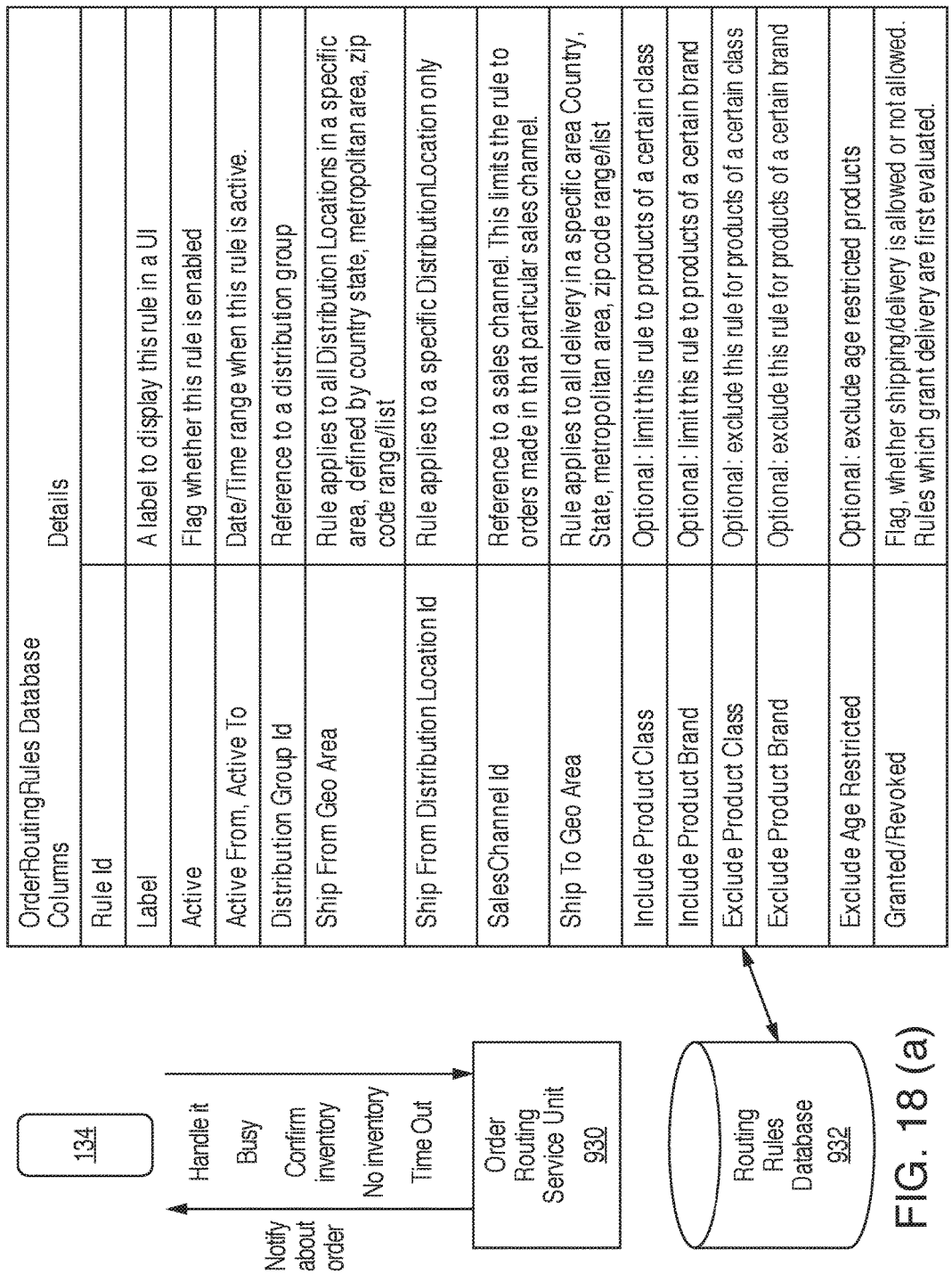
Figure 18:
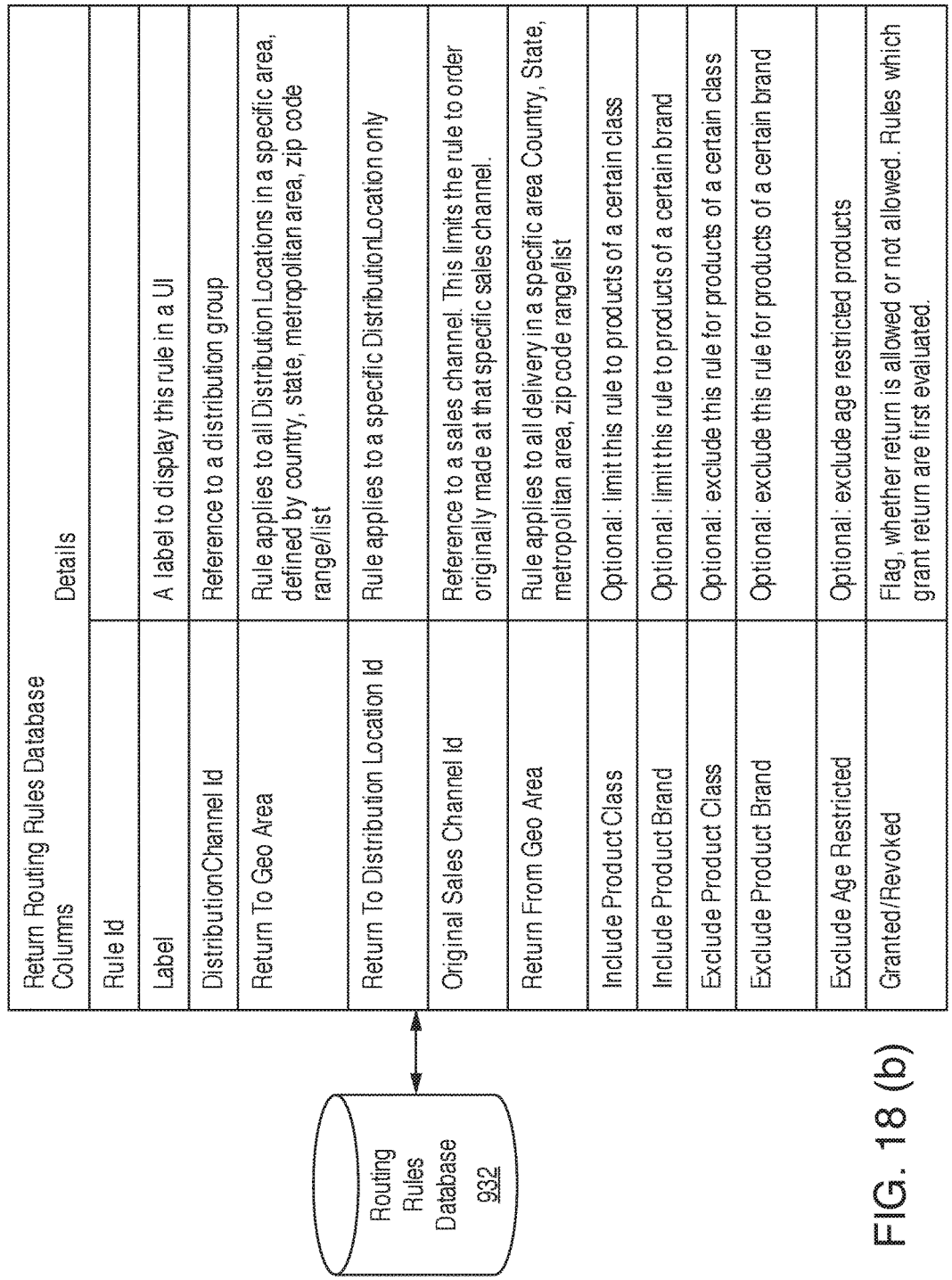

FIGS. 18 (*a*) and (*b*) illustrate an exemplary order routing service unit 930, coupled to the Routing Rules database 932. The unit 930 communicates at its front end with the retailer devices 134, selects an appropriate associate for order routing, and re-routes the orders to alternative associates/stores, based on a diversity of routing rules stored within the database 932. Each rule is labelled with a rule ID, and data cells within the database 932 include the period of validity for each rule, indication to exclude or include Product Class, Product Brand, instructions to route requests to a particular Geo Area, etc. Additionally, the database 932 incorporates multiple return rules shown in FIG. 18 (b), which store instructions for returning the product to appropriate retail stores in cases of delivery failure due to certain reasons. The routing rules shown in these examples are merely for the purpose of illustration, and the actual rules database for implementation may vary according to a given implementation, based, e.g., on the status of associates within the stores, products' location data within the stores, store location data, etc.

Figure 19:
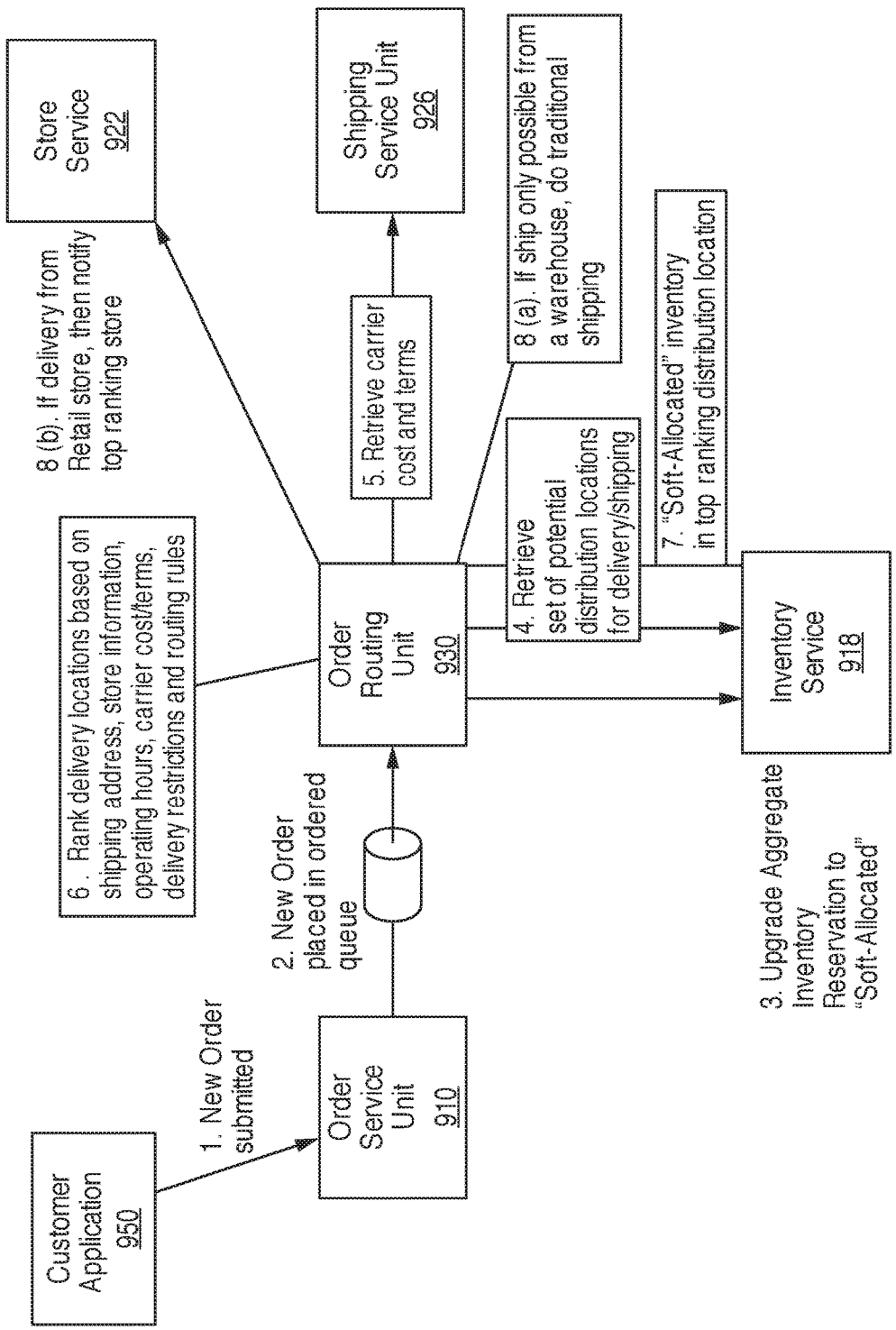
FIG. 19 illustrates the general interaction process between the different functional elements of the Routing and Fulfillment Server, to fulfill customers' orders.

FIG. 19 illustrates a process of collaboration between the different microservices of the Routing and Fulfillment Server 110, illustrated earlier in FIG. 12, according to the present disclosure. An appropriate Inter-Process Communication (IPC) mechanism may be deployed, and the microservices may interact with each other through suitable API gateways.

Indicated at step (1), the order service unit 910 communicates with the customers through the Customer Application 950 running on their devices. That communication specifically involves, receiving the customers' transaction request messages, processing them and placing them in the order queue. The unit 910 further passes the attributes of the order to the order routing unit 930 at step (2). The inventory service unit 918 receives communication signal from the order routing unit 930, to initially soft allocate the inventory for the ordered product(s) within its inventory database at step (3). Eventually, at step (4), the order routing unit 930 retrieves a set of feasible distribution locations for the ordered product, using information available to the inventory database and the store databases of the units 918 and 922, respectively. Further, at step (5) the routing unit 930 obtains possible carrier cost and delivery terms from the shipping service unit 926. Using this information, the routing unit 930 applies the routing rules available within its database, and identifies the optimal distribution locations for routing the order.

In one embodiment, an order routing unit 930 may employ a pre-defined ranking method to rank each of the possible distribution locations, based on parameters such as the distance of distribution locations from the shipping address, inventory level for the ordered products within those locations, number of associates currently available within each location, their availability status, etc., and the carrier cost for shipping the product from each location. Routing to the distribution locations may then be prioritized based on the ranking score of each location.

At step (7), the order routing unit 930 indicates the inventory service unit to "soft allocate" the inventory for the ordered product(s) within the distribution location having the top ranking score. In some embodiments, the inventory is soft allocated in a plurality of retail locations or distribution centers, for example, in at least two top-ranked distribution locations. At step (8), the routing unit 930 first identifies whether the delivery is possible from any retail store, or only from the warehouse. If none of the nearly located stores has the inventory for the ordered product available, then at step 8 (a), the routing unit routes the order to the nearest warehouse, from where the product is packed and prepared for traditional shipping. Also, if the product inventory is available at one or more retail stores nearby the shipping address, then at step 8 (b), the routing unit 930 routes the order to the store having the top ranking score.

Figure 20:
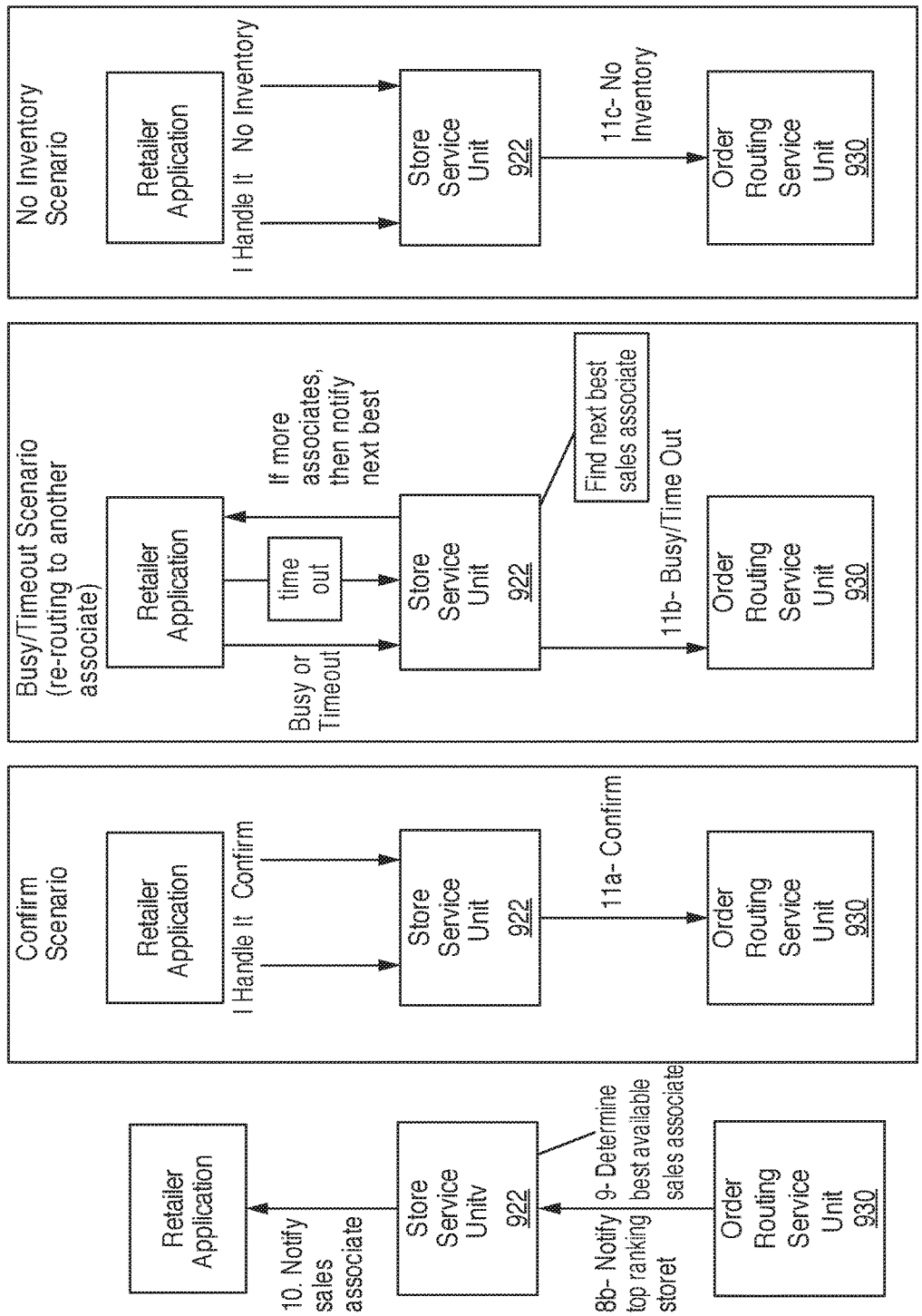
FIG. 20 shows the process of interaction between the different functional elements of the RFS with the Retailer Application executing on the retail associates' devices.

FIG. 20 illustrates the sequential flow of communication between the Retailer Application running on the retailers' electronic devices, the order routing service unit 930 and the store service unit 922. Following from FIG. 19, once the top ranking store has been determined, the store service unit 922 determines the best available retail associate within that store at step (9). That ranking may be, in an embodiment, based on another ranking algorithm that assigns appropriate weights to several ranking factors, such as the current state of availability of the retail associates within the store, the spatial location of the retail associates with respect to the spatial position, e.g., (x, y, z) coordinates of the ordered product within the retail store, associates' past average response time in handling customer requests, the load status of the associates for the day when the product is ordered (such as any schedule conflicts with another customers within next 10-15 minutes after the transaction request message is received), and so forth. Appropriate weights are assigned to these factors, and a cumulative ranking score is calculated for each associate location within the store.

At step (10), the store service unit 922 then notifies the associate having the highest ranking score, about the customer's transaction request message. Step (11) incorporates three different scenarios of the associate's response to the notification, as described earlier. Specifically, in one scenario, shown at step 11 (a), the associate may confirm to fulfill the request by pressing the 'Accept' option. In that case, the store service unit 922 subsequently seeks inventory availability for the ordered product from the associate. Preferably, at this step, the associate re-confirms the inventory for the product manually, within the store, and provides a confirmation response. If the inventory is out of stock, then at step 11 (c), the store service unit notifies the order routing unit 930, which then routes the order to the store having second highest ranking. The store service unit 922 eventually seeks an alternative, available associate within the second store.

Illustrated at step 11 (b) is the case where the top ranking associate declines to accept the request, or is non-responsive to the request for a pre-determined time interval. The store service unit 922 the, once again routes the transaction request message to the associate with second highest ranking score.

Figure 21:
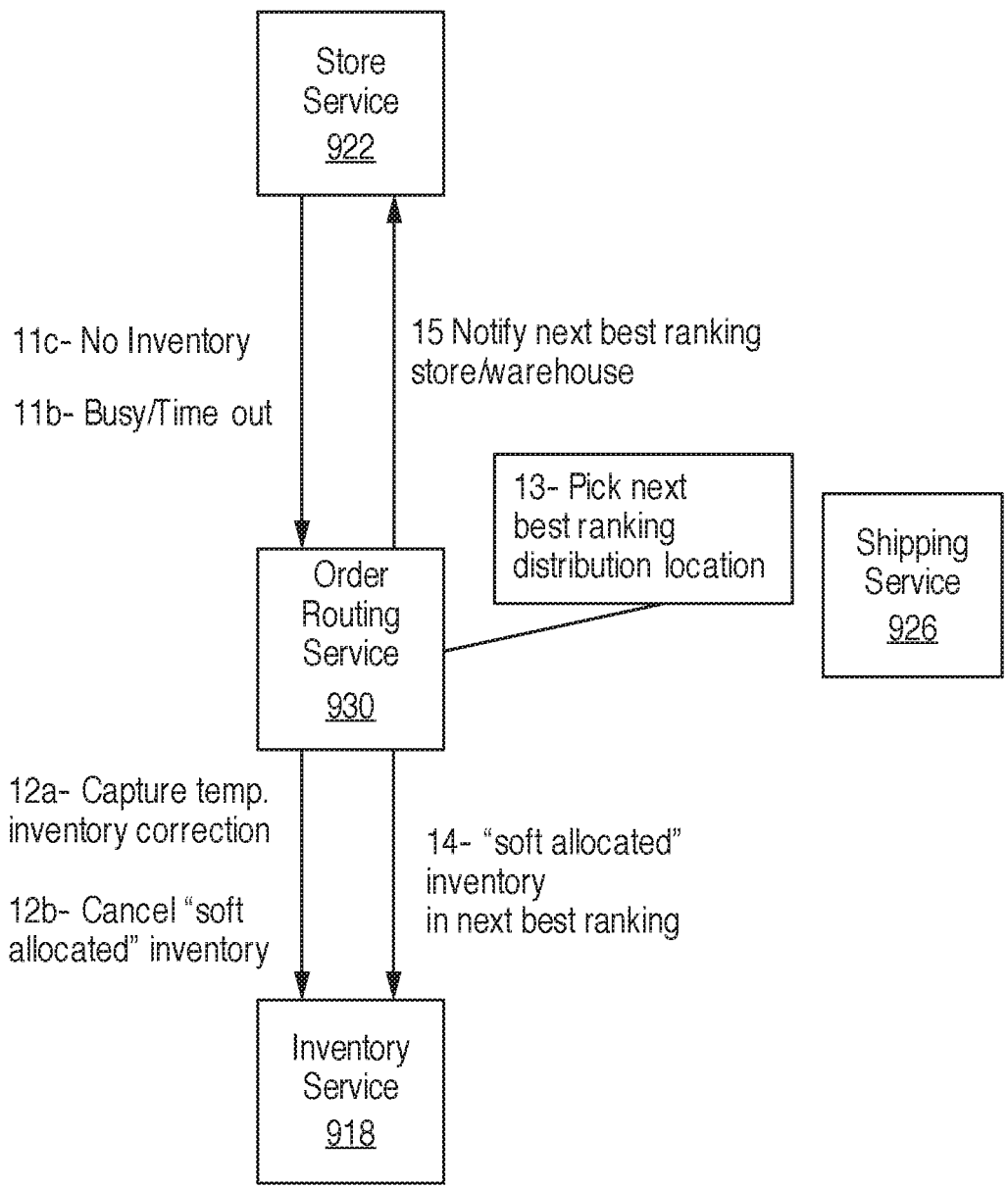
FIG. 21 illustrates the process of order routing and re-routing between different retail stores and the RFS.

FIG. 21 illustrates the further steps proceeding from the steps 11 (b)-(c) in FIG. 20, for cases where either a 'No Inventory' or a 'Time out' signal is received by the order routing unit 930. At step 12 (a) and (b), the order routing unit 930 notifies the inventory service unit 918, which then applies correction to the inventory data available within its inventory database. That correction is used to take into account any new order for the same product arriving from another customer. Such orders would then not be routed to the same store, before the inventory for the product becomes available within the store again.

Further, the earlier 'soft allocated' inventory for the product within the store, is cancelled at this step. At step 13, the unit 930 selects the next highest ranked distribution location based on the aforementioned algorithm. Further, the inventory for the product in the next distribution location is then 'soft allocated' by the inventory service unit 918 at step (14). At step (15), the order routing unit 930 notifies the store service unit 922 about the next, feasible distribution location, and the store service unit selects the best associate within that store based on the associate ranking algorithm described earlier.

Figure 22:
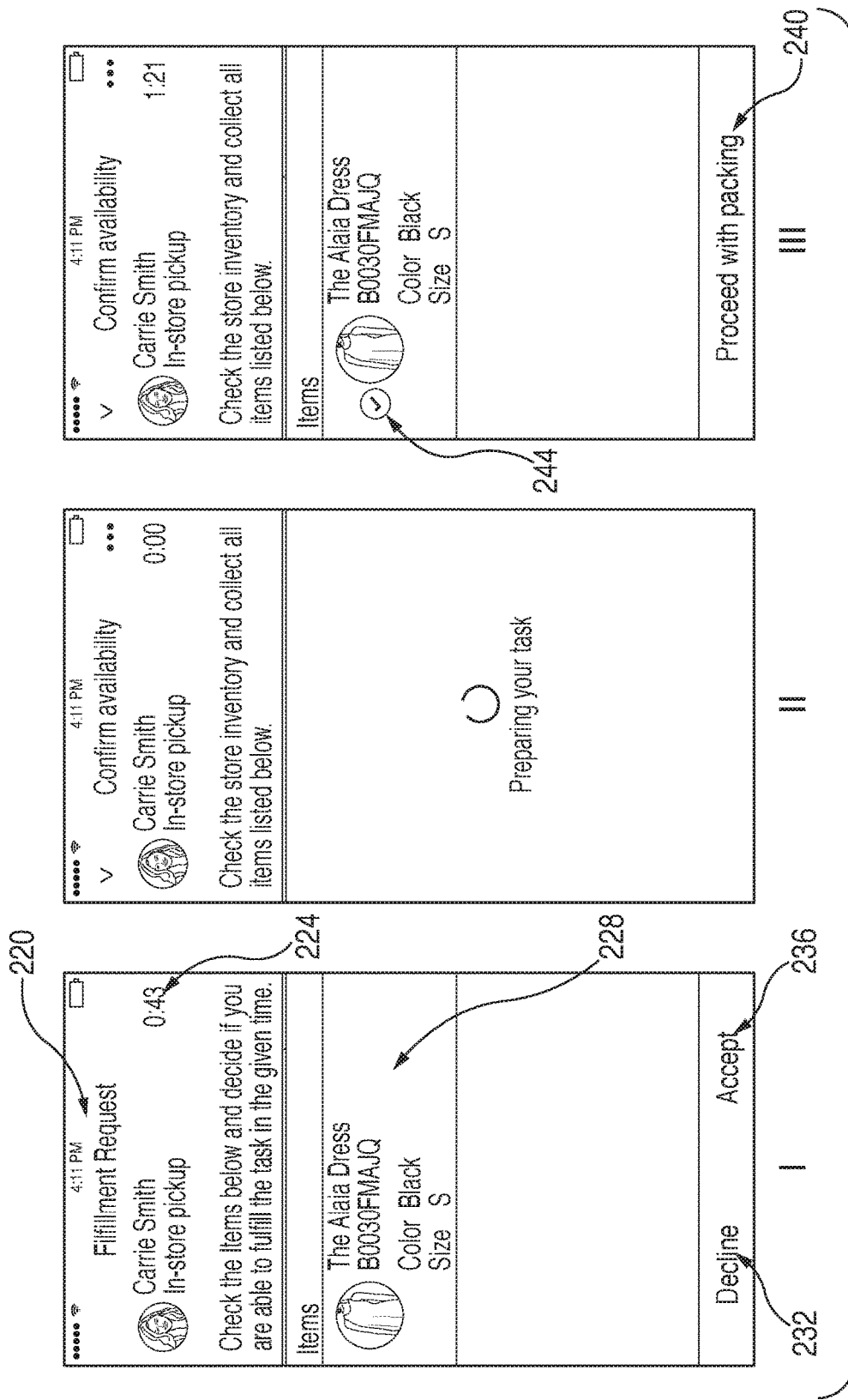
FIGS. 22 (a) and (b) depict the Snapshots of the Retailer Application in different phases, during the course of an associate's fulfilling of a particular order.
Figure 22B:
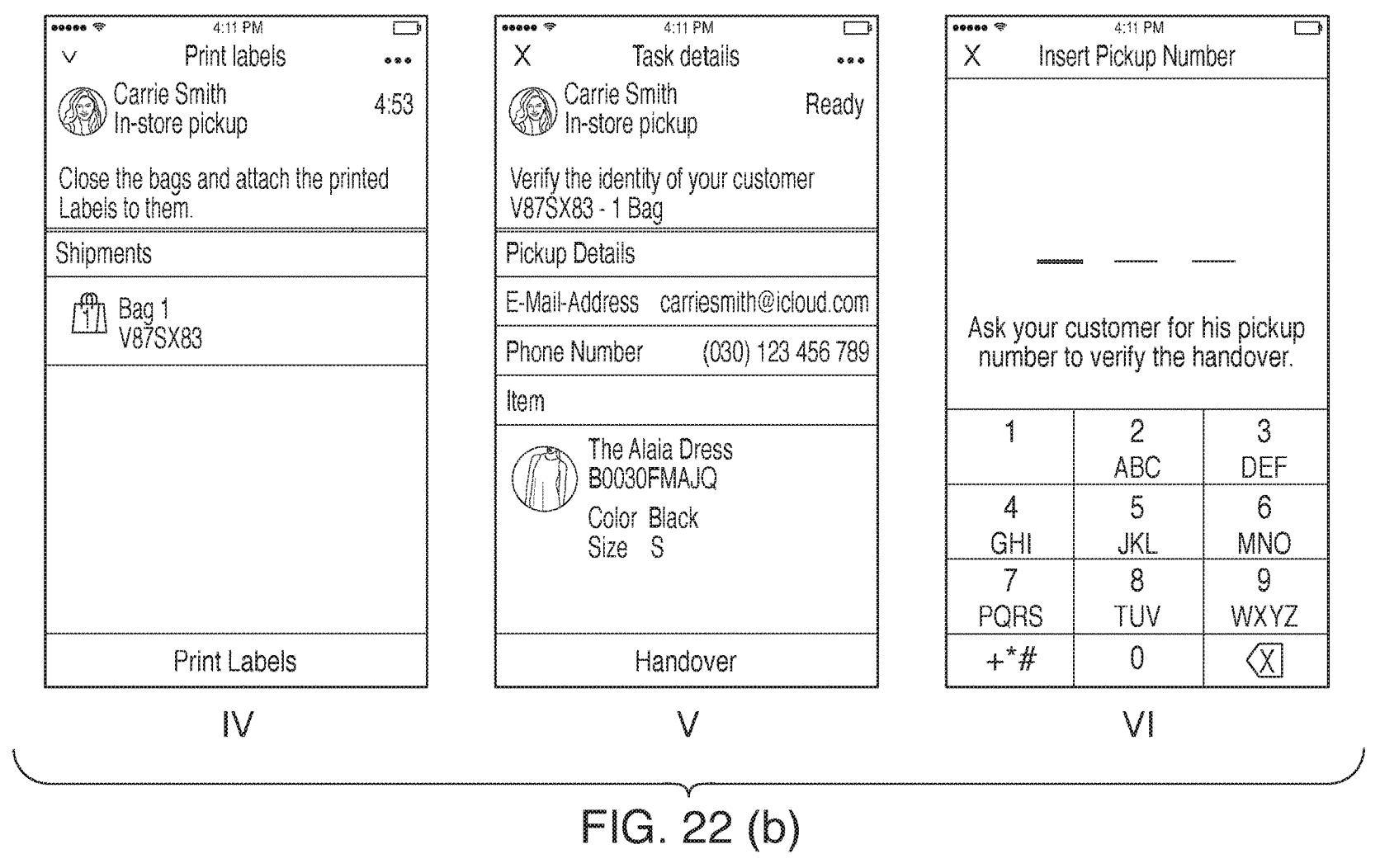

FIGS. 22 (a) and (b) illustrate exemplary snapshots of the Retailer Application executing on a retail associate's mobile communication device, during the different phases of the process of fulfilling customer's orders, starting from receiving/accepting their transaction request message, to dispatching/handing over the packed product to the customer.

Snapshot I illustrates the initial phase of interaction between the associate and the RFS, where a new customer's order ("Fulfillment Request") is notified to the associate. As shown, the notification displays the customer's name ("Carrier Smith"), and selected mode of delivery ("in-store pick up" in the current case). A timer 224 starts clicking immediately after the request is rendered on the user interface 220 of the associate's device. Further, in a horizontal panel 228, right below the customer's details and instructions line, the attributes of the product pre-selected by the customer are displayed. As shown, the ordered product is "Alias Dress", and the customer is interested in Black color, with small size. Further, selectable options 232 and 236 ("Decline" and "Accept") rendered and displayed at the bottom panel are configured to obtain the associate's confirmation to handle the request, based on his preference.

Snapshot II depicts the scenario where the retail associate has confirmed to fulfill the order. The associate's task at this point is to collect the ordered items from the store and confirm its availability. As shown further in Snapshot III, the associate may confirm the product inventory by clicking the button 244 abutting the product description panel, and may, thereafter, proceed with packing. The moment the button 244 is clicked, the RFS receives the signal that the product inventory is available and the associate has already picked the product from the store.

Pressing the selectable tab 240 provides the confirmation to the RFS that the product is in the stage of being prepared for packing at the store. During that phase, the RFS sends a notification message to the customer, along with an authentication code, which the customer would have to provide while picking up the product at the store. The use of an authentication code may be obviated if the chosen delivery option is "Ship to Address/Traditional Shipping" or "Local Delivery".

Snapshot IV depicts the subsequent stage where the product has been packed and the associate is in the phase of printing the label and sticking it to the bag. At phase V, the product is ready for being picked-up. Optionally, customer's contact/pick-up details may be displayed over the interface, which the associate may use for preliminary verification during the process of handing over. The last phase VI pertains to an authentication process, where the customer, on arrival at the store, manually enters the authentication code provided to him/her earlier. Once the authentication is successful, the associate may handover the product to the customer.

The present exemplary embodiments of the Retailer Application and illustrated Snapshots are given merely for the purpose of explanation and clarification. Other variations may be contemplated within the present scope, to customize and ramp-up the retail associates' interaction with the interface, and such variations are therefore, substantially encompassed within the scope of the present disclosure.

Though the present disclosure is generally explained with respect to cases where a single product is ordered, other aspects of the disclosure contemplate ordering multiple goods, which need not all be sourced or fulfilled from a single retail store or distribution location. In such embodiments, the system and the method of the disclosure, and particularly, the explicated routing rules and methods are extendable to identify the most feasible combination of distribution locations to fulfill such orders for multiple products. The shipping process in those cases may be accordingly split to minimize the shipping cost and delivery time to the customer.

Additionally, in some aspects, the system and method described herein can default to a conventional fail-safe configuration. For example, conventional shipping arrangements can be implemented if no acceptable delivery method exists under the present architecture. Also, if a retail associate discovers that he or she mistakenly accepted to fulfill an order, or that the ordered goods in question were discovered to be damaged following the acceptance, the order may be cancelled, accompanying by a reversal of payment or initiation of a substitutive order, which may then be fulfilled through alternative distribution location or logistics arrangement.

Figure 23:
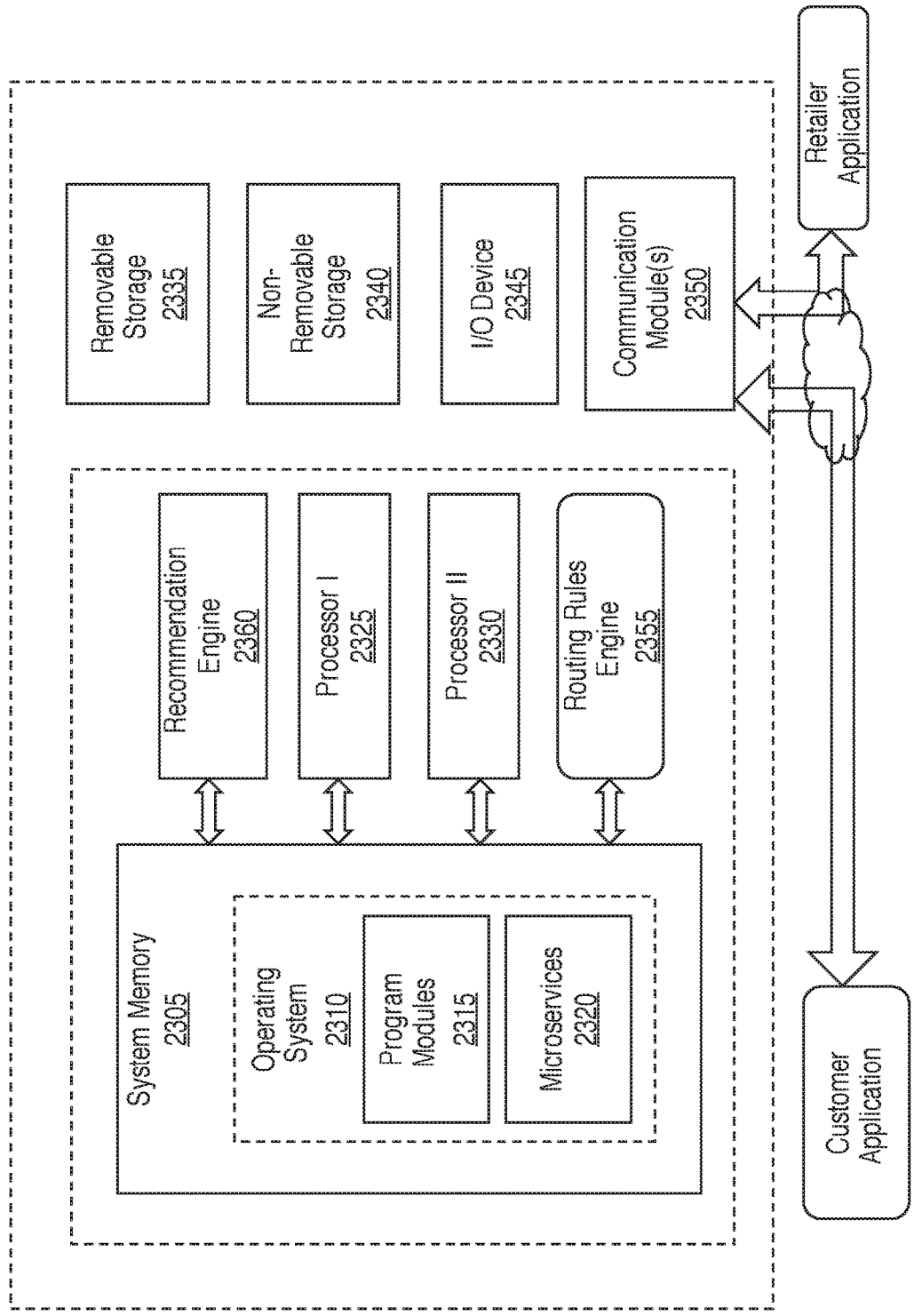
FIG. 23 depicts an exemplary non-transitory computer readable medium, having instructions stored therein, to implement the method described in FIGS. 5 to 10.

FIG. 23 illustrates an exemplary computing environment for implementing the method of the present disclosure, showing the basic hardware components of the Routing and Fulfillment Server 110. The RFS 110 includes a system memory 2305 and multiple processors of the type 2325 and 2330 that collaborate to execute computer readable instructions. The memory 2305 may either be a volatile memory, such as Random Access Memory (RAM), or, a non-volatile memory such as Read-only Memory (ROM), a flash memory, or a combination of these. Further, operating system 2310 controls the operations of the RFS 110, and may be any suitable operating system conventionally known. Further, the memory 2305 also includes one or more program modules 2315 and computer programmable interfaces, and different microservices 2320 configured to interact with the Customer and the Retail Applications.

The RFS 110 may also include additional data storages devices, which may be both volatile or non-volatile, removable or non-removable storage devices 2335 and 2340. These are typical computer readable media, such as, though not being limited to, RAM, ROM, EEPROM, Digital Versatile Disks (DVD), CD-ROM, or any other optical storage media such as magnetic disks or cassettes, etc.

Further, RFS 110 includes an Input/Output Device 2345. Input may be obtained through devices such as keyboard, mouse, any tangible/touch-input device, or a voice input device. Typical output devices such as a visual display, audio speakers, etc. may also be included.

A communication module 2350 facilitates communication between the RFS 110 and the Customer and Retailer Application over the cloud communication infrastructure, as shown.

Computer readable instructions may be stored in the system memory 2305, which, when executed by one or more of the processors 2325 and 2330, command to perform the steps recited in FIGS. 5 to 10, above.

A recommendation engine 2360 provides appropriate product recommendation to different customers, once they are connected to the RFS 110. A routing rules engine 2355 is configured to execute the routing rules stores within one or more databases of the RFS 110, for the purpose of routing and re-routing orders to different distribution locations, as mentioned earlier.

Figure 24:
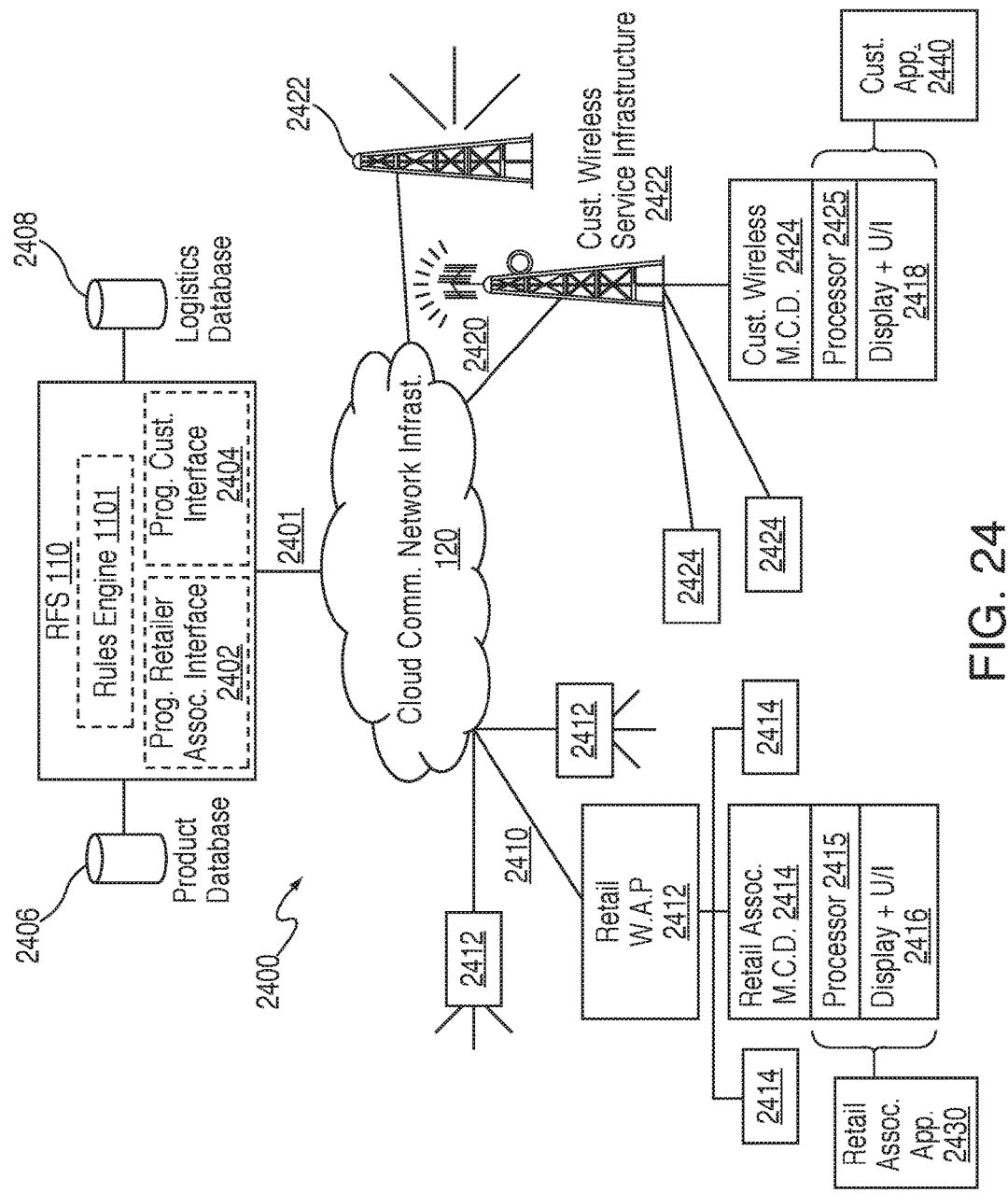
FIG. 24 illustrates an exemplary system for processing a transaction request from a customer according to the present disclosure.

FIG. 24 illustrates an exemplary architecture of a cloud-based communication system 2400 including servers, storage units, communication data pathways and mobile communication devices according to one or more embodiments. The system 2400 includes a first communication data pathway 2401 coupling a cloud communication network architecture 120 to a RFS 110 as described earlier. RFS 110 comprises a processor and/or Rules Engine 1101 configured and arranged to execute instructions implementing a set of rules by which the RFS parses and carries out steps responsive to a customer request message. The RFS 110 comprises a number of components including a programmable customer interface 2404 and a programmable retail associate interface 2402. The RFS 110 further comprises or is in data communication with one or more databases such as a product database 2406 storing multiple product attributes corresponding to multiple products for sale. The RFS 110 may further comprise or be in data communication with a logistics database 2408 storing data corresponding to a plurality of product delivery options.

Cloud communication network infrastructure 120 is coupled by a second communication data pathway 2410 to one or more retailer wireless access points 2412, which services one or more retail associate mobile communication devices 2414, as described above. A third communication data pathway 2420 connects the cloud communication network infrastructure 120 to one or more customer wireless service infrastructures 2422, which can be or involve a cellular communication infrastructure servicing the system's users or a subset thereof.

As mentioned earlier, the customer mobile communication device(s) 2424 are serviced by the customer wireless service infrastructure 2422, e.g., to deliver transaction request messages from the customer's device to the RFS 110, including information relating to attributes of a selected product for sale and delivery options chosen for delivery of said chosen product. The choices and options available to the customer are presented with the customer's Customer Application 2440 running on the customer's mobile communication device 2424, which further includes a processor 2425 and a display unit and user interface 2418 capable of displaying said product attributes 2442 and delivery options 2444.

On the retail associate's side, a retail associate mobile communication device 2414 also comprises a processor 2415 running a Retail Associate Application 2430, as well as a display unit and user interface 2416.

Although the present invention has been described with reference to certain preferred embodiments thereof, it should not be construed as limited to those embodiments, and rather, should be understood to cover all aspects set forth in the present claims. Various modifications, equivalent processes, as well as numerous structures to which the present invention may be applicable, will be apparent to those skilled in the art to which the present invention is directed.

What is claimed is:

1. A data processing and communication method in a cloud computing environment, comprising:
    establishing a first communication data link between a Routing and Fulfillment Server (RFS) and a cloud communication network, over a first data communication pathway;
    establishing a second communication data link between a retail wireless access point and said cloud communication network, over a second data communication pathway;
    establishing a third communication data link between a customer wireless service infrastructure and said cloud communication network, over a third data communication pathway;
    coupling a retail associate mobile communication device in a retail store and said RFS, using at least said retail wireless access point, said cloud communication network and said second data communication pathway;
    coupling a customer mobile communication device and said RFS, using at least said wireless communication service infrastructure, said cloud communication network and said third data communication pathway;
    responsive to signals from said RFS to said customer mobile communication device, presenting on a display of said customer mobile communication device a plurality of selectable options corresponding to attributes of respective products for sale at said retail store and a plurality of selectable delivery options associated with said products for sale;
    receiving from said customer mobile communication device, at said RFS, a transaction request message including data indicating an attribute of a selected product for sale, a delivery destination identifier and a selected delivery option;
    encoding a physical location of said selected product with respect to said retail store as a product location data;
    encoding a state of availability of a retail associate with respect to the retail associate's location within said retail store or with respect to the retail associate's location with respect to the selected product for sale;
    based on said product location data, said retail associate state of availability, and said selected delivery option, sending an RFS instruction message from said RFS to said retail associate using said retail associate mobile communication device, and presenting on said retail associate mobile communication device instructions to said retail associate corresponding to said transaction request message; and
    waiting a pre-determined amount of time for an associate response message in response to said instruction message, and if no response to said RFS instruction message has been received by the RFS within said pre-determined amount of time, re-sending the RFS instruction message from said RFS to an alternate retail associate mobile communication device, based on programmed routing rules stored and executed at said RFS, and presenting on said alternate retail associate mobile communication device instructions to said alternate retail associate corresponding to said transaction request message.

2. The method of claim 1, further comprising selecting a selected retail associate from a plurality of available retail associates at said retail store, based on programmed routing rules stored and executed at said RFS, to service a sale of said selected product and sending a message to the selected retail associate through said retail associate mobile communication device associated with said selected retail associate indicating an assignment of said selected retail associate to said sale.

3. The method of claim 1, receiving said transaction request message further comprising receiving from the customer mobile communication device a customer ID uniquely identifying the customer.

4. The method of claim 1, said physical location of the selected product comprising an identification of a retail store in which the selected product is located at the time of the transaction request message is received.

5. The method of claim 4, said physical location of the selected product comprising an identification of a physical location within a retail store where the selected product can be found in the retail store at the time of the transaction request message is received.

6. The method of claim 1, further comprising receiving an associate response message from said retail associate mobile communication device, in response to said RFS instruction message, the associate response message comprising data indicating a response from a retail associate to said transaction request message.

7. The method of claim 6, receiving the associate response message comprising receiving from said retail associate mobile communication device data confirming an availability of said selected product in said retail store according to said product availability data.

8. The method of claim 6, receiving the associate response message comprising receiving from said retail associate mobile communication device data denying an availability of said selected product in said retail store according to a product availability data.

9. The method of claim 8, further comprising re-sending the RFS instruction message from said RFS to an alternate retail associate mobile communication device, based on programmed routing rules stored and executed at said RFS, and presenting on said alternate retail associate mobile communication device instructions to said alternate retail associate corresponding to said transaction request message.

10. The method of claim 1, further comprising coupling a plurality of retail associate mobile communication devices in a respective plurality of retail stores and said RFS, using a plurality of respective retail wireless access point of each such plurality of retail stores, so as to service a plurality of retail associates at their respective retail stores through their respective retail associate mobile communication devices.

11. The method of claim 1, further comprising coupling a plurality of customer mobile communication devices and said RFS, each over a respective wireless communication service infrastructure coupled to the respective plurality of such customer mobile communication devices, so as to service a plurality of customers through their respective customer mobile communication devices.

12. A data processing and communication system, comprising:
a Routing and Fulfillment Server (RFS) coupled to a cloud communication network over a first data communication pathway;
a retail wireless access point coupled to said cloud communication network over a second data communication pathway;
a customer wireless service infrastructure coupled to said cloud communication network over a third data communication pathway;
a programmable retail associate interface of said RFS adapted and configured to exchange data between said RFS and a retail associate mobile communication device, using said retail wireless access point, over said first and second data communication pathways;
a programmable customer interface of said RFS adapted and configured to exchange data between said RFS and a customer mobile communication device, using said wireless service infrastructure, over said first and third data communication pathways;
a product database, accessible by said RFS, comprising a plurality of product attribute data corresponding to a respective plurality of products for sale, and a logistics database, accessible by said RFS, comprising a plurality of product delivery options;
said customer mobile communication device, coupled to said customer wireless service infrastructure, comprising a processor adapted to execute a customer application thereon, and comprising a display unit and a user interface programmably adapted to present to a customer a plurality of rendered product attribute options from said product database and a plurality of product delivery options from said logistics database, said customer mobile communication device further configured and arranged to generate a transaction request message comprising data and signals encoding a customer selected product attribute and a customer selected delivery option; and
said retail associate mobile communication device comprising a processor adapted to execute a retailer application thereon, and comprising a display unit and a user interface programmably adapted to present to a retail associate RFS instructions corresponding to said transaction request message,
wherein said RFS is configured to wait a pre-determined amount of time for an associate response message in response to said RFS instructions, and if no response to said RFS instructions has been received by the RFS within said pre-determined amount of time, said RFS is configured to re-send said RFS instructions from said RFS to an alternate retail associate mobile communication device, based on programmed routing rules stored and executed at said RFS, and to present on said alternate retail associate mobile communication device said RFS instructions to said alternate retail associate corresponding to said transaction request message.

13. The system of claim 12, wherein said routing rules are generated by a rules engine of said RFS that is programmably configured and arranged to generate data indicative of a selected retail associate whose respective associate mobile communication device is to be notified of said transaction request message.

14. The system of claim 13, said rules engine further being programmably configured and arranged to generate data indicative of said alternate retail associate when the selected retail associate does not confirm his or her ability to fulfill said transaction request message.

* * * * *